United States Patent
Ein-Eli et al.

(10) Patent No.: US 10,644,304 B2
(45) Date of Patent: May 5, 2020

(54) METHOD FOR PASSIVE METAL ACTIVATION AND USES THEREOF

(71) Applicant: Technion Research & Development Foundation Limited, Haifa (IL)

(72) Inventors: Yair Ein-Eli, Haifa (IL); Danny Gelman, Haifa (IL); Boris Shvartsev, Haifa (IL); Alexander Kraytsberg, Yokneam (IL)

(73) Assignee: Technion Research & Development Foundation Limited, Haifa (IL)

( * ) Notice: Subject to any disclaimer, the term of this patent is extended or adjusted under 35 U.S.C. 154(b) by 56 days.

(21) Appl. No.: 15/300,359

(22) PCT Filed: Mar. 31, 2015

(86) PCT No.: PCT/IL2015/050350
§ 371 (c)(1),
(2) Date: Sep. 29, 2016

(87) PCT Pub. No.: WO2015/151099
PCT Pub. Date: Oct. 8, 2015

(65) Prior Publication Data
US 2017/0179464 A1    Jun. 22, 2017

Related U.S. Application Data

(60) Provisional application No. 61/972,481, filed on Mar. 31, 2014.

(51) Int. Cl.
*H01M 4/04* (2006.01)
*H01M 4/134* (2010.01)
(Continued)

(52) U.S. Cl.
CPC .......... *H01M 4/044* (2013.01); *B23K 35/3605* (2013.01); *B23K 35/383* (2013.01);
(Continued)

(58) Field of Classification Search
CPC ............ C25D 5/54; C25D 3/665; C25D 5/34; H01M 4/134; H01M 4/366; H01M 4/628;
(Continued)

(56) References Cited

U.S. PATENT DOCUMENTS 3,635,765 A    1/1972 Greenberg
3,650,834 A    3/1972 Buzzelli
(Continued)

FOREIGN PATENT DOCUMENTS

CN    1408031    4/2003
EP    1983078    10/2008
(Continued)

OTHER PUBLICATIONS

Hagiwara et al. in (Acidic 1-ethyl-3-methylimidazoliuum fluoride: a new room temperature ionic liquid in Journal of Fluorine Chemistry vol. 99 (1999) p. 1-3; (Year: 1999).*
(Continued)

*Primary Examiner* — Jonathan G Jelsma
*Assistant Examiner* — Omar M Kekia

(57) ABSTRACT

Disclosed is a method for activating a surface of metals, such as self-passivated metals, and of metal-oxide dissolution, effected using a fluoroanion-containing composition. Also disclosed is an electrochemical cell utilizing an aluminum-containing anode material and a fluoroanion-containing electrolyte, characterized by high efficiency, low corrosion, and optionally mechanical or electrochemical rechargeability. Also disclosed is a process for fusing (welding, soldering etc.) a self-passivated metal at relatively low temperature and ambient atmosphere, and a method for electrodepositing a metal on a self-passivated metal using metal-oxide source.

6 Claims, 15 Drawing Sheets

(51) Int. Cl.
- *H01M 4/36* (2006.01)
- *H01M 4/46* (2006.01)
- *H01M 4/62* (2006.01)
- *H01M 10/054* (2010.01)
- *C25D 3/66* (2006.01)
- *H01M 12/08* (2006.01)
- *B23K 35/36* (2006.01)
- *C25D 5/54* (2006.01)
- *H01M 4/1395* (2010.01)
- *C25D 5/34* (2006.01)
- *B23K 35/38* (2006.01)
- *H01M 4/66* (2006.01)
- *H01M 10/0569* (2010.01)
- *H01M 4/02* (2006.01)
- *H01M 4/50* (2010.01)

(52) U.S. Cl.
CPC ............... *C25D 3/665* (2013.01); *C25D 5/34* (2013.01); *C25D 5/54* (2013.01); *H01M 4/134* (2013.01); *H01M 4/1395* (2013.01); *H01M 4/366* (2013.01); *H01M 4/463* (2013.01); *H01M 4/628* (2013.01); *H01M 4/661* (2013.01); *H01M 10/054* (2013.01); *H01M 10/0569* (2013.01); *H01M 12/08* (2013.01); *H01M 4/502* (2013.01); *H01M 2004/027* (2013.01); *H01M 2300/0045* (2013.01); *Y02E 60/128* (2013.01)

(58) Field of Classification Search
CPC ......... H01M 10/054; H01M 2004/027; H01M 4/044; H01M 12/08; H01M 4/1395; H01M 4/502; H01M 4/463; H01M 4/661; H01M 10/0569; H01M 2300/0045; B23K 35/3605; Y02E 60/128
USPC ......................................................... 429/200
See application file for complete search history.

(56) References Cited

U.S. PATENT DOCUMENTS

| | | | |
|---|---|---|---|
| 4,619,716 A | 10/1986 | Suzuki et al. | |
| 4,643,241 A | 2/1987 | Yonekura et al. | |
| 8,715,853 B1 | 5/2014 | Vajo et al. | |
| 2011/0262816 A1* | 10/2011 | Amatucci | H01M 8/0606 429/336 |
| 2012/0082904 A1 | 4/2012 | Brown et al. | |
| 2012/0082905 A1 | 4/2012 | Brown et al. | |
| 2012/0164541 A1* | 6/2012 | Darolles | H01M 6/164 429/326 |
| 2015/0093659 A1* | 4/2015 | Gonzalez | H01M 12/08 429/405 |

FOREIGN PATENT DOCUMENTS

| | | |
|---|---|---|
| JP | 2006-198512 | 8/2006 |
| JP | 2010-146800 | 7/2010 |
| JP | 2014-032914 | 2/2014 |
| WO | WO 01/66827 | 9/2001 |
| WO | WO 2015/151099 | 10/2015 |

OTHER PUBLICATIONS

English language machine translation of Joboji Toru JP 2010-146800 (A)—Jul. 1, 2010 "Air Battery" (Year: 2010).*
Communication Pursuant to Article 94(3) EPC dated Aug. 17, 2018 From the European Patent Office Re. Application No. 15773010.2. (4 Pages).
Chen et al. "Electrochemical Study of Copper in a Basic 1-Ethyl-3-Methylimidazolium Tetrafluoroborate Room Temperature Molten Salt", Electrochimica Acta 45(3): 441-450, Oct. 15, 1999.
Translation dated Aug. 19, 2018 of Notification of Office Action and Search Report dated Jul. 20, 2018 from the State Intellectual Property Office of the People's Republic of China Re. Application No. 201580024001.2. (19 Pages).
Supplementary European Search Report and the European Search Opinion dated Aug. 10, 2017 From the European Patent Office Re. Application No. 15773010.2. (9 Pages).
Tsuda et al. "A Highly Conductive Composite Electrolyte Consisting of Polymer and Room Temperature Molten Fluorohydrogenates", Solid State Ionics, XP004370988, 149(3-4): 295-298, Aug. 2, 2002.
Notification of Office Action and Search Report dated Jul. 20, 2018 From the State Intellectual Property Office of the People's Republic of China Re. Application No. 201580024001.2. (13 Pages).
Communication Pursuant to Article 94(3) EPC dated Mar. 21, 2018 from the European Patent Office Re. Application No. 15773010.2. (5 Pages).
Armand et al. "Ionic-Liquid Materials for the Electrochemical Challenges of the Future", Nature Materials, 8: 621-629, Aug. 2009.
Berrettoni et al. "A Cyclic Voltammetric Study of the Electrochemical Behavior of NiS2 in Molten NaCl Saturated NaAlC14 Melts", Journal of the Electrochemical Society, 140(4): 969-973, Apr. 1993.
Bockstie et al. "Control of Al Corrosion in Caustic Solutions", Journal of the Electrochemical Society, 110(4): 267-271, Apr. 1963.
Doche et al. "Electrochemical Behaviour of Aluminium in Concentrated NaOH Solutions", Corrosion Science, 41(4): 805-826, 1999.
Egan et al. "Developments in Electrode Materials and Electrolytes for Aluminium-Air Batteries", Journal of Power Sources, p. 1-18, 2013.
Gelman et al. "Aluminium-Air Battery Based on an Ionic Liquid Electrolyte", Journal of Materials Chemistry A, 2(47): 20237-20242, 2014.
Holleck "The Reduction of Chlorine on Carbon in AlC13—KC1—NaCl Melts", Journal of the Electrochemical Society, 119(9): 1158-1161, Sep. 1972.
Jiang et al. "Electrodeposition of Aluminium From Ionic Liquids: Part I—Electrodeposition and Surface Morphology of Aluminium From Aluminium Chloride (AlCl3)-1-Ethyl-3-Methylimidazolium Chloride ([EMIm]Cl) Ionic Liquids", Surface & Coatings Technology, 201: 1-9, 2006.
Knutz et al. "Mechanism of Reaction in NaAlCl4 Molten Salt Batteries With Nickel Felt Cathodes and Aluminium Anodes. I. Modeling of the Battery Properties at Thermodynamic Equilibrium", Journal of the Electrochemical Society, 140(12): 3374-3379, Dec. 19963.
Knutz et al. "Mechanism of Reaction in NaAlCl4 Molten Salt Batteries With Nickel Felt Cathodes and Aluminium Anodes. II. Experimental Results and Comparison With Model Calculations", Journal of the Eletrochemical Society, 140(12): 3380- 3390, Dec. 1993.
Kuboki et al. "Lithium-Air Batteries Using Hydrophobic Room Temperature Ionic Liquid Electrolyte", Journal of Power Sources, 146: 766-769, 2005.
Li et al. "Aluminium as Anode for Energy Storage and Conversion: A Review", Journal of Power Sources, 110: 1-10, 2002.
Licht et al. "The Effect of Water on the Anodic Dissolution of Aluminium in Non-Aqueous Electrolytes", Electrochemistry Communications, 2: 329-333, 2000.
Lin et al. "An Ultrafast Rechargeable Aluminium-Ion Battery", Nature, p. 1-16, 2015.
Mikeska et al. "Corrosion of Alumina in Aqueous Hydrofluoric Acid", Journal of the American Ceramic Society, 82(12): 3561-3566, 1999.
Shvartsev et al. "Reference Electrode Assembly and Its Use in the Study of Fluorohydrogenate Ionic Liquid Silicon Electrochemistry", Physical Chemistry Chemical Physics, 15(41): 17837-17845, Nov. 7, 2013.
Wang et al. "Corrosion and Electrochemical Behaviors of Pure Aluminium in Novel KOH-Ionic Liquid-Water Solutions", Materials and Corrosion, 60(12): 977-981, 2009.
Weaving et al. "Experimental Studies of Transition Metal Chloride Electrodes in Undivided Cells Using Molten NaAlCl4 Electrolyte", Journal of Power Sources, 36:537-546, 1991.

(56) References Cited

OTHER PUBLICATIONS

Zaromb "The Use and Behavior of Aluminium Anodes in Alkaline Primary Batteries", Journal of the Electrochemical Society, 109(12): 1125-1130, Dec. 1962.
Zaromb et al. "Aluminium-Consuming Fluidized-Bed Anodes", Journal of the Electrochemical Society, 137(6): 1851-1856, Jun. 1990.
Zaromb et al. "Feasibility of Electrolyte Regeneration in Al Batteries", Journal of the Electrochemical Society, 109(12): 1191-1192, Dec. 1962.
Zein El Abedin et al. "Electrodeposition of Nano- and Microcrystalline Aluminium in Three Different Air and Water Stable Ionic Liquids", ChemPhysChem, 7: 1535-1543, 2006.
Zhao et al. "Review: Electrodeposition of Aluminium From Nonaqueous Organic Electrolytic Systems and Room Temperature Molten Salts", Electrochimica Acta, 42(1): 3-13, 1997.
Communication Pursuant to Article 94(3) EPC dated Feb. 12, 2019 From the European Patent Office Re. Application No. 15773010.2. (7 Pages).
Result of Consultation dated Feb. 1, 2019 From the European Patent Office Re. Application No. 15773010.2. (3 Pages).
Notification of Office Action and Search Report dated Mar. 14, 2019 From the State Intellectual Property Office of the People's Republic of China Re. Application No. 201580024001.2 and Its Translation Into English. (20 Pages).
Notice of Reasons for Rejection dated Dec. 18, 2018 From the Japan Patent Office Re. Application No. 2016-560800 and Its Translation Into English. (7 Pages).
Summons to Attend Oral Proceedings Pursuant to Rule 115(1) EPC dated Nov. 11, 2019 From the European Patent Office Re. Application No. 15773010.2. (9 Pages).

\* cited by examiner

METHOD FOR PASSIVE METAL ACTIVATION AND USES THEREOF

RELATED APPLICATIONS

This application is a National Phase of PCT Patent Application No. PCT/IL2015/050350 having International filing date of Mar. 31, 2015, which claims the benefit of priority under 35 USC § 119(e) of U.S. Provisional Patent Application No. 61/972,481 filed on Mar. 31, 2014. The contents of the above applications are all incorporated by reference as if fully set forth herein in their entirety.

FIELD AND BACKGROUND OF THE INVENTION

The present invention, in some embodiments thereof, relates to chemistry of metals, and more particularly, but not exclusively, to a method of activating a surface of self-passivated metals, such as aluminum, to a method of reactivating metal oxides and to uses of these methods in, for example, electrochemical cells.

When exposed to air at room temperature, or another oxidizing environment, some metals, such as aluminum, and metal alloys, such as stainless steel, tend to form a hard, relatively inert surface. This phenomenon is known as self-passivation or natural passivation. In the case of aluminum, for example, a surface layer of amorphous aluminum oxide about 2-3 nm thick is formed naturally, providing an effective protective layer against corrosion and other chemical processes in specific environmental conditions. Aluminum alloys typically form a thicker oxide layer, 5-15 nm thick, but tend to be more susceptible to corrosion.

Like aluminum, also silicon, a self-passivating metalloid, is naturally unreactive electrochemically, typically covered with a natural passivating layer of oxides formed in ambient conditions. Hydrofluoric acid (HF) is typically used for silicon surface activation, and is also an industrially utilized agent for silicon oxide (silica, $SiO_2$) dissolution. However, aluminum oxide (alumina, $Al_2O_3$) is far less soluble in hydrofluoric acid; 2-3 orders of magnitude lower compared to silica [Kurt R. et al., J. Am. Ceram. Soc., 82 [12] 3561-66 (1999)], making hydrofluoric acid a less effective agent for aluminum activation.

Battery systems based on aluminum and aluminum alloys as anodes present a potential for efficient, inexpensive, and high performance power sources. The main advantages of aluminum-based battery systems include high energy content (8 kWh/kg), low equivalent weight, high natural abundance (low price), and safety characteristics, as well as relatively non-toxic and environmentally safe byproducts. For example, in the context of electric vehicle propulsion, aluminum contains approximately one-half the energy content of gasoline per unit weight and three times the energy per unit volume.

One of the main obstacles still challenging those who attempt to use aluminum as a source of fuel (an anode) in an electrochemical cell based on non-aqueous solutions, is overcoming its tendency to self-passivate by oxides or other protective layers, which causes the metal anode to be less electrochemically reactive and thus unusable as an anode. In alkaline aqueous solutions aluminum (but also any other anode applied) based power sources suffer from a variety of problems. Among those one can include severe anodic weight loss due to corrosion reactions that significantly reduce battery energy capacity and also degradation of the electrolyte itself by formation of insoluble products.

The aluminum air (Al/Air) system theoretically represents a viable metal anode/air (oxygen) cathode battery in terms of energy capacity and cell potential. However, to date, there are no commercial battery products which utilize aluminium anode for the above mentioned reasons, namely corrosion and electrolyte degradation, as well as performances degradation in peak humidity conditions (both high and low), and $CO_2$ poisoning (in the alkaline environment), all of which cause a decrease in the reversible electrode potential, i.e., the cell voltage is considerably lower than the theoretical value [Li, Q. et al., J. Power Sources, 2002, 110, p. 1-10].

An aluminum/oxygen system was first demonstrated in the early 1960s by researchers who found that the addition of zinc oxide or certain organic inhibitors, e.g. alkyldimethylbenzyl-ammonium salts, to the electrolyte, significantly decreased the corrosion of amalgamated aluminum anodes in 10 M sodium or potassium hydroxide solutions [Zaromb, S., J. Electrochem. Soc., 1962, 109, p. 1125-1130; Bockstie, L. et al., J. Electrochem. Soc., 1963, 110, p. 267-271].

The major development effort to date has focused on metal/air cells with two types of electrolytes, i.e. alkaline and saline electrolytes. In thermodynamic terms, an aluminum anode should exhibit a potential of −1.66 V in saline and −2.35 V in alkali electrolyte; however, practical aluminum electrodes operate at a significantly lower potential because (a) aluminum is normally covered by an oxide/hydroxide film which causes a delay in reaching a steady-state voltage due to internal resistance; (b) aluminum undergoes a parasitic corrosion reaction, resulting in less than 100% utilization of the metal and the evolution of hydrogen.

The progressive consumption of hydroxyl ions at the aluminum electrode makes the electrolyte more saturated with aluminate (aluminum salt), which eventually exceeds the super-saturation and forms crystals of aluminum hydroxide that precipitate with the regeneration of hydroxyl ions. In addition to the electrochemical consumption of the anode, aluminum is thermodynamically unstable in an alkaline electrolyte and reacts with the electrolyte to generate hydrogen. This parasitic corrosion reaction, or self-discharge, degrades the Coulombic efficiency of the anode and must be suppressed in order to minimize the capacity loss.

Molten salts constitute non-aqueous media that have been considered as alternative electrolyte in which aluminum does not form the surface oxide film. Since aluminum can be electrodeposited from the non-aqueous media, such electrolytes were considered as suitable for developing rechargeable aluminum batteries. Considerable research has been carried out for developing aluminum secondary batteries since the 1970s, with the earliest attempt to develop the $Al/Cl_2$ battery system by using $NaCl$—$(KCl)$—$AlCl_3$ as electrolyte [Holleck, G. L. et al., J. Electrochem. Soc., 1972, 119, p. 1161-1166]. Due to the difficulty associated with the chlorine storage, metal chlorides were proposed as the cathode materials; however, the high solubility of metal chlorides in the melts limited the development of such battery systems [Weaving, J. S. et al., J. Power Sources, 1991, 36, p. 537-546]. Sulfur and its group elements were also suggested as the cathode candidates, as well as transition metals and their sulfides, yet for cost and other technical aspects and consideration, $FeS_2$ and $FeS$ are the most commonly used cathodes for the Al based system to date [Li, Q. et al., J. Power Sources, 2002, 110, p. 1-10]. Overall these molten salt battery systems operate at high temperatures (at least over 100° C.), and exhibit high discharging capacity, though a significant capacity loss is observed due to the solubility of metal sulfides, and the formation of aluminum dendrites during the charging still harms the battery efficiency.

Room temperature ionic liquids (RTILs) are a class of solvents, which encompasses a wide range of liquid materials produced from the conjugation of relatively large molecular organic cations (e.g. immadazolium, tetraalkylammonium, sulfonium, piperidinium, pyridinium and betaine), with relatively small inorganic anions (e.g. $PF_6^-$, $BF_4^-$, $AlCl_4^-$, $(CF_3SO_2)_2N^-$, $Et_3OSO_3^-$). These materials, which are composed only of ions, may be compared to high temperature molten salts, with the obvious difference that the melting point of the RTIL is near room temperature (about 25 C.°). Hagiwara, R. et el. [*J. Fluor. Chem.*, 1999, 99(1) and *J. Electrochem. Soc.*, 2002, 149, D1] reported the synthesis and properties, such as electric conductivity and the thermal stability at elevated temperatures, of fluorohydrogenate-containing RTILs, such as the fluoroanion-RTIL $EMIm(HF)_{2.3}F$.

Several researchers have explored the use of chloroaluminate RTILs as electrolytes for aluminum batteries [Egan, D. et al., J. Power Sources, 2013, 236, p. 293-310]. These studies were limited by the laborious preparation due to the highly exothermic reaction between 1-ethyl-3-methylimidazolium chloride (EMIC), and $AlCl_3$. Air and water stable ionic liquids such as 1-ethyl-3-methylimidazolium bis(trifluoromethylsulfonyl)amide ([EMIm]TFSI), 1-butyl-1-methylpyrrolidinium bis(trifluoromethylsulfonyl)imide ([BMP]TFSI), [(Trihexl-tetradecyl)phosphonium] bis(trifluoromethylsulfonyl)imide ($P_{14,6,6,6}$TFSI) and 1-butyl-3-methylimidazolium tetrafluoroborate, [BMIm]TFB, were considered as alternative to the chloroaluminate ionic liquids; however, efforts were still unsuccessful in providing commercial aluminum/ionic-liquid battery systems.

The low solubility of metal salts and metal oxides in ionic liquids and electrolytes containing ionic liquids poses a serious drawback for possible electrochemical applications of these solutions. The low solubility is assumed to be a consequence of the fact that most of ionic liquids contain weakly coordinating anions like tetrafluoroborate, hexafluorophosphate or bis(trifluoromethylsulfonyl) imide. Ionic liquids with fluorinated anions have lower melting points and viscosities than ionic liquids with coordinating anions like chloride or carboxylate ions, but their solvating abilities are very poor. The solubility of metal salts in ionic liquids can be increased by mixing the ionic liquid with coordinating additives with a low vapor pressure. An example is the addition of poly(ethylene glycol)s to ionic liquids. Other examples are the "deep eutectic solvents" such as a mixture of choline chloride and urea or a mixture of choline chloride and carboxylic acids. Additional approach to increase the solubility of metal salts in ionic liquids is to use ionic liquids with appending coordinating groups, so called "task specific" RTILs.

The latter ionic liquids are typically mixed with more conventional ionic liquids in order to lower their melting point and viscosity. An example for such an ionic liquid mixture is betainium bis(trifluoromethylsulfonyl)imide, [Hbet][Tf₂N]. This ionic liquid, bearing a carboxyl group, has a selective solubilizing ability for metal oxides. Among such oxides are uranium(VI) oxide, zinc(II) oxide, cadmium(II) oxide, mercury(II) oxide, nickel(II) oxide, copper(II) oxide, palladium(II) oxide, lead(II) oxide, and silver(I) oxide. Even though a variety of oxides were found to be soluble in this specific RTIL, iron, cobalt, aluminum and silicon oxides were found to be insoluble or very poorly soluble therein [Nockemann P. et al., *J. Phys. Chem. B*, 2006, 110, 20978-20992].

Metal deposition on various substrates is another field that presents challenges, particularly when the substrate is a self-passivated metal and also when the source of metal ions for deposition is an insoluble oxide or otherwise unreactive metal species. Some metal deposition processes still require the use of seeds, and such seeding make depositing result less uniform, especially in depositing on ultra-delicate structural features. For example, copper electroplating of the TaN/Ta diffusion barrier in Ultra Large-Scale Integration (ULSI) is a complex scientific and engineering problem which requires seeding and highly protected working environments, rendering scaling of the patterns for deposition, diffusion barrier layers manufacturing and electroplating itself a difficult task.

Additional background art includes U.S. Pat. Nos. 5,082,812, 5,411,583 and 5,587,142, and German Patent No. DE19731349.

SUMMARY OF THE INVENTION

A need still exists for methodologies in which a passivation layer of self-passivated metals, such as aluminum, is avoided or removed, and the surface is rendered chemically or electrochemically active.

According to an aspect of some embodiments of the present invention, there is provided a method of activating a surface of a metal or a metal alloy, which includes contacting the surface with a fluoroanion-containing composition, to thereby obtain an activated metal surface.

According to some of any of the embodiments of the invention, contacting is effected for at least 10 seconds.

According to some of any of the embodiments of the invention, the activation period is at least 1 hour.

According to some of any of the embodiments of the invention, the activated metal surface is essentially devoid of a passivation layer.

According to some of any of the embodiments of the invention, the activated metal surface comprises fluorohydrogenate-metal species (HF-species).

According to some of any of the embodiments of the invention, the activated metal surface exhibits at least two peaks in an attenuated total reflection infrared spectrum having a wavenumber range selected from the group consisting of from 3150 $cm^{-1}$ to 2840 $cm^{-1}$, from 1110 $cm^{-1}$ to 800 $cm^{-1}$, from 2505 $cm^{-1}$ to 2200 $cm^{-1}$, from 1920 $cm^{-1}$ to 1600 $cm^{-1}$ and/or from 1170 $cm^{-1}$ to 870 $cm^{-1}$.

According to some of any of the embodiments of the invention, effected while diminishing less than $1 \cdot 10^{-4}$ gram per 1 $cm^2$ of surface area of the metal or the metal alloy over a time period of 1 hour under maximal corrosion current density of 50 $\mu A/cm^2$.

According to some of any of the embodiments of the invention, wherein the metal is selected from the group consisting of a self-passivating metal, a transition metal, a noble metal, a post-transition metal, a base metal, a poor metal, an alkaline earth metal, an alkaline metal, a lanthanide, an actinide and an alloy thereof.

According to some of any of the embodiments of the invention, wherein the metal or metal alloy comprises a self-passivated metal or a self-passivated metal alloy.

According to some of any of the embodiments of the invention, the self-passivated metal is selected from the group consisting of aluminum, chromium, titanium and tantalum.

According to some of any of the embodiments of the invention, the self-passivated metal alloy is aluminum.

According to some of any of the embodiments of the invention, the self-passivated metal alloy is alloy steel.

According to an aspect of some embodiments of the present invention, there is provided an electrochemical cell device which includes an anode, a cathode, and an electrolyte, wherein the anode comprises aluminum and the electrolyte is a fluoroanion-containing composition.

According to some of any of the embodiments of the invention, the anode exhibits at least two of the peaks of an attenuated total reflection infrared spectrum as presented in Plot 8 of FIG. 9.

According to some of any of the embodiments of the invention, the anode is essentially devoid of a passivation layer.

According to some of any of the embodiments of the invention, the anode comprises fluorohydrogenate-metal species (HF-species).

According to some of any of the embodiments of the invention, the anode exhibits at least two peaks of an attenuated total reflection infrared spectrum having a wavenumber range selected from the group consisting of from $3150\ cm^{-1}$ to $2840\ cm^{-1}$, from $1110\ cm^{-1}$ to $800\ cm^{-1}$, from $2505\ cm^{-1}$ to $2200\ cm^{-1}$, from $1920\ cm^{-1}$ to $1600\ cm^{-1}$ and/or from $1170\ cm^{-1}$ to $870\ cm^{-1}$.

According to some of any of the embodiments of the invention, the anode comprises at least 99% aluminum.

According to some of any of the embodiments of the invention, the cathode is operatively associated with the anode by an electric connection.

According to some of any of the embodiments of the invention, the anode is intercalation anode for fluorohydrogenate-metal species (HF-species).

According to some of any of the embodiments of the invention, the anode is intercalation anode for metal ions.

According to some of any of the embodiments of the invention, the cathode is an air cathode.

According to some of any of the embodiments of the invention, the cathode is a metal oxide-containing cathode.

According to some of any of the embodiments of the invention, the metal oxide is selected from the group consisting of $MnO_2$ and $V_2O_5$.

According to some of any of the embodiments of the invention, the cathode is a metal sulfide cathode.

According to some of any of the embodiments of the invention, the cathode is intercalation cathode.

According to some of any of the embodiments of the invention, the cathode is conversion cathode.

According to some of any of the embodiments of the invention, the cathode is fluorinated cathode.

According to some of any of the embodiments of the invention, the cathode is metal fluorides cathode.

According to some of any of the embodiments of the invention, the cathode is metal fluorides selected from the group consisting of $CoF_2$, $CoF_3$, $FeF_2$, $FeF_3$, $CuF_2$, $MoF_5$, and $SnF_4$.

According to some of any of the embodiments of the invention, the cathode is chlorine cathode.

According to some of any of the embodiments of the invention, the cathode is sulfur cathode.

According to some of any of the embodiments of the invention, the electrochemical cell device is a rechargeable electrochemical cell having an initial capacity $C_0$ and a total capacity after n discharge/recharge cycles $\Sigma C_n$.

According to some of any of the embodiments of the invention, $\Sigma C_n$ is larger than $C_0$.

According to an aspect of some embodiments of the present invention, there is provided a process for fusing a first metal or a first metal alloy to a second metal or a second metal alloy, wherein at least one of the first metal or the second metal is a self-passivated metal, the process includes contacting a surface of the first metal and/or the second metal being the self-passivating metal with a fluoroanion-containing composition, to thereby obtain an activated metal surface, melting at least one of the first metal or the second metal, and/or optionally melting a filler metal so as to fill an interface between the first metal and the second metal, and cooling the first metal and the second metal or cooling the filler, to thereby fuse the first metal to the second metal.

According to some of any of the embodiments of the invention, the process further includes contacting a surface of the first metal or the second metal which is not the self-passivated metal with a fluoroanion-containing composition, to thereby obtain an activated metal surface.

According to some of any of the embodiments of the invention, the process further includes a filler metal, and the process includes contacting a surface of the filler metal with a fluoroanion-containing composition, to thereby obtain an activated metal surface.

According to some of any of the embodiments of the invention, the filler metal is a self-passivated metal.

According to some of any of the embodiments of the invention, the activated first, second and/or filler metal surface is essentially devoid of a passivation layer.

According to some of any of the embodiments of the invention, the process of fusing the metals presented herein is effected at a temperature lower than a melting temperature of the passivation layer.

According to some of any of the embodiments of the invention, the process of fusing the metals presented herein is effected at ambient atmosphere.

According to some of any of the embodiments of the invention, the activated metal surface of any of the first, second and/or filler treated metals comprises fluorohydrogenate-metal species (HF-species).

According to some of any of the embodiments of the invention, the activated metal surface of any of the first, second and/or filler treated metals exhibits at least two peaks in an attenuated total reflection infrared spectrum having a wavenumber range selected from the group consisting of from $3150\ cm^{-1}$ to $2840\ cm^{-1}$, from $1110\ cm^{-1}$ to $800\ cm^{-1}$, from $2505\ cm^{-1}$ to $2200\ cm^{-1}$, from $1920\ cm^{-1}$ to $1600\ cm^{-1}$ and/or from $1170\ cm^{-1}$ to $870\ cm^{-1}$.

According to some of any of the embodiments of the invention, one of the first metal or the second metal is selected from the group consisting of a self-passivated metal, a transition metal, a noble metal, a post-transition metal, a base metal, a poor metal, an alkaline earth metal, an alkaline metal, a lanthanide, an actinide and an alloy thereof.

According to some of any of the embodiments of the invention, the self-passivated metal is selected from the group consisting of aluminum, chromium, titanium and tantalum.

According to some of any of the embodiments of the invention, the self-passivated metal is aluminum.

According to some of any of the embodiments of the invention, the first metal alloy or the second metal alloy is a alloy steel.

According to some of any of the embodiments of the invention, the process includes welding, brazing and/or a soldering.

According to an aspect of some embodiments of the present invention, there is provided a method for depositing a first metal on a surface of a second metal, the method includes contacting the second metal with a fluoroanion-containing composition to thereby afford an activated metal surface, and depositing the first metal on the activated surface.

According to some of any of the embodiments of the invention, the method of metal deposition presented herein further includes separating the second metal from the fluoroanion-containing composition, placing the second metal in an electrolyte that comprises a source of the first metal, applying a cathodic potential or a cathodic current between the second metal while in the electrolyte and an electrode which is in an electrical communication with the electrolyte.

According to some of any of the embodiments of the invention, the method of metal deposition presented herein further includes adding a source of the first metal into the fluoroanion-containing composition.

According to some of any of the embodiments of the invention, the source is selected from the group consisting of a salt of the first metal, an oxide of the first metal, a sulfide of the first metal, a nitride of the first metal, an oxidized form of the first metal and any combination thereof.

According to some of any of the embodiments of the invention, the method further includes applying a cathodic potential or a cathodic current between the second metal while in contact with the fluoroanion-containing composition, and an electrode which is in an electrical communication with the fluoroanion-containing composition.

According to some of any of the embodiments of the invention, the second metal is a self-passivated metal.

According to some of any of the embodiments of the invention, the first metal is copper and the second metal comprises tantalum.

According to some of any of the embodiments of the invention, the method is effected without seeding the second metal with the first metal.

According to some of any of the embodiments of the invention, the fluoroanion-containing composition comprises a at least one $[(HF)_nF]^-$ species.

According to some of any of the embodiments of the invention, a molar concentration of the $[(HF)_nF]^-$ species is the fluoroanion-containing composition ranges from 0.01 percent to 50 percent.

According to some of any of the embodiments of the invention, the $[(HF)_nF]^-$ species is selected from the group consisting of $HF_2^-$, $H_2F_3^-$, $H_3F_4^-$, $H_4F_5^-$, $H_5F_6^-$, $H_6F_7^-$, $H_7F_8^-$ and any combination thereof.

According to some of any of the embodiments of the invention, the $[(HF)_nF]^-$ species is an oligofluorohydrogenate anion population represented by the formula $[(HF)_{2.3}F]^-$.

According to some of any of the embodiments of the invention, the fluoroanion-containing composition comprises a cation selected from the group consisting of a metal cation, an inorganic cation, an organic cation, a polyatomic cation, an organometallic cation, and any combination thereof.

According to some of any of the embodiments of the invention, the metal cation is selected from the group consisting of $K^+$, $Na^+$, $Ag^+$, $Ca^{2+}$, $Cu^{2+}$, $Fe^{2+}$, $Fe^{3+}$, $La^{+3}$, $Al^{3+}$ and any combination thereof.

According to some of any of the embodiments of the invention, the organometallic cation is selected from the group consisting of ferrocenium, an alkyloctamethylferrocenium and an alkylcobaltocenium.

According to some of any of the embodiments of the invention, the inorganic cation is selected from the group consisting of hydronium, ammonium, phosphonium, oxycation, N-oxoammonium and any combination thereof.

According to some of any of the embodiments of the invention, the organic cation is selected from the group consisting of an alkylammonium, a guanidinium, t-butyl cation, choline, tropylium, an alkylphosphonium, an alkylated oxycation, an alkylated N-oxoammonium, an N,N-dialkylated imidazolium cation, an N,N-dialkylated pyrrolidinium cation, an N,N-dialkylated piperidinium cation, an N-alky-pyridinium cation, 1-alkyl-3-methylimidazolium, 1-methyl-1-alkyl-pyrrolidinium, 1-methyl-1-alkyl-piperidinium, and any combination thereof.

According to some of any of the embodiments of the invention, the N,N-dialkylated imidazolium cation is selected from the group consisting of dimethyl-imidazolium, 1-ethyl-3-methyl-imidazolium, 1-propyl-3-methyl-imidazolium, 1-butyl-3-methyl-imidazolium, 1-pentyl-3-methyl-imidazolium, 1-hexyl-3-methyl-imidazolium, 1-ethyl-3-propyl-imidazolium, 1-ethyl-3-butyl-imidazolium and diethyl-imidazolium.

According to some of any of the embodiments of the invention, the N,N-dialkylated pyrrolidinium cation is selected from the group consisting of dimethyl-pyrrolidinium, 1-ethyl-1-methyl-pyrrolidinium, 1-propyl-1-methyl-pyrrolidinium, 1-butyl-1-methyl-pyrrolidinium, 1,1-diethyl-pyrrolidinium and 1-ethyl-1-propyl-pyrrolidinium.

According to some of any of the embodiments of the invention, the N,N-dialkylated piperidinium cation is selected from the group consisting of dimethyl-piperidinium, 1-ethyl-1-methyl-piperidinium, 1-propyl-1-methyl-piperidinium, 1-butyl-1-methyl-piperidinium, 1,1-diethyl-piperidinium and 1-ethyl-1-propyl-piperidinium.

According to some of any of the embodiments of the invention, the N-alky-pyridinium cation is selected from the group consisting of 1-methyl-pyridinium, 1-ethyl-pyridinium, 1-propyl-pyridinium, 1-butyl-pyridinium and 1-pentyl-pyridinium.

According to some of any of the embodiments of the invention, the fluoroanion-containing composition comprises a room temperature ionic liquid (a fluoroanion-RTIL).

According to some of any of the embodiments of the invention, the RTIL comprises an organic cation selected from 1-ethyl-3-methyl-imidazolium fluoroanion or 1-butyl-1-methyl-pyrrolidinium fluoroanion.

According to some of any of the embodiments of the invention, the RTIL is $EMIm(HF)_{2.3}F$ and/or $Pyr_{14}(HF)_{2.3}F$.

According to some of any of the embodiments of the invention, the fluoroanion-containing composition comprises a solvent selected from the group consisting of an organic solvent, an inorganic solvent, a polar solvent, a non-polar solvent, a protic solvent, an aprotic solvent, an ionic solvent, a non-ionic solvent, molten salts, ionic liquids and any miscible and/or immiscible combination thereof.

According to some of any of the embodiments of the invention, the fluoroanion-containing composition comprises a solvent selected from the group consisting of an alkyl carbonates, an ester, a lactone, an ether, a nitrile, an amide, a sulfoxide, a sulfone, an alcohol, a hydrocarbon, an aromatic hydrocarbons, a solid-state solvent, and any miscible and/or immiscible combination thereof.

According to some of any of the embodiments of the invention, the fluoroanion-containing composition comprises a solvent selected from the group consisting of propylene carbonate (PC), tetraglyme (TEGDME) and dimethyl sulfide (DMS).

According to some of any of the embodiments of the invention, the fluoroanion-containing composition comprises an ionic liquid selected from the group consisting of [EMIm][TFSI], EMIm][Solfanate] and [EMIm][Trifluroimide].

According to some of any of the embodiments of the invention, the fluoroanion-containing composition further comprises a fluoroanion salt.

According to some of any of the embodiments of the invention, the fluoroanion salt is potassium dihydrogen trifluoride and/or potassium bifluoride.

According to some of any of the embodiments of the invention, the fluoroanion-containing composition further comprises a fluoroanion-RTIL.

According to some of any of the embodiments of the invention, fluoroanion-RTIL is $EMIm(HF)_{2.3}F$ and/or $Pyr_{14}(HF)_{2.3}F$.

According to some of any of the embodiments of the invention, the fluoroanion-containing composition further comprises an additive selected from the group consisting of a metal salt, a metal oxide, a thickener, a gelling agent, a polymer, a monomer, a cross-linking agent, a plasticizer, a diluent, a humectant, a surface-active agent, a rheology modifying agent, a catalyst, an accelerator, an inhibitor, a suppressant, and any combination thereof.

According to some of any of the embodiments of the invention, the fluoroanion-containing composition is in a form of a solution, a liquid, a gel, a paste, a suspension, an emulsion, a colloid, a semi-solid, a solid and any combination thereof.

According to some of any of the embodiments of the invention, the fluoroanion-containing composition is embedded in a composition-of-matter that comprises a liquid and/or a polymer and/or a biopolymer and/or a membrane and/or a porous matrix and/or a gel and/or a solid.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to chemistry of metals, and more particularly, but not exclusively, to a method of activating a surface of self-passivated metals, such as aluminum, to a method of reactivating metal oxides and to uses of these methods in, for example, electrochemical cells.

The principles and operation of the present invention may be better understood with reference to the figures and accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The present inventors have considered RTIL electrolytes and electrolytes containing ionic liquids as advantageous compared to classical aqueous electrolytes, particularly in systems that use self-passivating metals, such as aluminum, which are not prone to the parasitic hydrogen generation reaction in these solvents. Additionally, the RTIL media provides the thermodynamic conditions for possible aluminum deposition and therefore producing rechargeable aluminum and other self-passivating metals based power sources.

RTILs are considered environmentally friendly compared to regularly used organic solutions. Their low vapor pressure, even at considerably elevated temperatures, provides advantages such as fire and explosion safety, easy containment, transportation and recycling. The large number of anion-cation combinations allow considerable variation in their properties, and the high intrinsic ionic conductivity, non-flammability, thermal and chemical stability with considerably large electrochemical windows (in some cases as much as 5V), make RTILs suitable candidates for high end electrolytes in electrochemical applications.

While considering the limitations associated with commercial production of aluminum-based batteries, and particularly aluminum-air batteries, and while searching for improved aluminum-based batteries, the present inventors have surprisingly uncovered that aluminum undergoes de-passivation, or activation, presumably by removal of oxides and other surface passivating species found in passivating layers, when exposed to oligofluorohydrogenate anions (fluoroanions) which form a part of some room temperature ionic liquids (RTILs) comprising oligofluorohydrogenate anions, also referred to herein as fluoroanion-RTIL.

As discussed hereinabove, while silica is soluble in hydrofluoric acid (HF), alumina is not. Thus, one would expect alumina to exhibit the same inferior solubility/reactivity in the presence of oligofluorohydrogenate anions, compared to that of silica; however, the present inventors have surprisingly found that alumina dissolves or reacts with fluoroanion-containing compositions at rates similar to those of silica.

Figure 8:
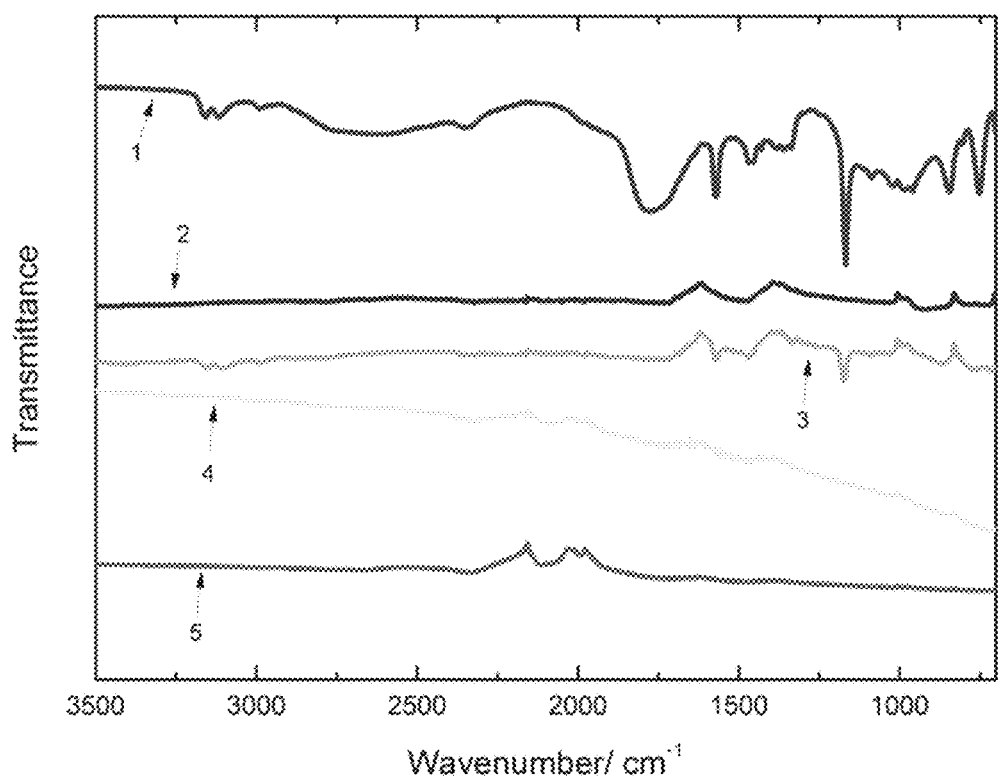
FIG. 8 presents comparative plots showing the transmittance as a function of wavelength, resulting from an attenuated total reflection (ATR) infrared scan of a sample of pristine $EMIm(HF)_{2.3}F$ RTIL (Plot 1), a sample of an unexposed aluminum (Plot 2), a sample of an unexposed silicon wafer (Plot 3), a sample of aluminum after 1 hour exposure to $EMIm(HF)_{2.3}F$ RTIL (Plot 4) and a sample of a silicon wafer after 1 hour exposure to $EMIm(HF)_{2.3}F$ RTIL (Plot 5)
Figure 9:
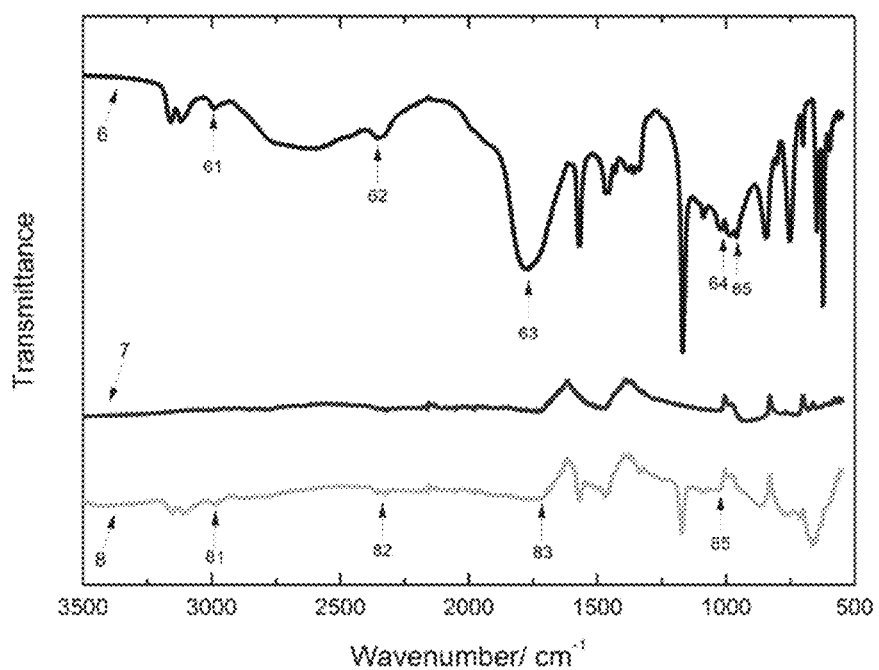
FIG. 9 presents comparative plots showing the transmittance as a function of wavelength, resulting from an attenuated total reflection (ATR) infrared scan of a sample of $EMIm(HF)_{2.3}F$ RTIL (Plot 6), wherein peaks 61 and 65, associated with the $H_3F_4^-$ species, have a wavenumber of about 2990 $cm^{-1}$ and about 960 $cm^{-1}$ respectively and peaks 62, 63 and 64, associated with the $H_2F_3^-$ species, have a wavenumber of about 2355 $cm^{-1}$, about 1770 $cm^{-1}$ and about 1020 $cm^{-1}$ respectively, and of a sample of an unexposed aluminum (Plot 7), and a sample of aluminum after 1 hour exposure to $EMIm(HF)_{2.3}F$ RTIL (Plot 8), wherein peaks 81, 82, 84 and 85 correspond to peaks 61, 63, 64 and 65 in Plot 6 respectively.
Figure 10A:
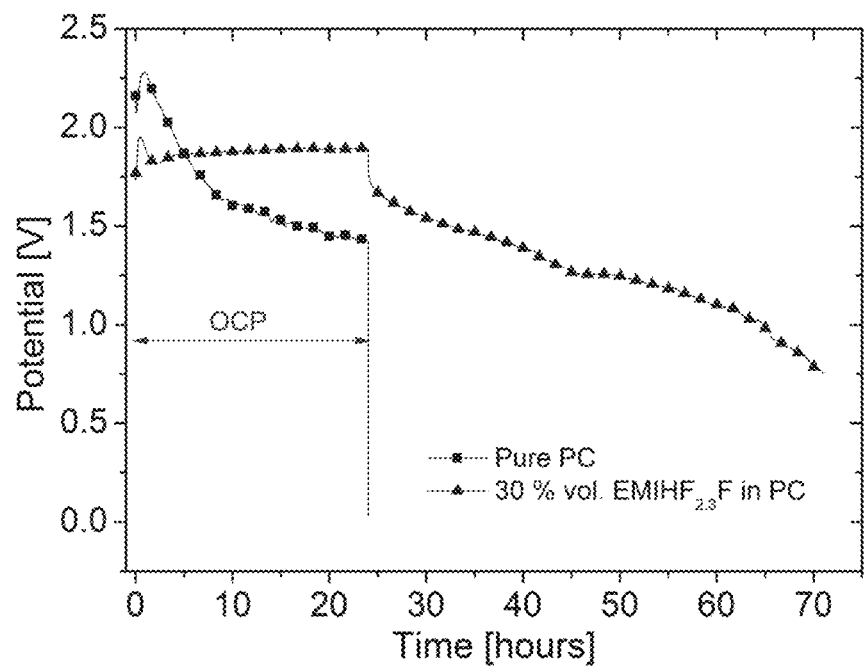
FIGS. 10A-F present comparative plots showing the potential as a function of time obtained in a potentiodynamic experiment conducted in a three-electrode aluminum-based electrochemical cell showing the cell behavior at discharge current density of 0.1 mA/cm$^2$, as measured for a fluoroanion-containing composition (electrolyte) comprising propylene carbonate (FIG. 10A), tetraethylene glycol dimethyl ether (FIG. 10B) and dimethyl sulfide (FIG. 10C), [EMIm][TFSI](FIG. 10D), [EMIm][Trifluroimide] (FIG. 10E) and [EMIm][Solfanate] (FIG. 10F) serving as a solvent/diluent and 30% by volume [EMIm][(HF)$_{2.3}$F] mixed therewith and serving as a source of fluoroanion species (plot marked in triangles), and measured for the pristine solvent (plot marked in squares), whereas the aluminum was allowed to be in contact with the fluoroanion-containing composition for the first 24 hours prior to discharging the cell.
Figure 10B:
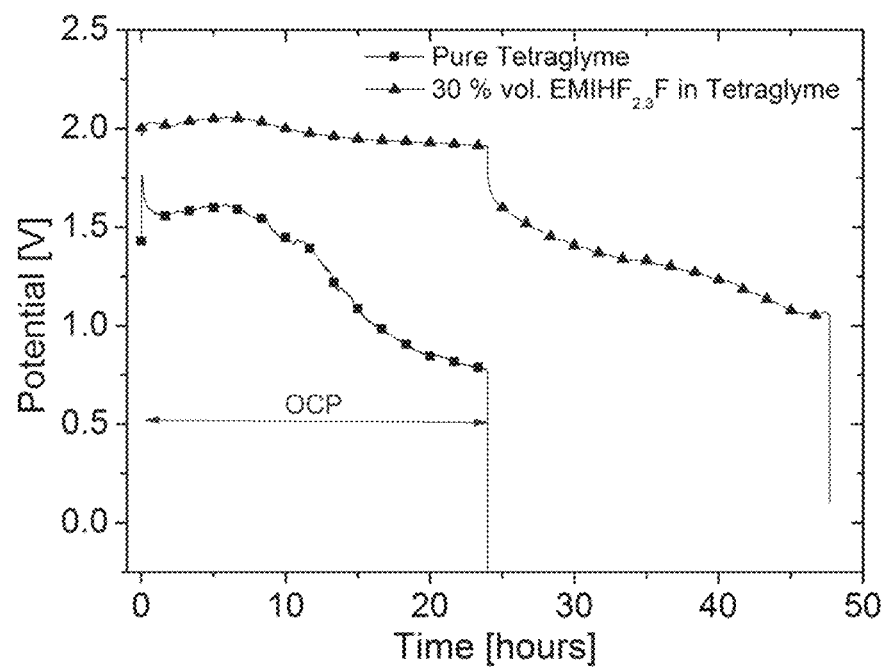
Figure 10C:
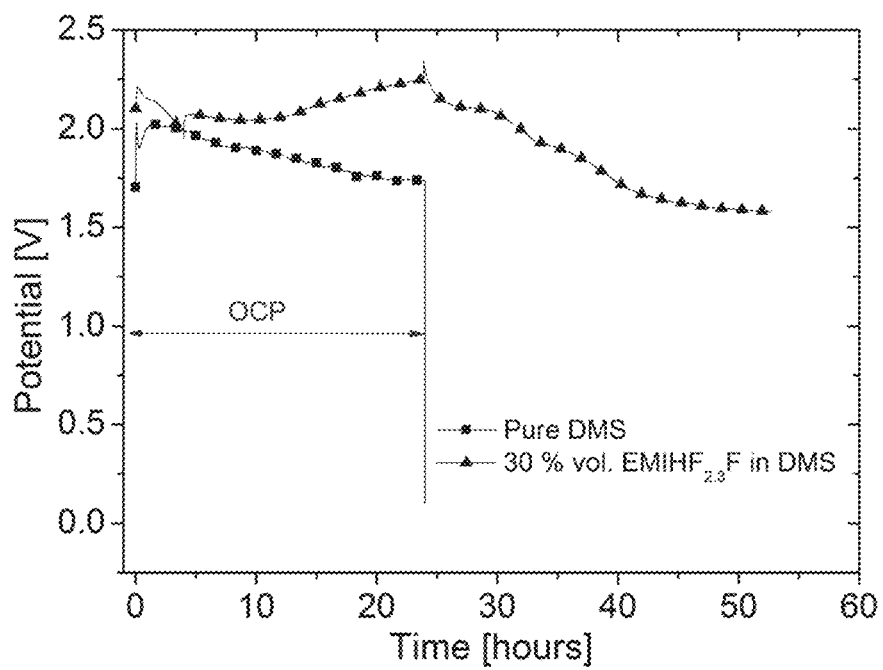
Figure 10D:
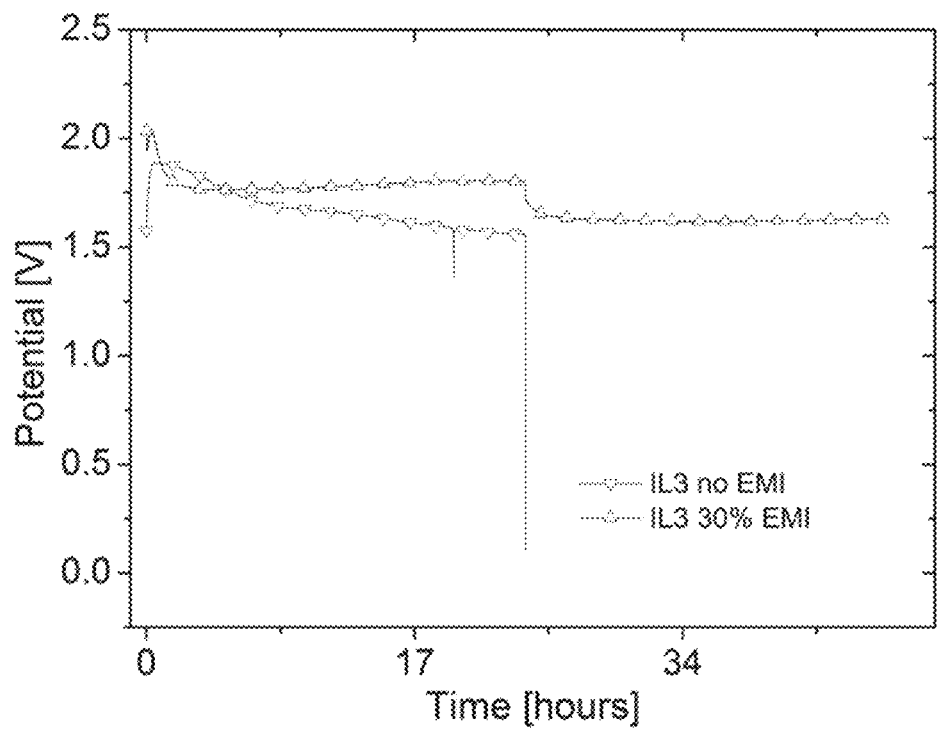
Figure 10E:
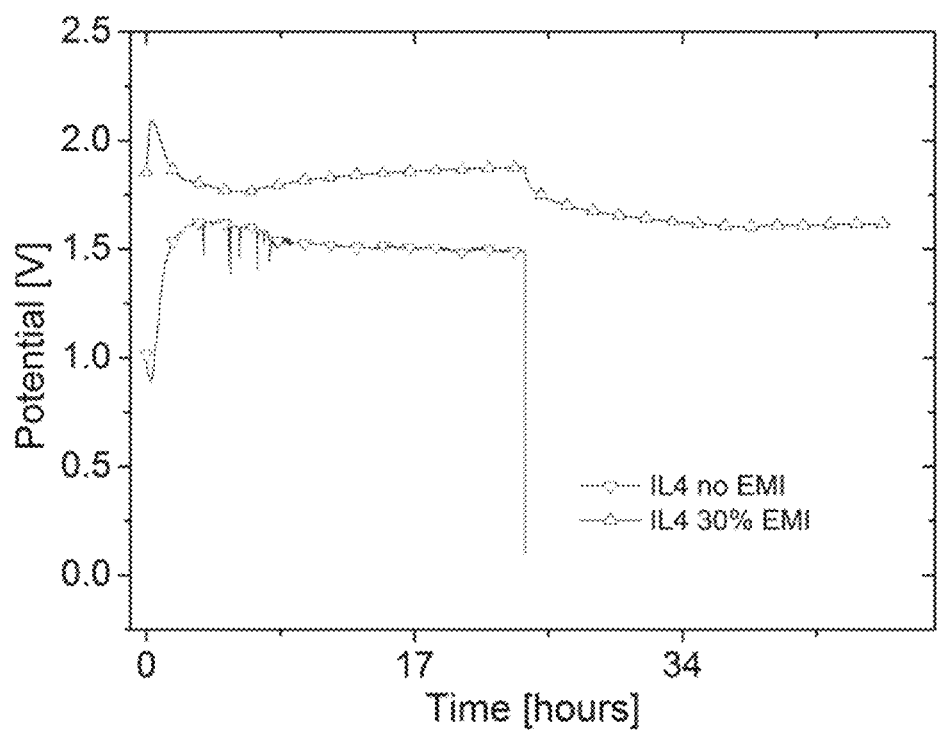
Figure 10F:
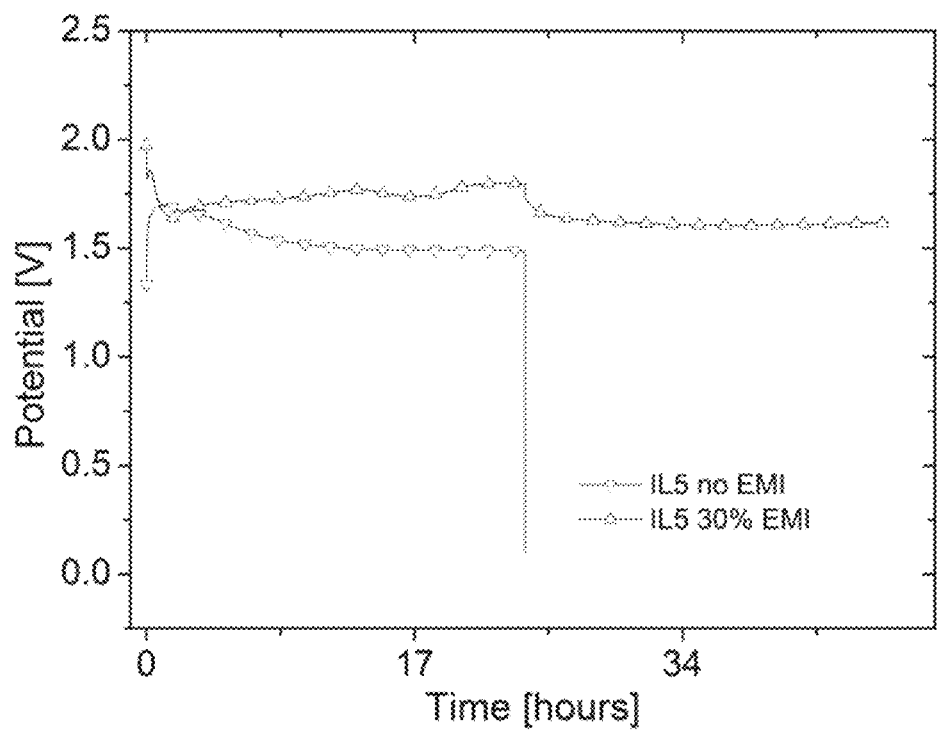

While further investigating the activation effect of an exemplary fluoroanion-containing composition used as an electrolyte on the surface of aluminum anode, the present inventors have subjected aluminum samples to attenuated total reflection (ATR) infrared spectroscopy analysis before and after exposure of the metal to the fluoroanion-containing electrolyte, and found distinct spectral features which correspond to spectral features of the fluoroanion-containing electrolyte (see, Example 5 and FIGS. 8 and 9). These clear and measurable spectral features were exhibited in the aluminum sample after exposure to the fluoroanion-containing composition, and were not exhibited in a silicon sample under essentially identical conditions, hence they were seen as fingerprints of the chemical modification of the treated surface. Without being bound by any particular theory, it has been speculated that these spectral features result from the "HF-species" which are associated with the activated aluminum on the anode's surface, hence it has been assumed that the surface of the aluminum anode has been modified at its end-group species by reactive HF-species in addition to, or preferably instead of, the inert oxygen species and other passivating species.

Further studies aimed at revealing the mechanism behind aluminum activation by contact with a fluoroanion-containing composition have lead the present inventors to the surprising finding that the self-passivated metal indeed undergoes a chemical transformation of its surface from a passive surface to a reactive surface. It was further surprisingly found that the activated (treated) surface is substantially stable under ambient conditions, which would otherwise render passive an untreated metal.

It has further been uncovered that although both aluminum and silicon are naturally covered with a passivating layer of oxides formed in ambient conditions, and the oxides of both is solubilized in the presence of fluoroanions, silicon reacts differently with fluorohydrogenate anions, compared to aluminum and other self-passivating metals. The most prominent difference between silicon and other self-passivating metals is expressed in the fluoroanion-treated surface and the formation of reactive HF-species, which are formed on the fluoroanion-treated surface of aluminum and other self-passivating metals, but fail to form in the case of silicon. While reducing the present invention to practice, the present inventors have successfully demonstrated that aluminum, otherwise a passive metal, can be treated with fluorohydrogenate anions so as to, for example, have a highly adherent deposition of various metals thereon, can be welded without using an inert atmosphere, and can be used as fuel in electrochemical cells.

While further investigating the surprising effect of fluoroanion-RTIL on aluminum, the present inventors have attempted to activate the surface of other self-passivating metals, such as titanium and tantalum, and the surface of self-passivating alloys, such as stainless steel, and have found that the treatment of these substances affords a highly reactive substance.

Passivation, in general chemistry, refers to a material becoming "passive", namely less affected by environmental factors such as air and water. Passivation involves the formation of a shielding outer-layer of corrosion, which can be applied synthetically or spontaneously in nature. The inert surface layer, referred to as "native oxide layer", is typically an oxide, a nitride or a sulfide, with a thickness of a monolayer (1-3 Å) for a noble metal like platinum, about 15 Å for silicon (a metalloid), and about 50 Å for aluminum (a post-transition or poor metal) after several years of exposure to ambient conditions.

The term "self-passivation" or "natural-passivation", as used herein interchangeably in the context of metals or metal alloys, refers to the spontaneous formation of a thin film of a corrosion product known on a metal's surface upon exposure thereof to ambient conditions (e.g., air, water and soil at moderate pH), which acts as a barrier to further corrosion/oxidation. The chemical composition and microstructure of the passivating film are different from the underlying metal.

In the context of embodiments of the present invention, the term "self-passivating metal" encompasses at least aluminum, chromium, titanium and tantalum.

In the context of embodiments of the present invention, the term "diffusion barrier metal", including nitrides, carbides and alloys thereof, encompasses aluminum, copper, gold, chromium, nickel, nichrome, tantalum, hafnium, niobium, zirconium, vanadium, tungsten, tantalum nitride, indium oxide, copper silicide, tungsten nitride, and titanium nitride.

In the context of embodiments of the present invention, the term "transition metal" encompasses zinc, molybdenum, cadmium, scandium, titanium, vanadium, chromium, manganese, iron, cobalt, nickel, copper, yttrium, zirconium, niobium, technetium, ruthenium, rhodium, palladium, silver, hafnium, tantalum, tungsten, rhenium, osmium, iridium, platinum, gold, mercury, rutherfordium, dubnium, seaborgium, bohrium, hassium and copernicium.

In the context of embodiments of the present invention, the term "noble metal" encompasses ruthenium, rhodium, palladium, silver, osmium, iridium, platinum, gold, mercury, rhenium and copper.

In the context of embodiments of the present invention, the term "post-transition metal" encompasses aluminum, gallium, indium, tin, thallium, lead, bismuth and polonium.

In the context of embodiments of the present invention, the term "base metal" encompasses iron, nickel, lead, zinc and copper.

In the context of embodiments of the present invention, the term "poor metal" encompasses aluminum, gallium, indium, thallium, tin, lead, bismuth, polonium, ununtrium, flerovium, ununpentium and livermorium.

In the context of embodiments of the present invention, the term "alkaline earth metal" encompasses beryllium, magnesium, calcium, strontium, barium and radium.

In the context of embodiments of the present invention, the term "lanthanide" encompasses lanthanum, cerium, praseodymium, neodymium, promethium, samarium, europium, gadolinium, terbium, dysprosium, holmium, erbium, thulium, ytterbium and lutetium.

In the context of embodiments of the present invention, the term "actinide" encompasses actinium, thorium, protactinium, uranium, neptunium, plutonium, americium, curium, berkelium, californium, einsteinium, fermium, mendelevium, nobelium and lawrencium.

One of the alloys that can be activated according to embodiments of the present invention is alloy steel. Alloy steel is steel (iron and carbon) to which additional metal elements, such as manganese, nickel, chromium, molybdenum, aluminum, boron, titanium, vanadium and niobium, have been added thereto in order to modify the characteristics of the steel.

In the context of embodiments of the present invention, the term "alkali metal" encompasses lithium, sodium, potassium, rubidium, caesium and francium.

In the context of embodiments of the present invention, the term "metalloid" encompasses boron, germanium, arsenic, antimony, tellurium, selenium, polonium and astatine.

In the context of embodiments of the present invention, the term "quasi-metal" encompasses meitnerium, darmstadtium, roentgenium, ununtrium, flerovium, ununpentium and livermorium.

A metal can be in several oxidation states, which are denoted $M^n$ wherein the integer n denoted the oxidation number. Thus, a metal in its metallic state has an oxidation number zero ($M^0$). A reduced metal has an oxidation number greater than 0, namely $M^+$, $M^{+2}$, $M^{+3}$ etc., and is generally found as a cation, in a metal-coordination complex, in a metal oxide, and in other metal-containing compounds.

As known in the art, a passivation layer of a metal can be removed mechanically and/or chemically, to expose a pristine surface of the metal, however, these processes generally do not render the surface of the metal more reactive or protected from future and immediate re-passivation if not kept under protective conditions. In the context of embodiments of the present invention, removal of the passivation layer off the surface of a metal using a fluoroanion-containing composition, and the modification of the surface of the metal from passive to reactive as a result of the fluoroanion-containing composition, is regarded as activation.

In some embodiment of the present invention, the fluoroanion-containing composition is an electrolyte. In some embodiment, the fluoroanion-containing composition is a metal activation (or de-passivation) treatment composition. In some embodiment, the fluoroanion-containing composition is a welding, fusing, brazing, joining, soldering, connecting composition.

The term "electrolyte", is used herein to describe an electrically conductive composition comprising electrostatically charged species, such as ions. In some embodiments, the electrolyte is a solution, a liquid, a gel, a paste, a suspension, an emulsion, a colloid, a semi-solid, a solid or a composition-of-matter comprising liquids and/or gels and/or solids. In some embodiments, the electrolyte comprises an aqueous solution or an organic solution or a mixture thereof. In the context of the present embodiments, an electrolyte comprises fluoroanion species.

Fluoroanion-Containing Composition:

The terms "fluoroanion", "oligofluorohydrogenate" and "oligo hydrogen fluoride" as used interchangeably herein throughout in any one of the embodiments described herein, refers to a class of anions that comprise fluorine and hydrogen and represented by the formula $[(HF)_nF]^-$ for n=1, 2, 3, 4, 5, 7, 8, 9, 10 and so on; namely for n ranging from 1-7, the oligofluorohydrogenate anions are $HF_2^-$, $H_2F_3^-$, $H_3F_4^-$, $H_4F_5^-$, $H_5F_6^-$, $H_6F_7^-$, $H_7F_8^-$ respectively. It is noted herein that the use of square parentheses for any ion species throughout the present invention is optional.

Without being bound by any particular theory, it is assumed that the presence and distribution of the various oligofluorohydrogenate anions depends on the starting materials and the process of preparation of the oligofluorohydrogenate. It is further assumed that the various oligofluorohydrogenate anions play different roles in the interaction with metal, metal ions, metal oxides and other forms of metal-based compounds, as will be described hereinbelow.

An exemplary fluoroanion combination, or population of oligofluorohydrogenate anions, can be represented by the formula $[(HF)_{2.3}F]^-$ wherein the non-integer n value 2.3 denotes a population distribution of about 30% of the $[H_3F_4]^-$ or $[(HF)_3F]^-$ species and 70% of the $[H_2F_4]^-$ or $[(HF)_2F]^-$ species.

It is noted that oligofluorohydrogenate anions in a non-aqueous environment, according to some embodiments of the present invention, were found to have a reactivity profile which is altogether different than the reactivity profile of HF (hydrofluoric acid). In particular, aqueous HF is a neutral species, and although some charged oligofluorohydrogenate anions could be found in aqueous HF solutions, particularly $HF_2^-$, these are unstable intermediates and transient species which cannot amount to substantial concentration before decomposing back to neutral compounds. In sharp contrast, oligofluorohydrogenate anions in non-aqueous environment are mostly anionic higher order oligofluorohydrogenates. HF, being a neutral and altogether different species than a oligofluorohydrogenate or a fluoroanion, exhibits different chemistry and reactivity towards metals and metal oxides.

According to some embodiments of the present invention, the fluoroanion-containing composition is essentially devoid of neutral HF species, or essentially devoid of HF.

According to some embodiments of the present invention, a composition which comprises fluoroanion species as a negatively charged component therein is referred to herein as a "fluoroanion-containing composition". A fluoroanion-containing composition can be in the form of a solution, a liquid, a gel, a paste, a suspension, an emulsion, a colloid, a semi-solid, a solid or a composition-of-matter comprising liquids and/or polymers/biopolymers/membranes and/or porous matrices and/or gels and/or solids and fluoroanion species embedded therein. It is noted that the presently claimed fluoroanion-containing composition can exhibit any viscosity value and any shear force value, according to the application and the use thereof.

According to some embodiments of the present invention, the positively charged component of the fluoroanion-containing composition is any form of a cation, such as, for non-limiting examples, a metal cation, an inorganic cation, an organic cation, a polyatomic cation, an organometallic cation, and any combination thereof.

A "metal cation", according to embodiments of the present invention, is an atom of a metal having fewer electrons than protons. Exemplary metal cations include, without limitation, $K^+$, $Na^+$, $Ag^+$, $Ca^{2+}$, $Mg^{2+}$, $Cu^{2+}$, $Fe^{2+}$, $Fe^{3+}$, $La^{+3}$, $Al^{3+}$ and the likes, whereas any metal cation and any oxidation state that gives the ion a net positive electrostatic charge is contemplated within the scope of the term. Metal cations can also be referred to as inorganic cations.

An "inorganic cation", according to some embodiments of the present invention, is typically a polyatomic cation (a cation which has more than one atom), that does not include a carbon atom. Exemplary inorganic cations include, without limitation, ammonium ($NH^{4+}$), phosphonium ($PH^{4+}$) and hydronium ($H_3O^+$), an oxycation and an N-oxoammonium.

An "organometallic cation", according to embodiments of the present invention, is a cation which comprises a coordinated metal in a complex with one or more ligands, wherein the complex has a net positive charge. Exemplary organometallic cations include ferrocenium, alkyloctamethylferrocenium cations, cobaltocenium ($[Co(C_5H_5)_2]^+$) and methyl cobaltocenium.

An "organic cation", according to embodiments of the present invention, is a cation which comprises carbon, and optionally further comprises oxygen, nitrogen, sulfur and hydrogen atoms, typically forming polyatomic species having a net positive charge. Organic cations are typically polyatomic cations. Exemplary organic cations include, without limitation, quaternary amines and alkylammonium ($NR^{3+}$, with R being an alkyl), such as choline (an exemplary biocompatible cation), guanidinium ($C(NH_2)_3^{+3}$), t-butyl cation ($C(CH_3)_3^+$), tropylium ($C_7H_7^+$), alkylphosphonium ($PR^{4+}$, with R being an alkyl), an alkylated oxycation, an alkylated N-oxoammonium, N,N-dialkylated imidazolium (also referred to herein as 1-alkyl-3-alkyl-imidazolium) cations, N,N-dialkylated pyrrolidinium (also referred to herein as 1-alkyl-1-alkyl-pyrrolidinium) cations, N,N-dialkylated piperidinium (also referred to herein as 1-alkyl-1-alkyl-piperidinium) cations and N-alky-pyridinium (also referred to herein as 1-alky-pyridinium) cations.

In some embodiments, the fluoroanion-containing composition is an ionic liquid. In some embodiments, the ionic liquid is a room temperature ionic liquid (RTIL), referred to herein as "fluoroanion-RTIL". Hence, the term "fluoroanion-RTIL", as used herein throughout, and for any one of the embodiments described herein, refers to a family of room temperature ionic liquids wherein at least some of the anion species comprises oligofluorohydrogenate anions such as, for example, $[(HF)_{2.3}F]^-$ fluoroanion species. Typically, fluoroanion-RTILs further comprise an organic cation.

One exemplary fluoroanion-RTIL, which is a fluoroanion-containing composition according to some embodiments of the present invention, is $EMIm(HF)_{2.3}F$ which comprises [1-ethyl-3-methylimidazolium]$^+$ cation and $[(HF)_{2.3}F]^-$ anions. $EMIm(HF)_{2.3}F$ is also known as EMIm oligo hydrogen fluoride, $EMI.(HF)_{2.3}F$ or $EMIm(HF)_{2.3}F$). It is noted that RTILs based on 1-ethyl-3-methyl-imidazolium (EMIm) cation typically exhibit low viscosity and high conductivity. The exemplary fluoroanion-RTIL $EMIm(HF)_{2.3}F$, consists of a 1-ethyl-3-methylimidazolium cation and the $[(HF)_{2.3}F]^-$ anion, as illustrated in Scheme 1 below wherein R=ethyl. The synthesis of $EMIm(HF)_{2.3}F$ RTIL by a reaction with hydrogen fluoride was reported by Hagiwara, R. et al. [*J. Electrochem. Soc.* 149, 2002, D1]. As discussed hereinabove, the denotation 2.3 in the fluorohydrogenate anion does not mean to be a non-integer but rather denote a mixture of the $(HF)_2F^-$ and the $[(HF)_3F]^-$ species, hence $EMIm(HF)_{2.3}F$ can also be denoted $EMIm:(HF)_2F:(HF)_3F$.

Scheme 1

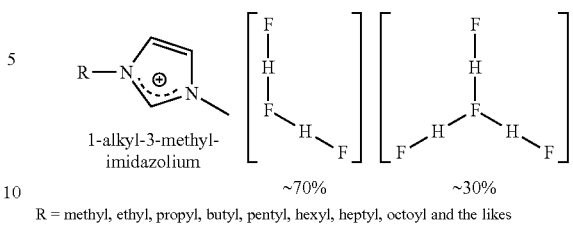

R = methyl, ethyl, propyl, butyl, pentyl, hexyl, heptyl, octoyl and the likes

Exemplary organic cations of the RTIL, according to some embodiments of the present invention, can be based on, without limitation, N,N-dialkylated imidazolium cations, N,N-dialkylated pyrrolidinium cations, N,N-dialkylated piperidinium cations and N-alky-pyridinium cations. According to some embodiments, any combination of a fluoroanion species, an additional RTIL anion and any RTIL cation presented hereinabove is contemplated as well.

For example, a 1-alkyl-3-alkyl-imidazolium cation may exhibit two identical or two different N-alkyl substituents which can be selected from the group comprising methyl, ethyl, propyl, butyl, pentyl, hexyl, heptyl, octoyl and the likes. Exemplary fluoroanion-RTIL having a 1-alkyl-3-alkyl-imidazolium cation include dimethyl-imidazolium fluoroanion ($[DMIm][(HF)_{2.3}F]$), 1-ethyl-3-methyl-imidazolium fluoroanion ($[EMIm][(HF)_{2.3}F]$), 1-propyl-3-methyl-imidazolium fluoroanion ($[PrMIm][(HF)_{2.3}F]$), 1-butyl-3-methyl-imidazolium fluoroanion ($[BMIm][(HF)_{2.3}F]$), 1-pentyl-3-methyl-imidazolium fluoroanion ($[PeMIm][(HF)_{2.3}F]$), 1-hexyl-3-methyl-imidazolium fluoroanion ($[HMIm][(HF)_{2.3}F]$), 1-ethyl-3-propyl-imidazolium fluoroanion ($[EPIm][(HF)_{2.3}F]$), 1-ethyl-3-butyl-imidazolium fluoroanion ($[EBIm][(HF)_{2.3}F]$), diethyl-imidazolium fluoroanion ($[DEIm][(HF)_{2.3}F]$), and the likes.

Exemplary fluoroanion-RTIL having a N,N-dialkyl-pyrrolidinium cation include dimethyl-pyrrolidinium fluoroanion ($DMPyr(HF)_{2.3}F$ or $Pyr_{11}(HF)_{2.3}F$), 1-ethyl-1-methyl-pyrrolidinium fluoroanion ($EMPyr(HF)_{2.3}F$ or $Pyr_{12}(HF)_{2.3}F$), 1-propyl-1-methyl-pyrrolidinium fluoroanion ($PMPyr(HF)_{2.3}F$ or $Pyr_{13}(HF)_{2.3}F$), 1-butyl-1-methyl-pyrrolidinium fluoroanion ($BMPyr(HF)_{2.3}F$ or $Pyr_{14}(HF)_{2.3}F$), 1,1-diethyl-pyrrolidinium fluoroanion ($DEPyr(HF)_{2.3}F$ or $Pyr_{22}(HF)_{2.3}F$), 1-ethyl-1-propyl-pyrrolidinium fluoroanion ($EPPyr(HF)_{2.3}F$ or $Pyr_{23}(HF)_{2.3}F$), and the likes.

Exemplary fluoroanion-RTIL having a N,N-dialkyl-piperidinium cation include dimethyl-piperidinium fluoroanion ($DMPip(HF)_{2.3}F$ or $Pip_{11}(HF)_{2.3}F$), 1-ethyl-1-methyl-piperidinium fluoroanion ($EMPip(HF)_{2.3}F$ or $Pip_{12}(HF)_{2.3}F$), 1-propyl-1-methyl-piperidinium fluoroanion ($PMPip(HF)_{2.3}F$ or $Pip_{13}(HF)_{2.3}F$), 1-butyl-1-methyl-piperidinium fluoroanion ($BMPip(HF)_{2.3}F$ or $Pip_{14}(HF)_{2.3}F$), 1,1-diethyl-piperidinium fluoroanion ($DEPip(HF)_{2.3}F$ or $Pip_{22}(HF)_{2.3}F$), 1-ethyl-1-propyl-piperidinium fluoroanion ($EPPip(HF)_{2.3}F$ or $Pip_{23}(HF)_{2.3}F$), and the likes.

Exemplary fluoroanion-RTIL having an N-alky-pyridinium cation includes 1-methyl-pyridinium fluoroanion, 1-ethyl-pyridinium fluoroanion, 1-propyl-pyridinium fluoroanion, 1-butyl-pyridinium fluoroanion, 1-pentyl-pyridinium fluoroanion, and the likes.

According to some embodiments, the fluoroanion-RTIL is $EMIm(HF)_{2.3}F$ or $Pyr_{14}(HF)_{2.3}F$.

According to some embodiments of the present invention, the fluoroanion-containing composition comprises a fluoroanion-RTIL, according to embodiments of the present invention, and one or more solvents. In the context of embodiments of the present invention, the solvent is any organic or inorganic solvent known in the art, including polar, non-polar, protic, aprotic, ionic and non-ionic solvents and any miscible and/or immiscible combination thereof.

Exemplary solvents include, without limitation, alkyl carbonates (such as ethylene carbonate, propylene carbonate, dimethyl carbonate, diethyl carbonate), esters and lactones (such as γ-butyrolactone and γ-valerolactone), ethers (such as tri- and teraethylene glycol dimethyl ether), nitriles (such as acetonitrile), amides (such as N,N-dimethylacetamide and dimethylformamide), sulfoxides (such as DMSO), sulfones (such as ethyl methyl sulfone), alcohols (such as methanol, ethanol, isopropanol), hydrocarbons (such as pentane, hexane, cyclohexane), aromatic hydrocarbons (such as benzene, toluene), solid-state solvents (such as polyethylene oxide), and any miscible and/or immiscible combination thereof.

Exemplary non-polar solvents include, without limitation, hexane, benzene, toluene, 1,4-dioxane, chloroform, diethyl ether and dichloromethane (DCM).

Exemplary polar aprotic solvents include, without limitation, tetrahydrofuran (THF), ethyl acetate (EtOAc), acetone, dimethylformamide (DMF), acetonitrile (MeCN) and dimethyl sulfoxide (DMSO).

Exemplary polar protic solvents include, without limitation, formic acid, n-butanol, isopropanol (IPA), nitromethane, ethanol (EtOH), methanol (MeOH), 2,2,2-trifluoroethanol (also known as TFE or trifluoroethyl alcohol), acetic acid (AcOH), tetraethylene glycol dimethyl ether (also referred to herein as tetraglyme and TEGDME) and water.

Tetraethylene glycol dimethyl ether (also called tetraglyme) is a polar aprotic solvent with excellent chemical and thermal stability. Its high boiling point and stability makes it an ideal candidate for separation processes and high temperature reactions. TEGDME is also used in lithium-ion battery technology and combined with trifluoroethanol as a working pair for organic absorption heat pumps.

In some embodiments, the fluoroanion-containing composition comprises water.

In some embodiments, the fluoroanion-containing composition is substantially devoid of water. In some embodiments, the water content in the fluoroanion-containing composition is less than 90% by mass (weight), or less than 80%, 70%, 60%, 50%, 40%, 30%, 20%, 10%, 5%, 1%, 0.1%, or less than 0.01% by mass of the total mass of the fluoroanion-containing composition.

In some embodiments, the fluoroanion-containing composition comprises a fluoroanion salt and a solvent, whereas the fluoroanion salt comprises fluoroanion species and one or more cation, dissolved in a solvent, as these terms are defined herein. Exemplary fluoroanion salts include, without limitation, potassium dihydrogen trifluoride and potassium bifluoride.

In some embodiments, the fluoroanion-containing composition comprises other types of anions, such as halides (such as $Cl^-$, $Br^-$, $I^-$), organic and inorganic polyatomic anions (such as $AlCl_4^-$, $Al_2Cl_7^-$, $B(CN)_4^-$, $C(CN)_3^-$, $N(CN)_2^-$, $NO_3^-$, $BF_4^-$, $PF_6^-$) and other anions such as bistriflimide (also known as bis(trifluoromethane)sulfonimide and colloquially as TFSI or $[(CF_3SO_2)_2N]^-$).

In some embodiments, the fluoroanion-containing composition is a fluoroanion-RTIL, a fluoroanion-RTIL in an ionic liquid as diluent, a fluoroanion salt in an ionic liquid as a solvent, a fluoroanion salt in a non-ionic solvent, and any combination thereof. Hence, the fluoroanion-containing composition, according to some embodiments of the present invention, comprises a fluoroanion-RTIL and/or an ionic liquid (comprising anions other than fluoroanion) and/or fluoroanion salt and/or a solvent, as long as the composition includes a fluoroanion species, as defined herein.

The molar content of the fluoroanion species in the fluoroanion-containing composition, according to some embodiments of the present invention, ranges from 0.01% to 50% (maximal molar contents considering the cation). The molar content of the fluoroanion species in the fluoroanion-containing composition, according to some embodiments of the present invention, is at least 0.01%, 0.1%, 1%, 5%, 10%, 15%, 20%, 25%, 30%, 35%, 40% or at least 45%.

Exemplary and non-limiting fluoroanion-containing compositions include:

A fluoroanion-RTIL such as $EMIm(HF)_{2.3}F$ or $Pyr_{14}(HF)_{2.3}F$;

A fluoroanion-RTIL, such as $EMIm(HF)_{2.3}F$, mixed with an RTIL, such as 1-ethyl-3-methylimidazolium hexafluorophosphate ($[EMIm][PF_6]$);

A fluoroanion-RTIL, such as $EMIm(HF)_{2.3}F$, mixed with a polar aprotic solvent, such as dimethyl Sulfide (DMS), N,N-dimethyl formamide (DMF) or dimethyl solfoxide (DMSO);

Fluoroanion salts, such as potassium dihydrogen trifluoride and potassium bifluoride, dissolved in an RTIL, such as 1-butyl-3-methylimidazolium trifluoroborate ($[BMIM][BF_3]$), or a biocompatible RTIL such as choline nitrate ($[Ch][NO_3]$);

and any combination of the above.

According to some embodiments of the present invention, the fluoroanion-containing composition further comprises one or more additives, which may include, as non-limiting examples, one or more of thickeners, gelling agents, polymers, monomers and cross-linking agents, plasticizers, diluents, humectants, surface-active agents, rheology modifying agents, catalysts and/or accelerators, inhibitors and/or suppressants, metal salts, metal oxides and various other agents that can modify a mechanical, chemical and/or biological property of the fluoroanion-containing composition.

Thickeners, also referred to as rheology modifiers or mechanical and thixotropic agents, are added to the fluoroanion-containing composition in order to increase the viscosity of the composition without substantially augmenting its desired properties, as well as attenuate or accelerate chemical processes that take place in the composition and a system incorporating the same. Thickeners are used also to improve the suspension of other ingredients in the composition, and stabilize mechanical properties of the composition, such as stabilizing emulsions. Exemplary thickeners that can be used in the context of some embodiments of the present invention include, without limitation, carbomers such as Carbopol® 941 and other Carbopol® polymers, metal salts, metal oxides such as chalk, alumina ($Al_2O_3$), titania and magnesia, inorganic powders such as, clays, silica, silicates and talc, organic polymers such as polyurethanes, latex, styrene/butadiene, polyvinyl alcohol, cellulosic polymers and gums (carboxymethyl cellulose, hydroxypropyl methylcellulose, Guar, xanthan, cellulose, Locust bean and acacia), saccharides (carrageenan, pullulan, konjac and alginate), proteins (cassein, collagen, and albumin), modified Castor oil, organosilicones (silicone resins, dimethicones)polyethylene glycols, acrylic polymers, polyhydroxyethylmethacrylate (HEMA) and p-methoxymethamphetamine (PMMA), and the likes.

Gelling agents are added to the fluoroanion-containing composition in order to jellify the composition, modify its viscosity or to include the composition as a liquid or an emulsion in a colloid mixture that forms a weakly cohesive internal structure. In the context of some embodiments of the present invention, gelling agents include substances which undergo cross-linking and/or entanglement when dissolved or dispersed in a liquid media. Exemplary gelling agents include, without limitation, cellulose derivatives (methylcellulose, hydroxypropyl cellulose and hydroxypropylmethyl cellulose). carbomers, poloxamers, alginic acid and various alginates, polysaccharides, agar, carrageenan, locust bean gum, pectin and gelatin.

Crosslinking agents are added to the fluoroanion-containing composition in order to modify its mechanical properties thereof by crosslinking polymeric chains that form a part of the composition. Exemplary of crosslinking agents include, without limitation, derivatives of divinylbenzene, derivatives of ethylene glycol di(meth)acrylate, derivatives of methylenebisacrylamide, ethylene glycol dimethacrylate, butanediol diacrylate, formaldehyde-based and formaldehyde-free crosslinking agents, butanediol di(meth)acrylate, ethylene glycol di(meth)acrylate, diethylene glycol di(meth)acrylate, triethylene glycol di(meth)acrylate, propylene glycol di(meth)acrylate, dipropylene glycol di(meth)acrylate, diallyl fumarate, allyl (meth)acrylate, vinyl (meth)acrylate, trimethylolpropane tri(meth)acrylate, methacryloyloxyethyl (meth)acrylate, divinylbenzene, diallyl phthalate, diallyl adipate, triallyl diisocyanate, α-methylene-N-vinylpyrrolidone, 4-vinylbenzyl(meth)acrylate, 3-vinylbenzyl (meth) acrylate, 2,2-bis((meth)acryloyloxyphenyl)hexafluoropropane, 2,2-bis((meth)acryloyloxyphenyl)propane, 1,4-bis(2-(meth) acryloyloxyhexafluoroisopropyl)benzene, 1,3-bis(2-(meth)acryloyloxyhexafluoroisopropyl)benzene, 1,2-bis(2-(meth) acryloyloxyhexafluoroisopropyl)benzene, 1,4-bis(2-(meth) acryloyloxyisopropyl)benzene, 1,3-bis(2-(meth) acryloyloxyisopropyl) benzene, 1,2-bis(2-(meth) acryloyloxyisopropyl)benzene, and the likes.

Plasticizers are added to the fluoroanion-containing composition in order to increase the plasticity or fluidity of the composition. Exemplary plasticizers include, without limitation, natural and synthetic rubbers, hydroxyl-terminated polybutadiene (HTPB), ester plasticizers such as dicarboxylic/tricarboxylic ester-based plasticizers, phthalates, trimellitates, adipates, sebacates, maleates, benzoates, terephthalates, 1,2-cyclohexane dicarboxylic acid diisononyl ester, epoxidized vegetable oils, alkyl sulphonic acid phenyl esters, sulfonamides, organophosphates, butanetriol trinitrate, dinitrotoluene, trimethylolethane trinitrate, diethylene glycol dinitrate, triethylene glycol dinitrate, bis(2,2-dinitropropyl)formal, bis(2,2-dinitropropyl)acetal, 2,2,2-trinitroethyl 2-nitroxyethyl ether, glycols/polyethers, polymeric plasticizers such as polybutene, biologically compatible plasticizers such as acetylated monoglycerides, alkyl citrates and nitroglycerine.

Diluents are added to the fluoroanion-containing composition also in order to modify its mechanical properties and render it more suitable for specific applications, such as pumpability, fluidity, spreadability, sprayability and the likes. Diluent, according to some embodiments f the present invention, include, without limitation, organic and inorganic solvents, and any other solvent as described herein.

Surface-active agents, or surfactants, are added to the fluoroanion-containing composition in order to modify its mechanical properties and render it more suitable for specific applications, such as pumpability, fluidity, spreadability, sprayability and the likes, and in order to lower the surface tension of the composition and/or the interfacial tension thereof with other components and phases in a system comprising the composition, and to modify its ability to absorb solids, liquids and/or vapors therein. In the context of some embodiments of the present invention, surface-active agents include emulsifiers, detergents, foaming agents and the likes. Non-limiting examples of surface-active agents include anionic surfactants containing anionic functional groups at their head groups, such as sulfate, sulfonate, phosphate, and carboxylates (sodium stearate, sodium lauroyl sarcosinate and carboxylate-based fluorosurfactants such as perfluorononanoate, perfluorooctanoate (PFOA or PFO)), docusates such as dioctyl sodium sulfosuccinate, perfluorooctanesulfonate (PFOS), perfluorobutanesulfonate, linear alkylbenzene sulfonates (LABs), cationic surfactants containing cationic head groups such as octenidine dihydrochloride, alkyltrimethylammonium salts, cetyl trimethylammonium bromide (CTAB), cetyl trimethylammonium chloride (CTAC), cetylpyridinium chloride (CPC), benzalkonium chloride (BAC), benzethonium chloride (BZT), 5-bromo-5-nitro-1,3-dioxane, dimethyldioctadecylammonium chloride, cetrimonium bromide, dioctadecyldimethylammonium bromide (DODAB), zwitterionic surfactants and amphoteric surfactants such as sulfonates and sultaines, 3-[(3-cholamidopropyl)dimethylammonio]-1-propanesulfonate (CHAPS), cocamidopropyl hydroxysultaine, betaines, cocamidopropyl betaine, phospholipids, phosphatidylserine, phosphatidylethanolamine, phosphatidylcholine, sphingomyelins, nonionic surfactant such as fatty alcohols, cetyl alcohol, stearyl alcohol, cetostearyl alcohol, oleyl alcohols, polyoxyethylene glycol alkyl ethers, octaethylene glycol monododecyl ether, pentaethylene glycol monododecyl ether, polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitan alkyl esters, cocamide MEA, cocamide DEA, dodecyldimethylamine oxide, block copolymers of polyethylene glycol and polypropylene glycol, polyethoxylated tallow amine (POEA), and the likes.

Humectants, also referred to herein as moisturizing agents, are added to the fluoroanion-containing composition in order to keep it moist. In the context of embodiments of the present invention, humectants include glycerin, sorbitol, propylene glycol, hexylene and butylene glycol, MP-diol, urea, alpha-hydroxy acids (AHA's), fatty acids, ceramides, proteins, and occlusives (physically blocking media loss) such as petrolatum, lanolin, mineral oil, silicones, zinc oxide and the likes.

Catalysts and/or accelerators are added to the fluoroanion-containing composition in order to speed up a chemical or electrochemical reaction in the composition or at the interface between the composition and the metal or/and electrodes both on an anodes and cathodes. In the context of some embodiments of the present invention, catalysts can be heterogeneous or homogeneous, depending on whether a catalyst exists in the same phase as its substrate. Catalysts for the cathode oxygen reduction/evolution which can accelerate the electrochemical oxygen reduction reaction (ORR) and/or oxygen evolution reaction (OER) include, without limitation platinum and alloys thereof (e.g., PtAu nanoparticles), carbonaceous materials such as graphene nanosheets, transition-metal oxides (e.g., Mn-based spinels and perovskites), and inorganic-organic composites (e.g., metal macrocycle derivatives). Non-limiting examples of accelerators for metal or/and oxide reactions (such as corrosion reaction), according to some embodiments of the present invention, include poly(ethylene glycol) bis(carboxymethyl) ether (e.g., PEG di-acid 600) and $HF_2$.

Inhibitors and/or suppressants are added to the fluoroanion-containing composition in order to attenuate a chemical or electrochemical reaction in the composition or at the interface between the composition and the metal. In the context of some embodiments of the present invention, specific inhibitors and suppressants can effectively reduce the corrosion rate/reaction rate of a material exposed to that environment/media or other materials. Corrosion inhibitors include, without limitation, anodic inhibitors, cathodic inhibitors, mixed inhibitors, adsorption agents, film-forming agents, nonoxidizing passivators and oxidizing passivators. Anodic inhibitors include, without limitation, orthophosphates, benzoates, chromates, nitrites, nitrates and molybdates hydroxyethyl quinoline quaternary ammonium phenolate, hydroxyethyl quinoline quaternary ammonium para-methyl phenolate and hydroxyethyl quinoline quaternary ammonium p-nitrophenolate, ionic types of perfluoro surfactants (including hydrocarbon chain surfactant CTAB), dinonylphenol phosphate ester (DPE), phosphoric acid, tartaric acid, succinic acid and citric acid, zinc oxide, PEG (300-900), GAFAC RA 600 and PEG di-acid 600 and other modified organic polymers, imidazole (IMZ). Cathodic inhibitors include, without limitation, polyphosphates, tannins, lignins and zinc salts. Mixed corrosion inhibitors include, without limitation, phosphonates, silicates, aromatic azoles, amines and amides, acetylenic alcohols, sulfur-containing compounds, hydrazines and sulfites.

Metal salts are added to the fluoroanion-containing composition as a source of metal ions for deposition and electrochemical reactions at the cathode/anode, as exemplified hereinbelow. In general, all types of inorganic and organic salts, based on the various anions and cations described herein, are added to the fluoroanion-containing composition in also order to modify the ionic strength of the composition and affect its electrochemical and electrostatic properties.

Metal oxides are added to the fluoroanion-containing composition as a source of metal for metal deposition and electrochemical reactions at the cathode/anode, as exemplified hereinbelow. Exemplary metal oxides and other oxides include, without limitation, Antimony tetroxide ($Sb_2O_4$), Cobalt(II,III) oxide ($Co_3O_4$), Iron(II,III) oxide ($Fe_3O_4$), Lead(II,IV) oxide ($Pb_3O_4$), Manganese(II,III) oxide ($Mn_3O_4$), Silver(I,III) oxide ($Ag_2O_2$), Triuranium octoxide ($U_3O_8$), Copper(I) oxide ($Cu_2O$), Dicarbon monoxide ($C_2O$), Dichlorine monoxide ($Cl_2O$), Lithium oxide ($Li_2O$), Potassium oxide ($K_2O$), Rubidium oxide ($Rb_2O$), Silver oxide ($Ag_2O$), Thallium(I) oxide ($Tl_2O$), Sodium oxide ($Na_2O$), Aluminium(II) oxide (AlO), Barium oxide (BaO), Beryllium oxide (BeO), Cadmium oxide (CdO), Calcium oxide (CaO), Carbon monoxide (CO), Chromium(II) oxide (CrO), Cobalt(II) oxide (CoO), Copper(II) oxide (CuO), Iron(II) oxide (FeO), Lead(II) oxide (PbO), Magnesium oxide (MgO), Mercury(II) oxide (HgO), Nickel(II) oxide (NiO), Nitric oxide (NO), Palladium(II) oxide (PdO), Strontium oxide (SrO), Sulfur monoxide (SO), Disulfur dioxide ($S_2O_2$), Tin(II) oxide (SnO), Titanium(II) oxide (TiO), Vanadium(II) oxide (VO), Zinc oxide (ZnO), Aluminium oxide ($Al_2O_3$), Antimony trioxide ($Sb_2O_3$), Arsenic trioxide ($As_2O_3$), Bismuth(III) oxide ($Bi_2O_3$), Boron trioxide ($B_2O_3$), Chromium(III) oxide ($Cr_2O_3$), Dinitrogen trioxide ($N_2O_3$), Erbium(III) oxide ($Er_2O_3$), Gadolinium(III) oxide ($Gd_2O_3$), Gallium(III) oxide ($Ga_2O_3$), Holmium(III) oxide ($Ho_2O_3$), Indium(III) oxide ($In_2O_3$), Iron(III) oxide ($Fe_2O_3$), Lanthanum oxide ($La_2O_3$), Lutetium(III) oxide ($Lu_2O_3$), Nickel(III) oxide ($Ni_2O_3$), Phosphorus trioxide ($P_4O_6$) Promethium(III) oxide ($Pm_2O_3$), Rhodium(III) oxide ($Rh_2O_3$), Samarium(III) oxide ($Sm_2O_3$), Scandium oxide ($Sc_2O_3$), Terbium(III) oxide ($Tb_2O_3$), Thallium(III) oxide ($Tl_2O_3$), Thulium(III) oxide ($Tm_2O_3$), Titanium(III) oxide ($Ti_2O_3$), Tungsten(III) oxide ($W_2O_3$), Vanadium(III) oxide ($V_2O_3$), Ytterbium(III) oxide ($Yb_2O_3$), Yttrium(III) oxide ($Y_2O_3$), Carbon dioxide ($CO_2$), Carbon trioxide ($CO_3$), Cerium(IV) oxide ($CeO_2$), Chlorine dioxide ($ClO_2$), Chromium(IV) oxide ($CrO_2$), Dinitrogen tetroxide ($N_2O_4$) Germanium dioxide ($GeO_2$), Hafnium(IV) oxide ($HfO_2$), Lead dioxide ($PbO_2$), Manganese dioxide ($MnO_2$), Nitrogen dioxide ($NO_2$), Plutonium(IV) oxide ($PuO_2$), Rhodium (IV) oxide ($RhO_2$), Ruthenium(IV) oxide ($RuO_2$), Selenium dioxide ($SeO_2$), Silicon dioxide ($SiO_2$), Sulfur dioxide ($SO_2$), Tellurium dioxide ($TeO_2$), Thorium dioxide ($ThO_2$), Tin dioxide ($SnO_2$), Titanium dioxide ($TiO_2$), Tungsten(IV) oxide ($WO_2$), Uranium dioxide ($UO_2$), Vanadium(IV) oxide ($VO_2$), Zirconium dioxide ($ZrO_2$), Antimony pentoxide ($Sb_2O_5$), Arsenic pentoxide ($As_2O_5$), Dinitrogen pentoxide ($N_2O_5$), Niobium pentoxide ($Nb_2O_5$), Phosphorus pentoxide ($P_2O_5$), Tantalum pentoxide ($Ta_2O_5$), Vanadium(V) oxide ($V_2O_5$), Chromium trioxide ($CrO_3$), Molybdenum trioxide ($MoO_3$), Rhenium trioxide ($ReO_3$), Selenium trioxide ($SeO_3$), Sulfur trioxide ($SO_3$), Tellurium trioxide ($TeO_3$), Tungsten trioxide ($WO_3$), Uranium trioxide ($UO_3$), Xenon trioxide ($XeO_3$), Dichlorine heptoxide ($Cl_2O_7$), Manganese heptoxide ($Mn_2O_7$), Rhenium(VII) oxide ($Re_2O_7$), Technetium(VII) oxide ($Tc_2O_7$), Osmium tetroxide ($OsO_4$), Ruthenium tetroxide ($RuO_4$), Xenon tetroxide ($XeO_4$), Iridium tetroxide ($IrO_4$) and Hassium tetroxide ($HsO_4$).

A Method for Activating the Surface of Metals:

As discussed hereinabove, the present inventors have found that contacting a passivated metal with a fluoroanion-containing composition leads to removal of the passivated metal surface layer and the formation of a substantially stable activated metal surface layer which is characterized by detectable HF-species, which were implicated with the sustained activation of the treated metal.

According to an aspect of embodiments of the present invention, there is provided a method of activating a surface of a metal or a metal alloy, which is carried out by contacting the surface of the metal or metal alloy with a fluoroanion-containing composition, as described in any one of the respective embodiments, to thereby obtain an activated metal surface.

The contact time period, or exposure time period of the metal to the fluoroanion-containing composition depends on the desired level of activation, on the chemistry of the species comprising the oxidized metal passivating layer, the crystal structure of the metal passivating layer, the thickness of the metal passivating layer and the composition and the volume of the fluoroanion-containing composition with respect to the surface area of the metal sample to be treated. According to some embodiments of the present invention, the contact time, or exposure time of a metal surface to a fluoroanion-containing composition for effecting metal surface activation, is as short as 10 seconds, 30 seconds, 1 minute, 5 minutes, 10 minutes, 30 minutes or 60 minutes, or 1 hour, 2 hours, 3 hours, 4 hours, 5 hours, 6 hours, 12 hours, 18 hours, 24 hours, 48 hours or 72 hours, or ranges from 1 to 60 minutes or from 0.5 hour to 2 hours, 1-4 hours, 2-6 hours, 12-24 hours or 24-72 hours. It is noted that other shorter or longer contact time periods are contemplated.

In the context of any of the embodiments of the present invention, the HF-species are chemically or physically associated with the metal, e.g., aluminum, and the term "associated" is used, without being bound to any particular theory, to describe chemical association that may involve covalent bonding, ion-ion (salt) bonding or other electrostatic interactions, metal-ligand complexation. Physical association may be described as surface forces association or physical absorption.

Without being bound by any particular theory, it has been postulated by the present inventors that the activation of the passivated metal takes place in two independent processes which include (i) removal or penetration of the passivating layer of inactive oxides, sulfides, hydroxides and/or other inactive species present on the surface of the metal, and (ii) modification of the chemical end-group species on the surface of the metal from inert species to reactive species by the formation of a layer of reactive "HF-species" on the exposed metallic surface.

Without being bound by any particular theory, it is assumed that one of the results of the reaction of the fluoroanion species in the fluoroanion-containing composition with the passivated metal, is the formation of metal-fluoro-based species which dissolve into the medium (the fluoroanion-containing composition). It is further assumed that these fluorohydrogenate-metal species are electrochemically active, unlike the oxidized metal species forming the passivating layer, namely the metal-fluoro-based species are capable of being reduced directly or indirectly on an anode or oxidized directly or indirectly on a cathode.

Without being bound by any particular theory, it is noted herein that during the course of effecting the metal activation method presented herein, the fluoroanion-containing composition, according to some embodiments of the present invention, interacts with oxidized metal atoms in various $M^{+n}$ states that form a part of the species comprising the passivation layer on the surface of the metal (e.g., metal oxides, metal hydroxides etc.), as well as with the metal atoms at the surface of the bulk of the metal (largely $M^0$), such that the oxidized metal atoms stemming from the passivation layer and the metal atoms at the metal surface are converted into HF-species. The HF-species that form a part of the treated (activated) metal surface are detectable in certain spectroscopic techniques even after washing and passage of time while exposed to ambient conditions, and are referred to herein as the fingerprints of the presently provided method. The HF-species that result from dissolving the passivation layer, or from dissolving any other source of metal oxide species, are electrochemically reactive and thus can be utilized as a source of metal for electrodeposition and other electrochemical reactions, intercalation and the likes.

Without being bound by any particular theory, it is assumed that $H_2F_3^-$ species is associated with reacting with the passivating layer (e.g., the oxides) and the $H_3F^-$ species is associated with transforming the exposed metal surface to exhibit HF-species, as this term is defined hereinbelow. It is further assumed that the $HF_2^-$ species is associated with corrosion of the metal.

In the context of embodiments of the present invention, the term "activation" refers to the removal of the passivation layer from the surface of the metal, such that the newly exposed surface of the metal allows physical, chemical and electrochemical reactions to take place thereon. In some embodiments, the term "activation" refers to the chemical removal of the passivation layer off the metal's surface, as opposed to the mechanical removal of the passivation layer, e.g. by melting, cutting, scraping, polishing and/or other abrasive methodologies. It is noted that activation may be afforded by a combination of chemical and mechanical means, and the term "activation" is meant to encompass these combinations.

In the context of embodiments of the present invention, the effect of contacting a metal object having a passivating layer coating at least some of its surface, with a fluoroanion-containing composition, according to any one of the embodiments of the present invention, involves both the species comprising the metal passivation layer (all oxidized metal species, including metal oxides, metal hydroxides metal sulfides, metal thiols, metal nitrides and other oxidized metal species and metal passivating end-groups), as well as the de-passivated or exposed metal surface.

Part of the activation of the metal, according to embodiments of the present invention, is the effect of the fluoroanion-containing composition on the species comprising the oxidized metal layer is referred to herein as "dissolution", "decomposition" and "reaction with", meaning that the effect on the species comprising the oxidized metal layer is that they are no longer attached to the metal surface—an effect seen as dissolution thereof. The effect may further include breaking and decomposing blocks, aggregates and oligomers of the passivating species comprising the oxidized metal layer—an effect seen as decomposition thereof. The effect may further include a chemical reaction of the fluoroanion species with the dissolved/decomposed oxidized metal species—an effect which results with electrochemically reactive fluorohydrogenate-metal species, also referred to herein as the formation "HF-species".

Another part of the activation of the metal, according to embodiments of the present invention, is the effect of the fluoroanion-containing composition on the de-passivated or exposed metal surface. This part of the metal activation involves a chemical reaction of the fluoroanion species with the freshly exposed metal at its surface—an effect which results with electrochemically reactive fluorohydrogenate-metal species, or HF-species, on the surface of the metal.

In the context of embodiments of the present invention, the term "activation" encompasses the chemical removal of the passivation layer off the surface of the treated metal. According to some of any of the embodiments of the present invention, the activated metal surface is essentially devoid of a passivation layer, namely the surface of the treated metal (metal contacted with the fluoroanion-containing composition described herein) comprises, in terms of mass and/or coverage area, less than 80%, less than 70%, less than 60%, less than 50%, less than 40%, less than 30%, less than 20%, less than 10%, less than 5% or less than 1% of the passivation layer of the untreated metal.

In the context of embodiments of the present invention, the term "activation" also encompasses the formation of certain chemical end-group species, referred to herein as fluorohydrogenate-metal species or "HF-species", which are formed on the surface of the activated metal or metal alloy as a result of contacting the fluoroanion-containing composition with the metal, that essentially do not interfere with, as possibly promote various chemical and electrochemical reaction of the surface, and retard self-passivation processes.

According to some of any of the embodiments of the present invention, once being in contact with a fluoroanion-containing composition, the activated surface of a treated metal sample exhibits specific spectroscopic features which can be identified by their peak wave number obtained by well established spectroscopic methods, as discussed herein. The wave numbers may be similar between treated samples of various metals, or somewhat shift by a measurable amount for certain types of metals and metal alloys.

In some embodiments, once being in contact with a fluoroanion-containing composition, the activated surface of a treated metal sample exhibits some characteristic spectroscopic peaks typically at about 3150-2840 $cm^{-1}$ (typically about 2990 $cm^{-1}$), about 1110-800 $cm^{-1}$ (typically about 960 $cm^{-1}$), about 2505-2200 $cm^{-1}$ (typically about 2355 $cm^{-1}$), about 1920-1600 $cm^{-1}$ (typically about 1770 $cm^{-1}$) and/or about 1170-870 $cm^{-1}$ (typically about 1020 $cm^{-1}$), as measured by ATR-FTIR spectroscopy essentially as described herein. The appearance of some of these spectroscopic peaks in an ATR-FTIR analysis of a surface of an object demonstrates the modification of the surface by HF-species as described herein, and this spectroscopic pattern, or any part thereof, is regarded as fingerprints of the methods described herein.

In some embodiments, the activated surface of a treated metal sample exhibits at least two, at least three, at least four or all of the spectroscopic peaks presented hereinabove, characteristic of the presence of HF-species on the treated surface.

In some embodiments, the activated surface of a treated metal sample exhibits at least two of any of the spectroscopic peaks presented hereinabove.

In some embodiments, the activated surface of a treated metal sample exhibits at least three of any of the spectroscopic peaks presented hereinabove.

In some embodiments, the activated surface of a treated metal sample exhibits at least four of any of the spectroscopic peaks presented hereinabove.

The appearance of spectral features which are attributed to the treatment of the metal surface with a fluoroanion-containing composition, according to embodiments of the present invention, is referred to herein as "HF-species fingerprints".

These fingerprints of the method described herein, which can be detected on the surface of a metal or metal alloy that has been activated thereby, namely the spectral features of "HF-species" as discussed herein, are also present in the context of an aluminum-based anode in an electrochemical cell device using as an electrolyte a fluoroanion-containing composition, as discussed hereinbelow.

In the context of some embodiments, the term "activation" further refers to a non-corrosive chemical removal of the passivation layer off the metal's surface, e.g., by chemically removing the chemical species that constitute the metal passivation layer, essentially without diminishing the underlying base metal or alloy in its metallic state (the metal at zeroth oxidation state). Hence, in the context of some embodiments of the present invention, the term "non-corrosively", in all its grammatical inflections, refer to a superficial treatment of a metal to remove a passivation layer thereon, while minimizing or substantially avoiding diminishing the underlying metal or alloy.

One way of assessing non-corrosive processes is by Linear Polarization Resistance (LPR). LPR is an electrochemical method for measuring corrosion by monitoring the relationship between electrochemical potential and current generated between electrically charged electrodes in a process stream, which allows the calculation of the corrosion rate by relating corrosiveness to electrical resistance of a fluid. Briefly, a two or three electrode probe is inserted into the process system, with the electrodes being electrically isolated from each other. A small potential, which does not affect the natural corrosion process, is applied between the elements and the resulting current is measured. The polarization resistance, Rp, is the ratio of the applied potential and the resulting current level. The measured resistance is in fact the slope of the linear plot of overpotential versus current density measured at potentials close to the corrosion potential, or the tangent of such a curve at the corrosion potential if the plot is not linear. The polarization resistance is given by $Rp[\Omega cm^2]=\Delta E/\Delta i$, wherein Rp is the effective instantaneous resistance, $\Delta E$ is a small change in potential and $\Delta i$ is the change in current density. If the electrodes are corroding at a high rate with the metal ions passing easily into solution, a small potential applied between the electrodes will produce a high current, and therefore a low polarization resistance, and this effect corresponds to a high corrosion rate. Linear polarization measurements are measured in small intervals around the open circuit potential at the ±20-50 mV range.

It should be noted that the proposed method of corrosion current measurement is not meant to be limiting to the scope of the present invention, and is provided as an exemplary mean to assess one of the characteristics of the presently claimed method. It is further noted that the proposed method of corrosion current measurement may be applied particularly for monolithic objects or generally flat surfaces, wherein a constant surface area may be assumed during the corrosion process. Otherwise a deconvolution of the surface change related currents and actual electrochemical corrosion reaction currents should be corrected for; namely, a dynamic factor of the surface area as a function of corrosion should be implemented in the calculations. This is more significant when attempting to assess corrosion in a powdered sample.

From the measured corrosion current the weight (mass) loss of the metal may be calculated by $m=(i \cdot t/F)(Mw/z)$, wherein "m" is the mass loss as a function of the surface area ($gr/cm^2$), "i" is the corrosion current density ($mA/cm^2$), "t" is the exposure time to the corrosive environment, "F" is the Faraday constant (C/mol), "Mw" is the molar mass of the substance (gr/mol) and "z" is the valence number of the ions involved in the electrochemical corrosion reaction. For an exemplary demonstration of corrosion assessment, see Example 4 in the Examples section that follows below.

Hence, according to some embodiments of the present invention, the method of activating a surface of a metal or a metal alloy is effected while observing a mass loss of less than about $1 \cdot 10^{-4}$ $gr/cm^2$, $1 \cdot 10^{-5}$ $gr/cm^2$ or $1 \cdot 10^{-6}$ $gr/cm^2$ over a time period of 1 hour under maximal corrosion current densities of about 50 $\mu A/cm^2$ in a given RTIL solution, using a monolithic flat-faced metal sample, as assessed by near Polarization Resistance.

Alternatively, according to some embodiments, the non-corrosive activation of the metal is effected while diminishing less than 0.01%, 0.1%, 0.2%, 0.5% or less than 1% by mass (weight) of the underlying metal or alloy in its metallic state, as estimated based on the treated surface area and a depth (thickness) of 0.1 mm. It is noted that the thickness of the underlying metal or alloy is used as a reference and can be any other measurable depth.

The non-corrosive nature of the activation process afforded by the method described herein, is also a feature in the context of an aluminum-based anode in an electrochemical cell device using as an electrolyte a fluoroanion-containing composition, as discussed hereinbelow.

The effect of the metal activation process presented herein is maintained for an extended period after initial activation of the metal and after removal of the treated metal from the fluoroanion-containing composition or removal of the fluoroanion-containing composition from the treated metal, leaving the treated metal chemically and electrochemically active for at least a certain period of time, referred to herein as a "reactive period" or "activation period". The terms "reactive period" or "activation period" refer to the period of time that spans between a time point at which the treated metal is separated from the fluoroanion-containing composition and the time point at which the treated metal is still chemically and/or electrochemically active, as opposed to passive.

By separating the treated metal from the fluoroanion-containing composition it is meant, according to some embodiments of the present invention, that the treated metal is no longer in contact with the fluoroanion-containing composition. In some embodiments, by separating the treated metal from the fluoroanion-containing composition it is meant that the fluoroanion-containing composition is washed off the surface of the treated metal. In some embodiments, by separating the treated metal from the fluoroanion-containing composition it is meant that the treated metal is exposed to ambient conditions, or to the same conditions that rendered the metal passive. In some embodiments, the treated metal remains chemically and/or electrochemically active during a reactive period when exposed to ambient humidity, ambient oxygen level and ambient temperature.

In some embodiments of the present invention, the activation period is unlimited. In some embodiments, the reactive period is at least 1 hour, at least 2 hours, at least 3 hours, at least 4 hours, at least 5 hours, at least 10 hours, at least 20 hours, at least 1 day, at least 2 days, at least 3 days, at least 4 days, at least 5 days, at least 1 week, at least 2 weeks, at least 3 weeks, at least 1 month, at least 2 months, at least 3 months, at least 6 months, at least 1 year, at least 2 years, or at least 3 years from separating the treated metal from the fluoroanion-containing composition.

In the context of embodiments of the present invention, the term "dissolution" refers to a thermodynamically favorable chemical process by which atoms, ions or molecules of a substance (including complexes, polymers and the likes), jointly referred to as a "solute", are engulfed in a plurality of atoms, ions or molecules of another substance, referred to as a "solvent", to form a solution of the solute in the solvent. In the case of solid solutes, the amorphous, crystalline or otherwise the bulk structure disintegrates to separate ions, atoms and/or molecules. The end result of the dissolution process at equilibrium is governed by the thermodynamic energy of the solute/solvent/environment system, while the dissolution process itself is governed by kinetic processes, and can be affected by heat, stirring and time.

The method of activating a metal surface can be applied on a variety of metals, including self-passivating metals, diffusion barrier metals (including nitrides, carbides and alloys thereof), transition metals, noble metals, post-transition metals, base metals, poor metals, alkaline earth metals, lanthanides, actinides and any alloy thereof.

Passive-Metal-Based Batteries:

An embodiments of the method for activation self-passivated metals is in the flied of electrochemical cells and batteries. While reducing the present invention to practice, it was found that fluoroanion-containing compositions, as described hereinabove, may be used successfully as electrochemical cell electrolytes that can render the naturally-passive surface of self-passivated metals, such as aluminum, active so as to become a highly effective anodic material in an electrochemical cell. As demonstrated in the Examples section that follows, the present inventors have demonstrated an efficient aluminum/air battery.

According to an aspect of some embodiments of the present invention, there is provided an electrochemical cell device, e.g. a battery, which includes a self-passivated metal such as aluminum used as an anode, a cathode and a fluoroanion-containing composition used as an electrolyte (fluoroanion-containing electrolyte).

In the context of an electrochemical cell device, the anode is the metal which is activated using the method for activating metals, according to some embodiments of the present invention.

In the context of an electrochemical cell device using a metal as a source of anodic fuel, the metal activation processes described hereinabove may take place simultaneously or sequentially. For example, a self-passivated metal, such as aluminum, may have a native oxide passivation layer prior to its use, which means it has been oxidized to a certain limited level (limited corrosion) by the ambient atmosphere or the containing liquid; once immersed in a fluoroanion-containing electrolyte according to some embodiments of the present invention, the oxide layer is essentially removed and the surface of the metal is exposed to the electrolyte (activated metal surface); once the cell has been put to work, the metal is oxidized controllably as it is consumed to produce oxidized soluble or insoluble species thereof and electrons which "travel" to the cathode.

According to some embodiments of the present invention, the electrochemical cell comprises an anode and a cathode, and is being operable, or is identified as being operable, upon contacting the anode and cathode with a fluoroanion-containing composition as described hereinabove and used as an electrolyte. The contacting may be afforded by introducing the fluoroanion-containing electrolyte into a compartment in the cell (such that at least the anode contacts the electrolyte), or by immersing the electrodes in the fluoroanion-containing electrolyte.

In the context of the present embodiments, the term "electrochemical cell device" refers to a battery in the general sense, consisting of one or more electrochemical or voltaic cells, which stores chemical energy and provide it as available electric energy (e.g., electricity) due to a potential difference between its electrodes.

Types of electrochemical cells include galvanic cells, electrolytic cells, fuel cells, flow cells, and voltaic cells, each comprising two half-cells: one for the oxidation reaction of the chemical fuel (negative electrode or anode) and one for the reduction reaction of the oxidant (positive electrode or cathode).

Batteries generate electricity without combustion of the fuel and oxidizer. Other possible battery configurations may involve reduction reaction based cathode and oxidation reaction based anode, such as present in intercalation chemistry base electrochemical cells, e.g. Li-Ion batteries. As opposed to what occurs with other methods of electric energy generation, the chemical energy is converted into electrical current and some heat, driven by the redox potential difference between the two halves of the cells. Batteries are therefore characterized by having a positively charged anode, a negatively charged cathode, an ion-conducting material referred to as an electrolyte, and conducting negative and positive terminals which conduct the resulting electric current in and out of an electric circuit.

The term "fuel cell", as used herein, refers to one type of an electrochemical cell which continuously converts chemical energy directly to electrical energy as long as a fuel and an oxidant are supplied. Electricity is generated through the reaction, triggered in the presence of an electrolyte, between the fuel (on the anode side) and an oxidant (on the cathode side), which flow into the cell, while the electrolyte remains in the cell. Fuel cells can operate virtually continuously as long as the necessary aforementioned flows are maintained. Fuel cells are different from conventional electrochemical cell batteries, in that they consume reactant from an external source, which must be replenished, therefore constitute a thermodynamically open system, while batteries, for example, store electrical energy chemically and hence represent a thermodynamically closed system.

According to some embodiments of the invention, the electrochemical cell has an open system fuel cell configuration wherein the fuel is a metallic fuel, or a closed system battery configuration wherein the anode is metallic (e.g., comprises a metal). According to some embodiments, the electrochemical cell is a closed system battery configuration.

According to some embodiments of the invention, the electrochemical cell has an intercalation configuration wherein the metal, such as aluminum, serves as an anode and the cathode material has a capability to harbor the metal cations in its lattice or otherwise in its structure. During the discharge of such electrochemical cell, metal cations are produced and intercalated in the structure of the cathode. Recharging such electrochemical cell, metal cations are released from the structure of the cathode and deposit as metallic atoms ($M^0$) on the anode. According to some embodiments of the invention, an electrochemical cell is having an intercalation configuration wherein both the anode and the cathode are capable of intercalation and the fluoroanion-containing electrolyte serve as a source of ions for the intercalation processes.

According to some embodiments of the invention, the electrochemical cell has a conversion configuration wherein the metal, such as aluminum, serves as an anode and the cathode material has a capability to harbor metal ions by electrochemical modification. During the discharge processes metal cations are released from the anode and chemically modify the cathode material, and this chemical modification is reversed during recharging of the cell.

According to some embodiments of the invention, the electrochemical cell has a flow cell configuration wherein a Red/Ox couple and a Red'/Ox' couple, differing in redox potentials, are used in the cell while circulating the electrolyte. At the anode the Red'/Ox' couple having a lower redox potential reacts and Ox' is reduced to Red', while at the cathode the Re/Ox couple having a higher redox potential reacts and Red oxidized to Ox. By reversing the cell polarity, meaning going from discharge mode to recharge mode, a back (reverse) reaction occurs. The cell can operate constantly as long as a difference in the potential is preserved by differences in Ox/Red and Ox'/Red' concentrations.

In some embodiments, an electrochemical cell as described herein further comprises an electric connection associating the anode and the cathode, to allow a flow of an electric current between the electrodes.

According to some embodiments of the present invention, the surface of the aluminum anode or other self-passivating metals is modified by being in contact with the fluoroanion-containing electrolyte so as to essentially no longer exhibit the passivating species, such as alumina in the case of aluminum battery, or other metal passivating species. In other words, once assembled and optionally prior to being used electronically or electrochemically, the surface of the anode in the electrochemical cell device presented herein is substantially devoid of a passivation layer. This state of passivation layer-free anode surface is maintained throughout the life-cycle of the battery, or at least as long as the surface of the anode is in contact with the fluoroanion-containing electrolyte.

In some embodiments, the electrolyte is in contact (e.g., direct contact) with the anode and the cathode. In some embodiments, the electrolyte is interposed between the anode and the cathode.

In some embodiments, the electrochemical cell device further includes separators, such as a membrane or any other mechanical element which can prevent direct contact of the electrolyte with any one of the electrodes. In some embodiments, the separator prevents direct contact between the anode and the cathode and secures the cell from internal short-circuit. The separator may be based on paper and other cellulose-based materials, Teflon, woven and nonwoven fibers of cotton, nylon, polyesters and glass, polymeric films and membrane based on polyethylene, polypropylene, poly (tetrafluoroethylene), polyvinyl chloride, as well as naturally occurring substances such as rubber, asbestos, wood and the likes.

According to some embodiments, the fluoroanion-containing composition is a fluoroanion-RTIL that is used as an electrolyte while activating an aluminum anode in an aluminum/air battery.

According to some embodiments of the invention, the surface of the anode in the presently described electrochemical cell device is characterized by exhibiting HF-species fingerprints, namely the anode exhibits at least some of the spectral features (peaks) which are common to the spectral features of a metal treated with the fluoroanion-containing composition described hereinabove.

Specifically, according to some embodiments, the aluminum anode exhibits an attenuated total reflection (ATR) infrared spectrum which exhibits at least some similar features of the two major anionic species of the fluoroanion-containing electrolyte, namely the spectral features of the $H_2F_3^-$ and the $H_3F_4^-$ species. In other words, some of the peaks observed in the spectrum of the fluoroanion-containing electrolyte, which are absent in the spectrum of pristine anode metal, can be observed in a sample of the anode once it has been exposed to the fluoroanion-containing electrolyte, even after it has been washed and prolonged storage prior to spectroscopic measuring of the fingerprints (see, "activation period" described hereinabove).

In exemplary embodiments, a clean surface of a sample of the self-passivated metal anode is contacted with the fluoroanion-containing electrolyte for at least one hour; thereafter the surface is washed with an organic solvent, such as, but not limited to, ethanol, and analyzed spectrophotometrically (see, Example 5 in the Examples section that follows). Spectroscopic identification of peaks which are attributed to HF-species is based on spectroscopic studies of pristine fluoroanion-RTIL, such as provided by Hagiwara, R. et el. [*Journal of The Electrochemical Society*, 149(1) D1-D6 (2002), and *J. Phys. Chem. B* 2005, 109, 5445-5449; which are incorporated by reference as if fully set forth herein].

Exemplary peaks which are attributed to $H_3F_4^-$ species have a wavenumber of about 2990 $cm^{-1}$ and about 960 $cm^{-1}$ respectively (e.g., peaks 61 and 65 of Plot 6 in FIG. 9), and exemplary peaks which are attributed to $H_2F_3^-$ species have a wavenumber of about 2355 $cm^{-1}$, about 1770 $cm^{-1}$ and about 1020 $cm^{-1}$ respectively (e.g., peaks 62, 63 and 64 of Plot 6 in FIG. 9), at least when spectroscopic measurements as described in Example 5 in the Examples section that follows are used.

In exemplary embodiments, the aluminum anode and the fluoroanion-RTIL electrolyte exhibit at least two of the peaks of an attenuated total reflection infrared spectrum as presented in Plot 4 of FIG. 8 and/or in Plot 6 of FIG. 9 (see, Example 5 hereinbelow), at least when spectroscopic measurements as described in Example 5 in the Examples section that follows are used.

The contact or exposure time of the anode to the fluoroanion-containing electrolyte, which enables the cell to operate and exhibit the aforementioned HF-species fingerprints, according to some embodiments of the present invention, is as short as 1, 5, 10, 30 or 60 minutes, or 1, 2, 3, 4, 5, 6, 12, 18, 24, 48 or 72 hours, or ranges from 5-60 minutes or from 0.5-2 hours, 1-4 hours, 2-6 hours, 12-24 hours or 24-72 hours. It is noted that other shorter or longer contact time periods are contemplated.

In some embodiments of the present invention, once it has been in contact with the fluoroanion-containing electrolyte, an aluminum-containing anode exhibits some characteristic spectroscopic peaks typically at about 3150-2840 $cm^{-1}$ (typically about 2990 $cm^{-1}$), about 1110-800 $cm^{-1}$ (typically about 960 $cm^{-1}$), about 2505-2200 $cm^{-1}$ (typically about 2355 $cm^{-1}$), about 1920-1600 $cm^{-1}$ (typically about 1770 $cm^{-1}$) and/or about 1170-870 $cm^{-1}$ (typically about 1020 $cm^{-1}$), as measured by ATR-FTIR spectroscopy essentially as described herein.

In some embodiments, an aluminum-containing anode exhibits, upon exposure to a fluoroanion-containing electrolyte, at least two, at least three, at least four or all of the spectroscopic peaks presented hereinabove, characteristic of the presence of HF-species on its surface.

According to some embodiments, the HF-species fingerprints are detectable for at least 24, 48, 72, 96 or 144 hours, or 1, 2, 4, 8 or 12 weeks from exposure of the metal to the fluoroanion-containing electrolyte. According to some embodiments, the HF-species fingerprints are detectable for at least 24 hours from exposure of the metal to the fluoroanion-containing electrolyte. In some embodiments, the HF-species fingerprints are detectable for at least 3 years, at least 2 years, at least 1 year, at least 6 months, at least 3 months, at least 2 months, at least 1 month, at least 3 weeks, at least 2 weeks, at least 1 week, at least 5 days, at least 4 days, at least 3 days, at least 2 days, at least 1 day, at least 20 hours, at least 10 hours, at least 5 hours, at least 3 hours, or at least 1 hour from separating the self-passivate metal anode from the fluoroanion-containing electrolyte.

It is noted herein that the wavenumber of peaks in a spectrophotometric analysis such as conducted for the metal (e.g., aluminum) surface after exposure to the fluoroanion-containing electrolyte, may be shifted up or down as a result of the analyzing device or some of its working parameters, and may further depend on the type of the fluoroanion-containing electrolyte and by the metal anode. Other experimental conditions may affect the presence, wavenumber and intensity of the peaks attributed to HF-species on the surface of a treated metal, such as the exposure time, washing step and solvent, and the conditions at which the sample has been kept in between exposure and spectroscopic measurements. Embodiments of the present invention are meant to encompass any change in the spectrophotometric analysis of a metal surface after exposure to the fluoroanion-containing electrolyte which is equivalent to the changes described herein (e.g., in terms of the presence, wavenumber and/or intensity of the peaks attributed to HF-species on the surface of a treated metal) which are equivalent to the values presented herein for these peaks (upon using the spectrophotometric method and system described herein).

Without being bound by any particular theory, it is noted herein that the spectral features described herein are indicative of the activation of the aluminum and other self-passivating metals surface, which no longer exhibits inactive oxide species and exhibits reactive HF-species instead. Interestingly, this observation is not seen in other substances, such as silicon. This observation is expected to be exhibited in samples of other metals, at least by the presence of some fingerprints of the fluoroanion-containing electrolyte on the surface of the metal or alloy, namely that spectral features characteristic to HF-species, which were not seen in the pristine metal, will be exhibited in the fluoroanion-containing electrolyte-treated metal.

Hence, according to some embodiments of the present invention, the surface of the anode, after being exposed to a fluoroanion-containing electrolyte, is characterized by an ATR-FTIR spectrum which exhibits at least one peak or at least two peaks or at least three peaks which are attributed to HF-species, as defined in any one of the respective embodiments herein, which are not present in the ATR-FTIR spectrum of the anode prior to exposure to a fluoroanion-containing electrolyte as described herein.

According to some embodiments of the present invention, the metal of the anode, such as aluminum, can be doped with other elements and substances, or be essentially pure. In some embodiments, the aluminum anode is made of at least 99% aluminum (99% pure), at least 98% aluminum, at least 97% aluminum, at least 95% aluminum, at least 93% aluminum, at least 90% aluminum, or at least 85% aluminum (85% pure). It is noted that aluminum anode with less than 85% aluminum (less than 85% pure) are also contemplated.

According to some embodiments of the invention, the electrochemical cell device described herein uses a self-passivated metal as fuel in a metal-air battery, such that oxygen from ambient air is consumed as the oxidant at the cathode. In such embodiments, the cathode is an air cathode.

According to some embodiments of the invention, the electrochemical cell device described herein uses aluminum as fuel in an aluminum-air battery, such that oxygen from ambient air is consumed as the oxidant at the cathode. In such embodiments, the cathode is an air cathode.

The term "air cathode", as used herein, refers to an electrode which is designed for oxygen reduction in an electrochemical cell. An air cathode conducts oxygen from ambient atmosphere and/or a pressurized atmosphere and/or any external source of oxygen into an electrolyte, where oxygen molecules react. In some embodiments, the cathode reaction will occur with species in the electrolyte, such as, for example, ions of the anode's material (e.g., aluminum ions), so as to generate an electrical current. Electrochemical cells comprising an air cathode are typically referred to as air batteries. The air cathode material typically comprises porous and/or fibrous carbon, and/or a metal mesh such as a nickel mesh as a current collector. The implementation of an air cathode can also use carbon-based materials, nanotubes and fibers as reactive surface and/or current collector. Similar implementation could involve graphene and or other monolayer structures as reactive surface and/or current collector. Additionally, some application of metal based foams may be also utilized as substitution for the carbon based materials as possible surface for oxygen reaction.

According to some embodiments, the air cathode may comprise at least an electroconductive material and functions as an oxidation-reduction reaction site for oxygen. According to some embodiments, the air cathode may include an air cathode layer composed of an air cathode composite material comprising, in addition to the electroconductive material, a catalyst, a binder, etc. In the air cathode layer, supplied oxygen reacts with metal ions and/or with the fluoroanion-containing electrolyte itself conducted from the anode to produce a metal oxide species or metal-oxygen-fluoride species on the surface of the electroconductive material. According to some embodiments, the air cathode layer is generally porous and ensures diffusivity of oxygen, which is an active material.

The thickness of the air cathode layer varies depending on the intended use of the air battery, etc., and can range, according to some embodiments, from 0.1 μm to 500 μm, or from 5 μm to 300 μm.

According to some embodiments, the electroconductive material can be any electrically-conductive material, and one of the typical examples is a carbonaceous material, which is preferably one with a high specific surface area, in terms of the area or space of the electrochemical cell.

According to some embodiments, the carbonaceous material preferably has a specific surface area of 10 m$^2$/g or more, 100 m$^2$/g or more, or 600 m$^2$/g or more. Examples of carbonaceous materials with a high specific surface area include carbon black, activated carbon, carbon fibers (e.g., carbon nanotubes, carbon nanofibers) graphite and graphene.

According to some embodiments, the content of the electroconductive material in the air cathode layer varies depending on the density, specific surface area, and ranges from 0.1% to 99% by weight, of from 5% to 85% by weight.

According to some embodiments, the binder includes substances that can be used in batteries, such as polyvinylidene fluoride (PVDF), polytetrailuoroethylene (PTFE) and styrene-butadiene rubber (SBR), as well as gel polymers such as polyvinylidene fluoride-hexafluoropropylene copolymer (PVdF-HFP), polyacrylate, polyethylene oxide and polymethacrylate. It is noted that gel polymers have binding properties and liquid retention properties such that they are effective in preventing the electrolyte from leakage, in addition to fixing the electro-conductive material and catalyst. According to some embodiments, the content of the binder ranges from 5% to 50% by weight, or from 10% to 30% by weight. In some embodiments, the electro-conductive material in the air cathode is binder-free.

According to some embodiments, the catalyst is a substance that can promote the oxidation-reduction reaction of oxygen in the air cathode, and may be chemically and physically supported by the electro-conductive material. According to some embodiments, the catalyst comprises, for example, phthalocyanine compounds such as cobalt phthalocyanine, manganese phthalocyanine, nickel phthalocyanine, tin phthalocyanine oxide, titanium phtalocyanine and dilithium phthalocyanine; naphthocyanine compounds such as cobalt naphthocyanine; macrocyclic complexes such as iron porphyrin; macrocyclic complexes (such as iron porphyrin) coordinated with transition metal; inorganic oxides such as $MnO_2$, $CeO_2$, $Co_3O_4$, $NiO$, $V_2O_5$, $Fe_2O_3$, $ZnO$, $CuO$, $LiMnO_2$, $Li_2MnO_3$, $LiMn_2O_4$, $Li4Ti_5O_{12}$, $Li_2TiO_3$, $LiNi_{1/3}Co_{1/3}Mn_{2/3}O_2$, $LiNiO_2$, $LiVO_3$, $Li_5FeO_4$, $LiFeO_2$, $LiCrO_2$, $LiCoO_2$, $LiCuO_2$, $LiZnO_2$, $Li_2MoO_4$, $LiNbO_3$, $LiTaO_3$, $Li_2WO_4$, $Li_2ZrO_3$, $NaMnO_2$, $CaMnO_2$, $CaFeO_3$, $MgTiO_3$ and $KMnO_2$; and noble metals such as Pt, Au, Ag, Pd, Ru and Ir. According to some embodiments, the content of the catalyst in the air cathode layer ranges from 0.01% to 90% by weight. In some embodiments, the air cathode is catalyst-free.

In addition to the air cathode layer, the air cathode may further comprise, according to some embodiments, an air cathode current collector for collecting current from the air cathode layer. According to some embodiments, the air cathode current collector may be porous or dense as long as it has desired electron conductivity, and according to some embodiments, the cathode current collector is porous. In embodiments using a porous current collector as the air cathode current collector, the air cathode current collector can be provided inside the air cathode layer, the air cathode layer and the air cathode current collector are stacked (next to each other). According to some embodiments, the material for the air cathode current collector can be, for example, non-metallic materials such as highly electron-conductive ceramic materials including carbonaceous materials, titanium nitride and other nano-tubes/fibers/structures. According to some embodiments, the current collector comprises a carbonaceous material such as carbon paper, or a non-woven carbon fabric or a carbon cloth. According to some embodiments, the thickness of the air cathode current collector ranges from 0.1 μm to 1,000 μm, or from 20 μm to 400 μm. In some embodiments, the air-electrode is a free standing air-electrode. In some embodiments, the electrochemical cell device is a current collector free device.

An exemplary non-limiting method for producing an air cathode may include a process in which the electroconductive material, binder and catalyst are mixed with the solvent to prepare an air cathode composite material paste and the paste is applied and dried, while pressing or heating may be carried out after the drying of the paste as needed. In addition, by applying the air cathode composite material paste to the surface of the air cathode current collector and drying the applied paste, the air cathode in which the air cathode layer and the air cathode current collector are stacked, can be produced. Alternatively, the air cathode can be afforded by a method in which the air cathode current collector and the air cathode layer obtained by applying and drying the air cathode composite material paste, are stacked and then pressed or heated appropriately.

In some embodiments, the air cathode is a metal mesh; or a porous ceramic (metal oxide) structure, covered with catalyst or devoid of a catalyst; or a printable material cathode; or a carbon fiber or tubes growing seedless and seed based cathode.

According to some embodiments, the solvent of the air cathode composite material paste is volatile, and can comprise, without limitation, water, organic solvents such as acetone, N,N-dimethylformamide (DMF), N-methyl-2-pyrrolidone (NMP) and N,N-dimethylacetamide (DMA). According to some embodiments, the solvent has a boiling point of 200° C. or less.

In some embodiments, the air electrode is a platinum and/or other precious metal-based air cathode.

According to embodiments of the present invention, any commercially available air cathode, or any other suitable cathode, is contemplated.

According to some embodiments, the electrochemical cell device presented herein, based on a self-passivating metals anode, can be fitted with any other type of cathode, including without limitation, an oxide-based cathode such as manganese oxide ($MnO_2$) cathodes, vanadium oxide (vanadia, $V_2O_5$) cathodes and other metal-oxide-based cathodes comprising of $CuO$, $P_2O_5$, $SnO_2$, $PbO_2$, $FeO$, $Fe_2O_3$, $CoO$, $Co_2O_3$, $NiO$ and $AgO$.

According to some embodiments, the electrochemical cell device presented herein, based on an aluminum anode, can be fitted with any other type of cathode, including without limitation, an oxide-based cathode such as manganese oxide ($MnO_2$) and vanadium oxide (vanadia, $V_2O_5$) cathodes.

According to some of any of the embodiments of the invention, the cathode is a metal sulfide cathode, or an intercalation cathode, or a conversion cathode, or a fluorinated cathode, or a metal fluoride cathode (such as $CoF_2$, $CoF_3$, $FeF_2$, $FeF_3$, $CuF_2$, $MoF_5$, and $SnF_4$), or a chlorine cathode, or a sulfur cathode.

According to some of any of the embodiments of the invention, the cathode is a combination of the aforementioned cathodes.

The presently claimed methodology allows the use of self-passivating metals as an anode possible in various cell configurations using different cathode materials such as various metal oxides, metal sulfides, metal olivine, metal sulfates, metal halogens, halogens, octahedral cluster (Chevrel phase) based materials, metal carbonates and also MXenes (2-dimensional transition metal carbides and nitrides derived from MAX phases, which are hexagonal carbides and nitrides) cathode based materials.

The presently claimed methodology allows the use of aluminum as an anode possible in various cell configurations using different cathode materials such as various metal oxides, metal sulfides, metal olivine, metal sulfates, metal halogens, halogens, octahedral cluster (Chevrel phase) based materials, metal carbonates and also MXenes (2-dimensional transition metal carbides and nitrides derived from MAX phases, which are hexagonal carbides and nitrides) cathode based materials.

It is noted that an electrochemical cell's potential is a value that can be determined in a full cell configuration, as opposed to a half-cell configuration, and that this value depends on the chemistry of the entire cell, including the anode, the cathode and the electrolyte. For example, the theoretical potential of a general aqueous reaction of aluminum with oxygen, as estimated by thermodynamic calculation, is about 2.7 V for the end product $Al_2O_3$. The electrochemical cell's potential of the aluminum/air battery, as measured versus a gel-based $Fc/Fc^+$ reference electrode and presented in the Examples section that follows below, is characterized by a potential of aluminum half-cell at least −1.0 V, at least −1.1 V, at least −1.15 V, at least −1.2 V, at least −1.3 V, at least −1.4 V, at least −1.5 V, at least −1.6 V or at least −1.7 V.

The electrochemical cell (e.g., electrochemical cell device) of the present invention is characterized by exhibiting low anode corrosion, namely the anode in the electrochemical cell is not used up uncontrollably by side-reactions which are not associated with electron passage in the cell's circuitry but stem from corrosion in the cell.

The term "corrosion", as used herein, refers to a reaction of a substance, typically a metal, with its environment, which leads to the gradual degradation of the substance and the formation of oxidation products in its place. Hence, corrosion typically refers to the electrochemical oxidation of a metal with an oxidant such as oxygen, which typically produces oxide(s) and/or salt(s) of the original metal.

In the context of electrochemical cells and batteries, low corrosion currents are indicative of a stable and efficient cell having minimal loss of fuel and minimal uncontrollable loss of electrons which do not contribute to the intended discharge currents of the electrochemical system. Such corrosion currents are correlated to the discharge current of the electrochemical cell, and therefore are estimated as a ratio between the controlled discharge current and the corrosion current, wherein a ratio of discharge current to corrosion current is expected to be higher in more efficient cells; while a cell may exhibit varying ratios at various discharge currents. For example, an electrochemical cell exhibiting controlled discharge current of about 10 $mA/cm^2$, corrosion currents in the order of 0.1-0.01 $mA/cm^2$ or less (less than 2-3 orders of magnitude lower than the discharge current) are considered low corrosion.

As demonstrated in the Examples section below (Example 4) an exemplary aluminum-based battery according to some embodiments of the present invention, exhibits corrosion currents which are three orders of magnitude less than the discharge current of the battery. In the Examples section, the aluminum/air battery presented therein is characterized by a ratio of discharge current to corrosion current of at least 1:50, optionally of more than 100:1, optionally of more than 500:1, and further optionally of more than 1000:1.

It is noted that in order to assess the overall quality of an electrochemical cell, one would look at the total capacity of the cell, which expresses both the discharge to corrosion ratio as well as the optimal discharge current.

According to some embodiments of the present invention, the electrochemical cell comprising a self-passivating metal anode, such as an aluminum anode, a cathode and a fluoroanion-containing electrolyte, as described in any one of the present embodiments, is a rechargeable electrochemical cell, or a reusable storage battery.

According to some embodiments of the present invention, the electrochemical cell comprising an aluminum anode, a cathode and a fluoroanion-RTIL as an electrolyte and/or a fluoroanion salt and/or fluoroanion based species in an electrolyte, as described in any one of the embodiments of the present invention, is a rechargeable electrochemical cell, or a reusable storage battery.

In some embodiments, an electrochemical cell as described herein is an electrochemically rechargeable cell or a mechanically rechargeable, or a fuel cell. In a mechanically rechargeable cell or a fuel cell, the anode can be replenished by replacing the anode or some part(s) thereof. In such embodiments other components of the device are contemplated as fully or partially replaceable or replenishable or renewable, such as the electrolyte, the cathode or parts thereof.

In some embodiments, the electrochemical cell device provided herein, is electrochemically rechargeable, or a secondary cell, wherein the anode material (e.g. aluminum) is oxidized ($M^0 \rightarrow M^{+n} + ne^-$) during discharge and reduced back to metallic state as a metallic ($M^0$) deposit on the surface of the anode when the current is reversed (battery recharge process). In some embodiments, the reduced metal is intercalated in the electrode material. In other words, the electrochemical cell device provided herein is capable of undergoing at least one charge-discharge cycle, as described in further details hereinbelow.

In general, the rechargeability of an electrochemical device can be defined, inter alia, by the depth of discharge (DOD) of the device, whereas the DOD is typically stated as a percentage of the nominal initial capacity of the cell (in ampere-hour), wherein DOD of 100% means full discharge of a cell after one discharge/recharge cycle, and DOD of zero percents means no discharge.

In the context of embodiments of the present invention, the initial capacity of an electrochemical cell device as described in any one of the present embodiments is referred to as the zeroth capacity ($C_0$), which is essentially a fresh and newly fabricated charged cell ready for discharge. Accordingly, the capacity of the cell after one discharge/recharge cycle is referred to herein as the first capacity ($C_1$), the capacity of the cell after two discharge/recharge cycles is referred to as the second capacity ($C_2$), and so on. For example, the total capacity of a cell after the $n^{th}$ discharge/recharge cycles ($\Sigma C_n$), wherein n is an integer, is the sum of $C_0$, $C$, $C_2$, $C_3$, etc., up to $C_n$.

Hence, according to some embodiments, the electrochemical cell as described in any one of the present embodiments is characterized by a capacity to undergo at least one discharge/recharge cycle at a DOD of at least about 1%, 5%, 10%, 20%, 30%, 40%, 50%, 60%, 70%, 80%, 90%, 95%, or about 100%. Alternatively, according to some embodiments, the device provided herewith is characterized by a total capacity following one discharge/recharge cycle, namely $C_0+C_1$, being larger than $C_0$ ($C_0+C_1>C_0$). According to some embodiments, $\Sigma C_n$ is larger than $C_0$ ($\Sigma C_n>C_0$).

A Process for Fusing Metals:

Another embodiment of the method for activation self-passivated metals is in the flied of metal fusing. Typical welding and soldering involves melting of one or more metals and allowing the molten metals to fuse together. In the case of self-passivated metals, the processes of welding, brazing or soldering of these metals are more difficult to execute due to the passivation layer on their surface, which is typically characterized by a melting temperature higher than the base metal, and the tendency of the metal to re-passivate and typically burn when exposed to ambient atmosphere at these elevated temperatures. While reducing the present invention to practice, the inventors have found that contacting the metals to be fused with a fluoroanion-containing composition, as described herein, affords excellent welds even when fusing two objects made of a self-passivated metal.

According to an aspect of some embodiments of the resent invention, there is provided a process of fusing a first metal or a first metal alloy to a second metal or a second metal alloy, wherein at least one of the first metal or the second metal is a self-passivated metal. The process, according to embodiments of the present invention, is effected by contacting the surface of the first metal, or the surface of the second metal, or the surface of both the first and the second metal, or one of the first or second metals which is a self-passivating metal, with a fluoroanion-containing composition as described hereinabove, to thereby obtain an activated metal surface. The process further includes melting one or both the first and second metals or melting a filler metal so as to fill an interface between the first and second metals, and cooling the first and second metals.

In the context of fusing metals, any one of the first, second or filler metal is independently the metal which is activated using the method for activating metals, according to some embodiments of the present invention.

In the context of embodiments of the present invention, the term "fusing" refers to any one of the processes known in the art as welding, brazing, soldering, or otherwise melt-joining or melt-connecting two or more metal objects one to another.

In the context of embodiments of the present invention, the term "welding" refers to a process that joins metal objects by causing coalescence. This is often done by melting the metal objects and adding a filler material to form a pool of molten material (the weld pool) that cools to become a joint, with pressure sometimes used in conjunction with heat, or by itself, to produce the weld. This is different than soldering and brazing, which involve melting a lower-melting-point material between the metal objects to form a bond between them, without melting the metal objects. The high applied temperatures are required in order to efficiently melt the metals involved. For all metals and alloys especially the ones protected by oxide layer the needed temperatures are higher what expressed by larger applied voltage and current. Moreover, in case of self-passivated metals, when welded the molten welding pool tends to react rapidly with ambient oxygen if no protecting environment is applied, such as Argon, $CO_2$ and Helium. Some of the welding methods include shielded metal arc welding (SMAW), also known as "stick welding"; gas tungsten arc welding (GTAW), also known as TIG (tungsten, inert gas), that uses a non-consumable tungsten electrode to produce the weld while the weld area is protected from atmospheric contamination by an inert shielding gas such as Argon or Helium; gas metal arc welding (GMAW), commonly termed MIG (metal, inert gas), uses a wire feeding gun that feeds wire at an adjustable speed and flows an argon-based shielding gas or a mix of argon and carbon dioxide (CO2) over the weld puddle to protect it from atmospheric contamination; flux-cored arc welding (FCAW), almost identical to MIG welding except it uses a special tubular wire filled with flux, and it can be used with or without shielding gas, depending on the filler; submerged arc welding (SAW) that uses an automatically fed consumable electrode and a blanket of granular fusible flux, wherein the molten weld and the arc zone are protected from atmospheric contamination by being "submerged" under the flux blanket; and electroslag welding (ESW) which is a highly productive, single pass welding process for thicker materials between 1 inch (25 mm) and 12 inches (300 mm) in a vertical or close to vertical position.

In the context of embodiments of the present invention, the term "brazing" refers to a metal-joining process whereby a filler metal is heated above melting point and distributed between two or more close-fitting metal objects by capillary action. The filler metal is brought slightly above its melting temperature while protected by a suitable atmosphere, usually a flux of an inert gas, and allowed to flow over the objects together (known as wetting) and is then cooled to join the metal objects together. Brazing is similar to soldering, except the temperatures used to melt the filler metal are higher for brazing.

In the context of embodiments of the present invention, the term "soldering" refers to a process in which two or more metal objects are joined together by melting and flowing a filler metal (solder) into the joint, the filler metal having a lower melting point than the adjoining metals. Soldering differs from welding in that soldering does not involve melting the metal objects. In brazing, the filler metal melts at a higher temperature, but the metal objects do not melt.

In general, it is noted that removal of the passivation layer and/or modification of the surface of the metal at the fusing area, which is effected by contacting the surface of the metal object with the fluoroanion-containing composition as described herein, will allow the fusing process to take place at a lower temperature resulting by lower applied voltage and current. Additionally, the modified metal surface having the above-mentioned HF-species, will prevent further surface passivation and melting pool oxidation which means that no protecting inert gas is required.

In the case of brazing and soldering, contacting the surface of the metal object with the fluoroanion-containing composition as described herein, will provide better adhesion between the filler metal and the soldered/brazed metal objects.

According to some embodiments of the present invention, contacting the surface of some metal objects with the fluoroanion-containing composition as described herein, will allow the fusing of metals which are presently considered to be impossible to fuse, such as aluminum and copper.

In some embodiments, the process further includes the use of a filler metal, and the process further includes contacting the surface of the filler metal with a fluoroanion-containing composition, to thereby obtain an activated filler metal surface. In some embodiments, the filler metal is a self-passivated metal.

According to some embodiments, the process is effected at a temperature lower than a melting temperature of the passivation layer of any one of the metals.

According to some embodiments, the process is effected at ambient atmosphere, namely the process does not require the fusing process to be carried out in an inert atmosphere.

Metal Deposition:

Other than a use in metal surface activation, electrochemical cell devices and the metal fusing processes presented hereinabove, the method for activating metal surfaces, as presented herein, can be used effectively in various industrial and research application, such as chemical and physical vapor deposition of metals, various coating processes including painting and anodization, as well as various applications in the microelectronic field. For example, copper electrochemical deposition on top of Ta based diffusion barrier, such as in the damascene process, can be carried out effectively in a fluoroanion-containing composition as a pretreatment for tantalum surface activation prior the copper deposition step. The use of the metal activation methods, according to some of the embodiments presented herein, may also render the used of seeding redundant, allowing more delicate structural features on the substrate to be coated with the deposited metal in a more efficient and simple manner.

In the context of metal deposition, the substrate metal is the metal which is activated using the method for activating metals, according to some embodiments of the present invention. In addition, the metal oxide used as a source of metal for deposition is also part of the metal passivating species which are removed and modified by the fluoroanion-containing composition, according to some embodiments of the present invention.

The aspect of metal deposition is also relevant to the aspect of secondary batteries comprising an anode made of a passive metal, such as aluminum, wherein the recharging process requires the oxidized metal species in the electrolyte to be reduced back to the metallic state and deposit on the anode.

Furthermore, in embodiments where the anode material is oxidized into metal oxides, the process of battery recharge also requires the ability to render the metal oxide electrochemically reactive and allow these oxides to be used as a source of metal species that can be deposited on the anode. As demonstrated in the Example section that follows below, the use of a fluoroanion-containing composition allows both the activation of a passive metal surface to allow deposition thereon, as well as turning a metal oxide into an electrochemically reactive source of metal for metal deposition. This dual function of the fluoroanion-containing composition described herein opens the way leading to a fully functional rechargeable battery based on aluminum and other self-passivated metals, as well as improvements of other type of batteries using other metals.

According to an aspect of some embodiments of the present invention, there is provided a method for depositing a first metal on the surface of a second metal, which includes contacting a surface of the second metal with a fluoroanion-containing composition as described herein to thereby afford an activated metal surface, and depositing the first metal on the activated surface.

According to some embodiments of the present invention, the method of metal deposition presented herein can be applied for electrodeposition of a metal on any electrically conductive or semi-conductive surface such as, without limitation, glassy carbon, semi-conductors (e.g., silicon), conductive polymers and carbon fullerenes and nano-tubes.

In some embodiments, the method further includes separating the second metal from the fluoroanion-containing composition and placing it in an electrolyte that includes a source of the first metal, and applying a cathodic potential or cathodic current between the second metal and an electrode placed in the electrolyte.

In some embodiments, the method is carried in an invariable container (a single-pot electrodeposition), namely the second metal is maintained in the fluoroanion-containing composition, and the method further includes adding a source of the first metal into the fluoroanion-containing composition. A single-pot electrodeposition is advantageous for several reasons, including saving operational steps, such as washing, drying and the likes.

In some embodiments, the source of the first metal is a salt of the first metal, an oxide of the first metal, a sulfide of the first metal, a nitride of the first metal, an oxidized form of the first metal and any combination thereof.

In some embodiments where the source of the first metal is added to the fluoroanion-containing composition, the method further includes applying a potential between the second metal immersed in the fluoroanion-containing composition, and an electrode which is in an electrical communication with the same fluoroanion-containing composition.

In some embodiments, the method further includes applying a potential between the second surface immersed in the fluoroanion-containing composition, and an electrode which is in an electrical communication with the same fluoroanion-containing composition.

In some embodiments, the second metal is a self-passivated metal, as described hereinabove.

In some embodiments, the second metal is a diffusion barrier metal, as described hereinabove.

In some embodiments, the first metal is copper and the second metal comprises tantalum. In some embodiments, the first metal deposition on the second metal is effected without seeding the second metal therewith.

As discussed hereinabove, one exemplary use of the method for depositing an oxidized form of a metal on a metal substrate, is in a rechargeable battery such as Al/air battery having a fluoroanion-containing electrolyte, wherein the aluminum anode is consumed during discharge while aluminum oxide is formed on the air cathode, and wherein aluminum oxide is recycled on the cathode during recharge and serves as a source of aluminum ions that deposit on the anode and replenish it for the next discharge. The contribution of the fluoroanion-containing electrolyte is made in both the discharge and the recharge, and is made on both the anode and the cathode.

It is expected that during the life of a patent maturing from this application many relevant methods, uses and compositions will be developed and the scope of the terms methods, uses, compositions, batteries and devices are intended to include all such new technologies a priori.

As used herein throughout, and for any one of the embodiments described herein, the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrase "substantially devoid of" a certain substance refers to a composition that is totally devoid of this substance or includes no more than 0.1 weight percent of the substance.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Passive Metal Activation

In order to demonstrate the capacity of presently claimed method to activate a self-passivated metal surface, open circuit potential (OCP) experiments were conducted in an electrochemical cell on different metals and alloys having native oxides passivating layer of about 2-5 nm thick.

A two-electrode electrochemical cell configuration was used, with a self-passivating metal and its native oxide acting as a working electrode. A gel-based electrode was utilized as a reference electrode [Shvartsev, B. et al., *Phys. Chem. Chem. Phys.*, 2013, 15(41), p. 17837-45]. The experiments were carried out in an electrochemical cell containing a polypropylene holder for the self-passivating metal sample, supported with a screwed back contact stainless steel plate. The exposed surface was 0.95 cm$^2$.

A sample of the self-passivating metal titanium (Alfa Aesar, 99% pure, 0.5 mm thick), and a sample of the self-passivating metal tantalum (Alfa Aesar, 99.95% pure, 0.25 mm thick), each exhibiting a native oxide layer of about 2-3 nm, were utilized as exemplary self-passivating metals. The self-passivated metal samples were cleaned with acetone and ethanol prior to the surface activation experiments, which was conducted at room temperature.

After the cell were assembled, 0.6 ml of an exemplary fluoroanion-containing composition, namely EMIm(HF)$_{2.3}$F RTIL was added. Open circuit potential (OCP) measurements were performed with EG&G Princeton Applied Research potentiostat/galvanostat 273. In some experiments, the measurement was started simultaneously with the electrolyte addition.

Figure 1:
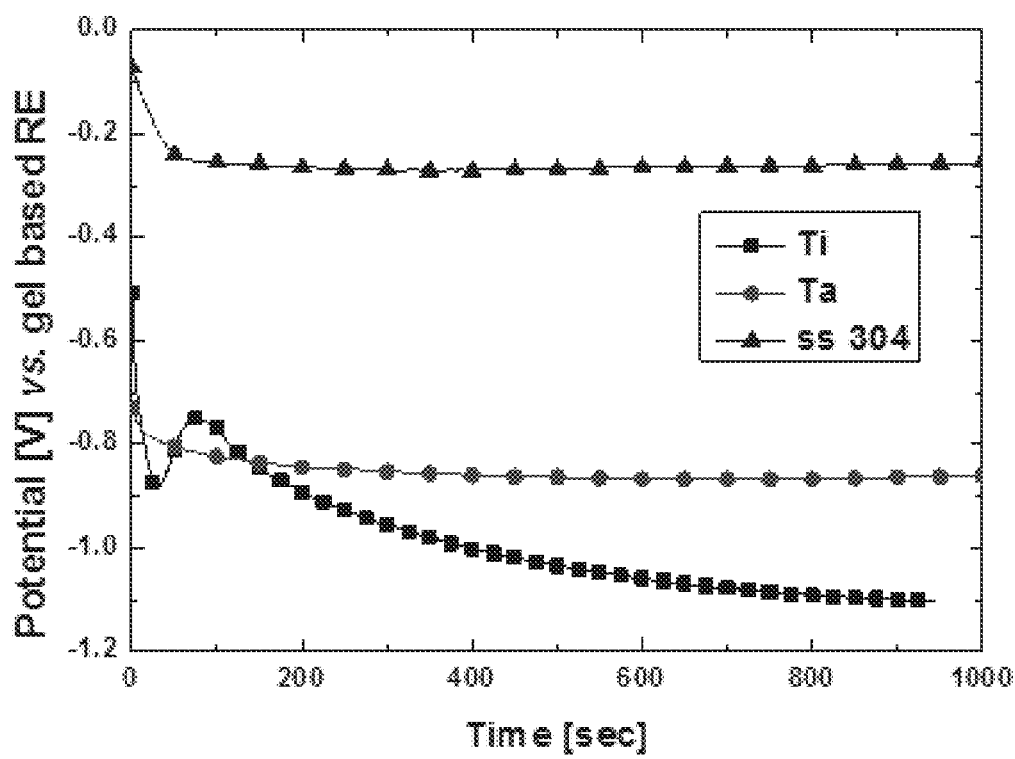
FIG. 1 presents comparative plots showing the open circuit potential as a function of time, using untreated (i.e., having a native oxide layer) anodes made of titanium (Ti, plot marked in squares), tantalum (Ta, plot marked in circles) and stainless steel grade 304 (ss 304, plot marked in triangles) against a gel-based reference electrode in $EMIm(HF)_{2.3}F$ RTIL as an electrolyte.

FIG. 1 presents the results of open circuit potential measurements as a function of time, using untreated anodes made of titanium (Ti, plot marked in squares), tantalum (Ta, plot marked in circles) and stainless steel grade 304 (ss 304, plot marked in triangles), all of which exhibiting a native oxide layer thereon, against a gel-based reference electrode in EMIm(HF)$_{2.3}$F RTIL as an electrolyte.

As can be seen in FIG. 1, the OCP starts at relatively high values for all metal electrodes, reflecting an oxide etching curve which is indicative of the presence of an oxide-passivated layer on the surface of the metal. After a few tens of seconds the OCP values decrease rapidly, indicating a presence of a bare metal electrode surface, free of the oxide layer. It is noted that the difference in the initial and final potential depends on the equilibrium of the metal or alloy in the exemplary fluoroanion-containing composition EMIm(HF)$_{2.3}$F RTIL electrolyte.

Potentiodynamic experiments were conducted on a titanium electrode in order to demonstrate that the surface of a metal is in an activated state due to immersion in the exemplary fluoroanion-containing composition EMIm(HF)$_{2.3}$F RTIL without applying any current or electric potential. The measurements were conducted at two time points: as soon as the electrode was immersed in the electrolyte; and after half an hour of immersion in the same electrolyte solution, for assuring that the metal surface activation has been effected.

Figure 2:
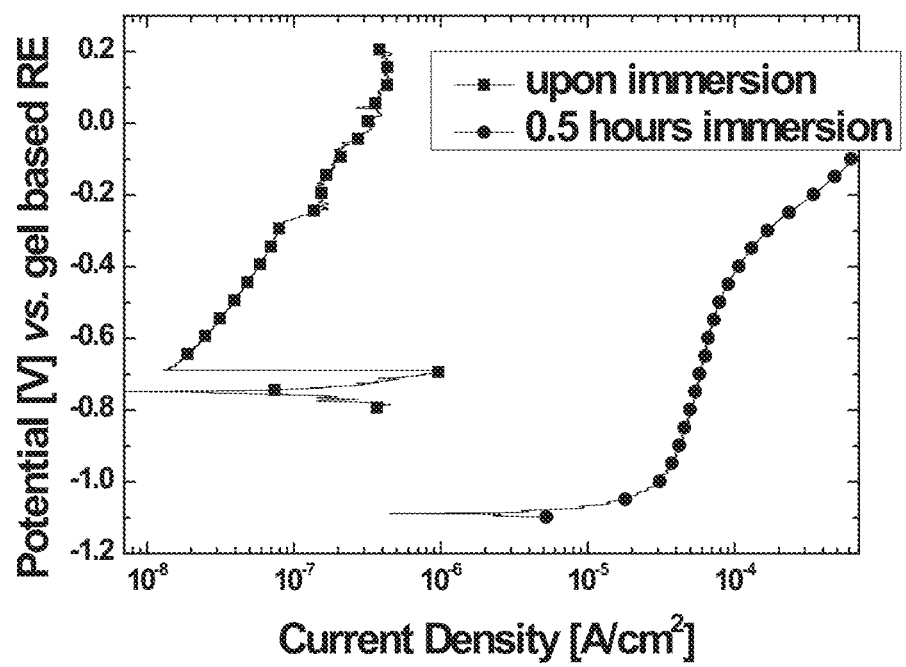
FIG. 2 presents comparative plots showing the potential as a function of current density [$A/cm^2$] at a scan rate of 5 mV/sec, wherein the plot marked in squares denotes the measurement taken upon immersion of untreated (i.e., having a native oxide layer) titanium anode in $EMIm(HF)_{2.3}F$ RTIL electrolyte, and the plot marked by circles denotes the measurement taken after 30 minutes of immersion in the same electrolyte.

FIG. 2 presents the results of the potentiodynamic experiments as measured for an untreated titanium anode in exemplary fluoroanion-containing composition EMIm$(HF)_{2.3}$F RTIL electrolyte, showing the plots of the potential [V] as a function of the current density [mA/cm$^2$] at a scan rate of 5 mV/sec, wherein the plot marked in squares denotes the measurements taken upon immersion of the electrode in the electrolyte, and the plot marked by circles denotes the measurements taken after 30 minutes of immersion in the same electrolyte.

As can be seen in FIG. 2, upon immersion of the passivated titanium anode the plot exhibits a low anodic current which is indicative of a passive anode behavior due to the native oxide layer on its surface. As can further be seen in FIG. 2, a similar titanium anode that was immersed in the exemplary fluoroanion-containing composition EMIm$(HF)_{2.3}$F RTIL electrolyte for half an hour prior to applying a current, exhibits relatively higher anodic currents. It has been concluded that the higher anodic current exhibited by the fluoroanion-RTIL-treated anode is the result of favorable surface conditions for active Ti dissolution.

Example 2

Aluminum-Air Battery

The use of aluminum as an anodic fuel source has been hampered due to the tendency of aluminum to form a passivating oxide layer. The following example demonstrates the use of the methodology described herein in activating an aluminum anode in an aluminum-air battery.

The exemplary fluoroanion-containing compositions 1-ethyl-3-methyl-imidazolium oligofluorohydrogenate, EMIm$(HF)_{2.3}$F and 1-butyl-1-methylpyrrolidinium oligofluorohydrogenate, Pyr$_{14}$$(HF)_{2.3}$F (Boulder Ionics, US) RTILs were used for metal activation and as a electrochemical cell electrolyte.

For anodic and cathodic behavior study a three-electrode configuration was used, with a 0.25 mm thick aluminum foil (99.997% pure, Alfa Aesar) serving as the working electrode in anodic polarization measurements, and porous carbon-based air electrode (Electric Fuel, Inc.) for the catodic polarization experiments.

The porous carbon-based air electrode exhibited a surface area of 533 m$^2$/g, average pore diameter of 5.43 nm and carbon loading of 19 mg/cm$^2$, and 6.6% by weight MnO$_2$ catalyst dispersed in 77% by weight activated carbon powder, and 16.4% by weight PTFE as binder.

Platinum electrode was used as a counter electrode and a Fc/Fc$^+$ gel based reference electrode was utilized as such.

Half-Cell Experiments:

Half-cell experiments were carried out in an electrochemical cell containing a polypropylene based holder with nickel metal (98% pure, Spectrum) current collectors. The exposed electrode surface was 1.13 cm$^2$.

Prior to the experiment the aluminum electrode was cleaned in ethanol and in acetone and then dried. No pretreatment was conducted on the air electrode.

After the cell has been assembled, 1 ml of the RTIL was added. Prior to the experiment the cell was left to rest for several hours, depending on the type of air cathode used.

Potentiodynamic experiments were performed with VersaSTAT Princeton Applied Research potentiostat/galvanostat.

The initial experiments with the proposed Al/EMIm$(HF)_{2.3}$F/Air battery was conducted with a half cell configurations. These measurements provided the cell potential and the effective current densities which may be afforded in such configuration, and the potentidynamic measurements are presented in FIG. 3.

Figure 3:
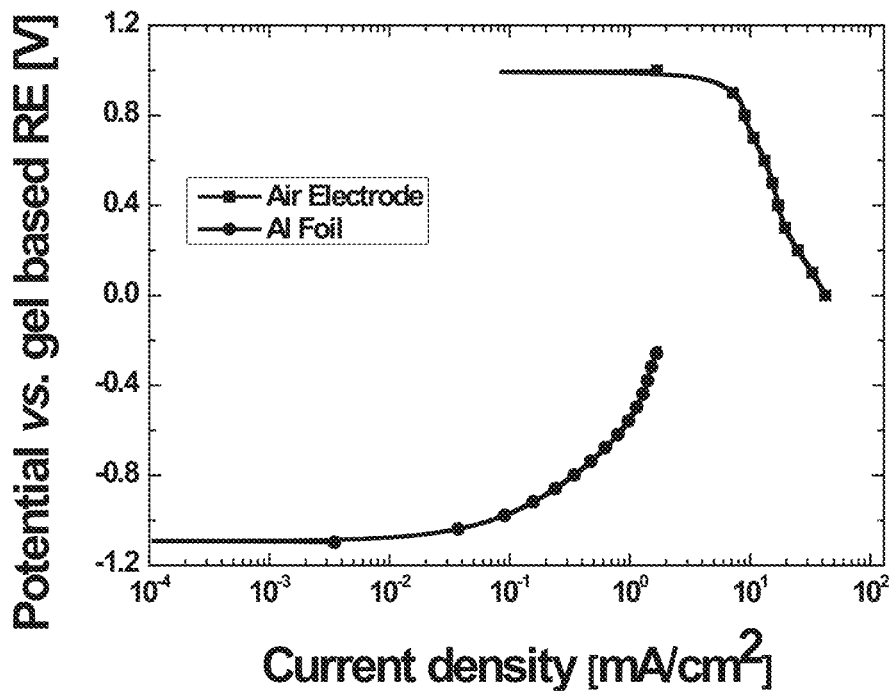
FIG. 3 presents comparative plots showing the potential as a function of current density [$A/cm^2$] at a scan rate of 5 mV/sec of an $Al/EMIm(HF)_{2.3}F/air$ battery configuration, reflecting the behavior of the aluminum foil (plot marked in circles) and the air electrode (plot marked in squares)

FIG. 3 presents a plot of potential as a function of current measured after 24 hours of OCP exposure potentidynamic experiment conducted in an aluminum/air battery configuration at a scan rate of 5 mV/sec, showing the readings from the aluminum foil (plot marked in circles) and the air electrode (plot marked in squares).

As can be seen in FIG. 3, the aluminum/air fuel cell exhibited an open circuit potential of 2.15 V. In Addition, the current densities of both the aluminum and the air electrodes were in the range of 1-15 mA/cm$^2$ and higher at considerably low polarizations, less than 0.5 V.

These results clearly demonstrate that the presently claimed metal activation method renders an aluminum/air fuel cell configuration an efficient aluminum-based battery.

Figure 4:
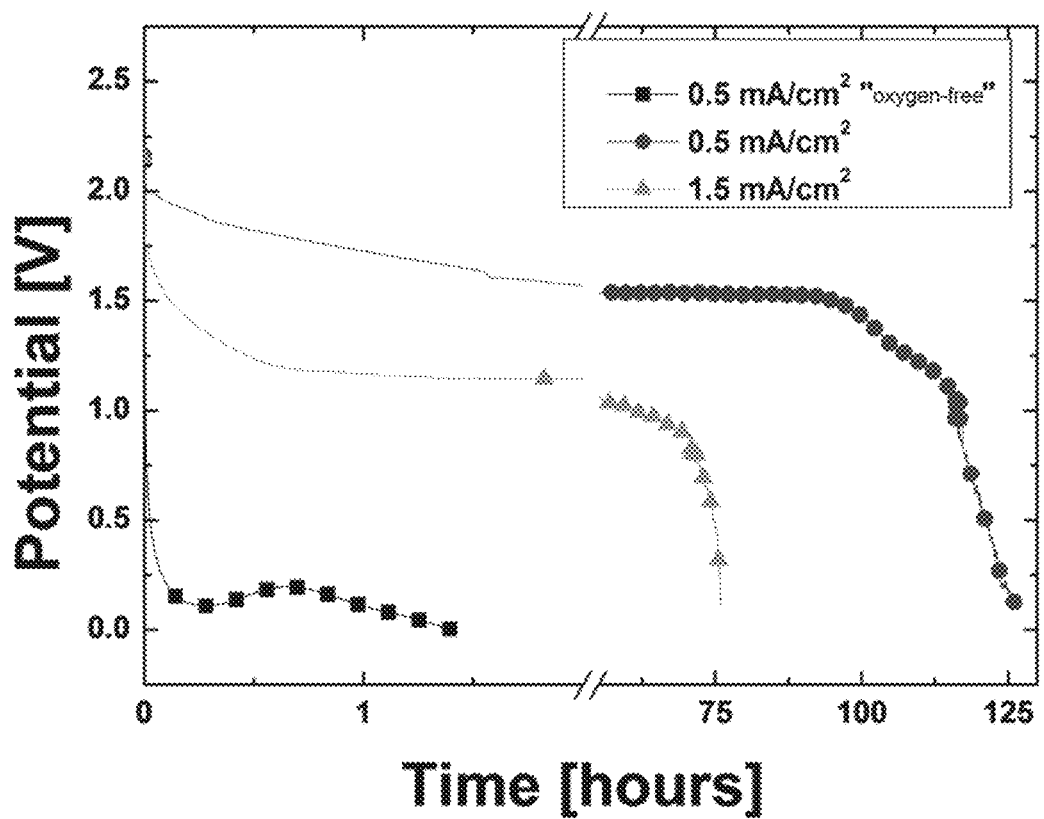
FIG. 4 presents comparative plots showing the potential as a function of time (cell discharge) measured in an $Al/EMIm(HF)_{2.3}F/Air$ battery, according to exemplary embodiments of the present invention, showing the cell behavior at three discharge current densities: 0.5 $mA/cm^2$ in an oxygen-free environment (glove box) marked in squares, 0.5 $mA/cm^2$ in ambient air marked in circles and 1.5 $mA/cm^2$ in ambient air marked in triangles.

Full Cell (Battery) Experiments:

Battery discharge experiments were performed with the same cell structure and the same active materials, aluminum and air electrode, in the two electrode mode (no reference electrode) using Arbin BT2000 battery test system, and the results are presented in FIG. 4.

FIG. 4 presents comparative plots of potential as a function of time (cell discharge) measured in an Al/EMIm(HF) 2.3F/Air battery, according to embodiments of the present invention, showing the cell behavior at three discharge current densities: 0.5 mA/cm$^2$ in an oxygen-free environment (glove box) marked in squares, 0.5 mA/cm$^2$ in ambient air marked in circles and 1.5 mA/cm$^2$ in ambient air marked in triangles.

As can be seen in FIG. 4, the battery exhibited the ability to support current densities as high as 1.5 mA/cm$^2$ and even higher, while the battery discharge in the oxygen-free environment failed to support the applied current density.

Additional full cell discharge experiments were performed with another exemplary RTIL based on a Pyr$_{14}$$^+$ cation and an $(HF)_{2.3}$F$^-$ anion. The experiments were performed at discharge current density of 0.25 mA/cm$^2$.

Figure 5:
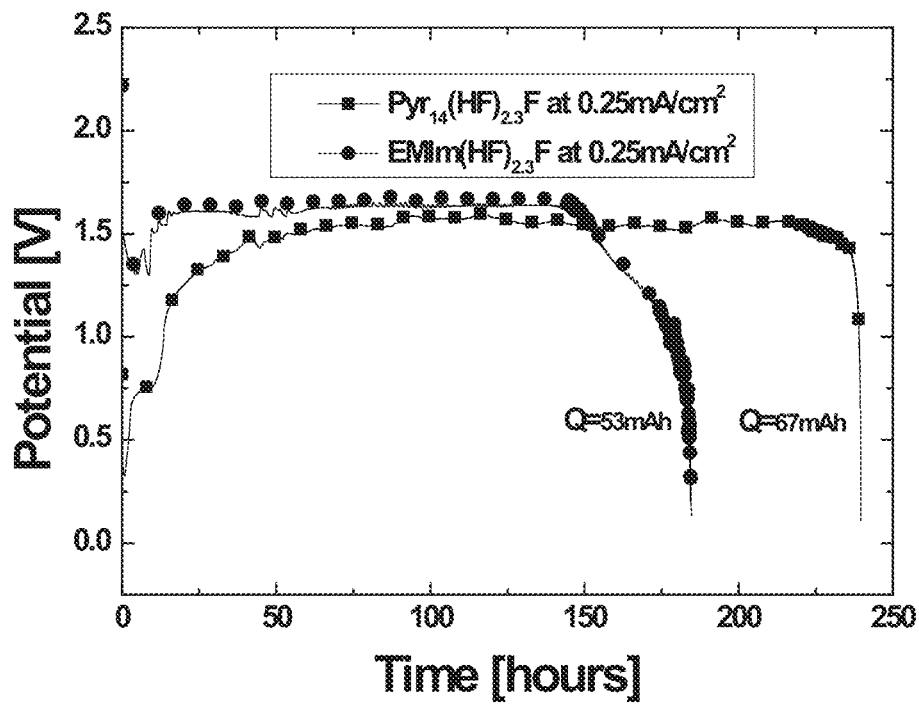
FIG. 5 presents comparative plots showing the potential as a function of time (cell discharge) measured in an aluminum/air battery, according to exemplary embodiments of the present invention, comprising the RTIL $EMIm(HF)_{2.3}F$ electrolyte (plot marked in circles) and comprising the RTIL $Pyr14(HF)_{2.3}F$ electrolyte (plot marked in squares), showing the cell behavior at current density of 0.25 $mA/cm^2$.

FIG. 5 presents comparative plots of potential as a function of time (cell discharge) measured in an aluminum/air battery, according to embodiments of the present invention, comprising the RTIL EMIm$(HF)_{2.3}$F electrolyte (plot marked in circles) and comprising the RTIL Pyr$_{14}$$(HF)_{2.3}$F electrolyte (plot marked in squares), showing the cell behavior at current density of 0.25 mA/cm$^2$.

As can be seen in FIG. 5, the results indicate that also Pyr$_{14}$$(HF)_{2.3}$F serves as an effective metal (aluminum) activating agent and an effective electrolyte in an aluminum/air battery, according to embodiments of the present invention. Although, the initial drop in the potential during the discharge is higher than in the case of a cell using EMIm$(HF)_{2.3}$F, the total capacity of the cell using Pyr$_{14}$$(HF)_{2.3}$F is bigger (67 mAh for Pyr$_{14}$$(HF)_{2.3}$F compared with 53 mAh for EMIm$(HF)_{2.3}$F). It is noted that the conductivity of Pyr$_{14}$$(HF)_{2.3}$F is presumably lower than that of EMIm$(HF)_{2.3}$F, which may explain the difference in the discharge of the two compared cells.

Example 3

Aluminum-Metal Oxide Battery

In order to verify the capacity of the presently claimed method of activating aluminum for use as an anode in other battery settings, two additional cathodes, one of manganese oxide ($MnO_2$) and another of vanadium oxide (vanadia, $V_2O_5$), were tested utilizing aluminum as anode and EMIm$(HF)2.3F$ as the electrolyte.

Cell systems based on the abovementioned electrodes were discharged at a current density of 0.25 mA/cm$^2$ following the procedure described for the aluminum/air battery.

Figure 6:
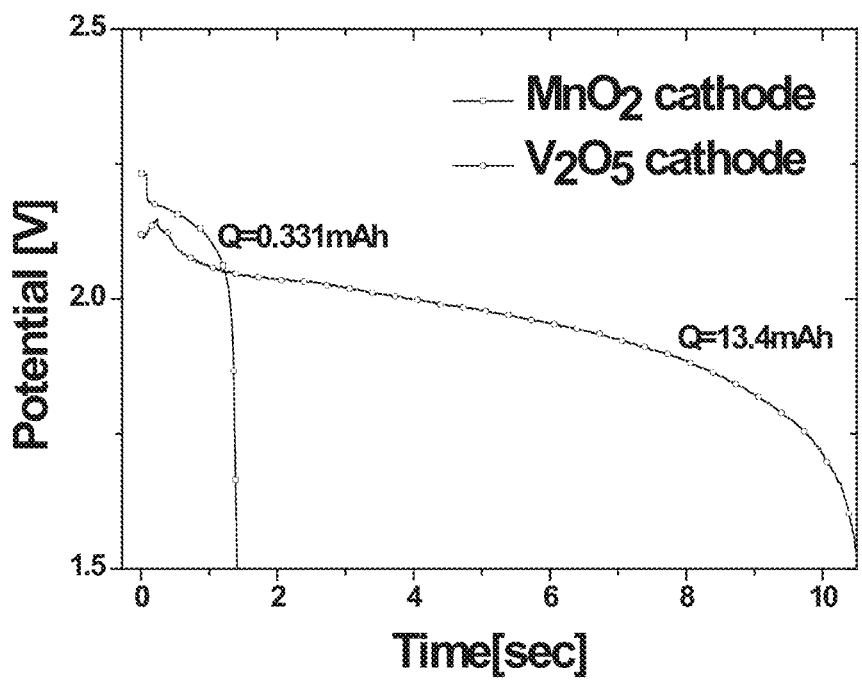
FIG. 6 presents comparative plots showing the potential as a function of time (cell discharge) and cathode type, measured in an $Al/EMIm(HF)_{2.3}F/MnO_2$ battery (plot marked in squares) and $Al/EMIm(HF)_{2.3}F/V_2O_5$ battery (plot marked in circles), showing the cells behavior at a current density of 0.25 $mA/cm^2$.

FIG. 6 presents comparative plots of potential as a function of time (cell discharge) measured in an Al/EMIm$(HF)_{2.3}F/MnO_2$ battery (plot marked in squares) and Al/EMIm$(HF)_{2.3}F/V_2O_5$ battery (plot marked in circles), showing the cells behavior at a current density of 0.25 mA/cm$^2$.

As can be seen in FIG. 6, the cell comprising aluminum-based anode and vanadia-based cathode exhibited cell discharge capacity of 13.4 mAh, which is two orders of magnitude higher compared to a comparable cell configuration using a $MnO_2$ based cathode, which exhibited cell discharge capacity of 0.331 mAh.

These results clearly demonstrate that using the presently claimed methodology renders the use of aluminum as an anode possible in various cell configurations using different cathode materials such as described herein.

Example 4

Aluminum Corrosion Measurements

In order to demonstrate the low corrosive effect of RTILs on passive metals, aluminum was used as an anode in a battery cell configuration. The experiments were performed by use linear polarization technique with VersaSTAT Princeton Applied Research potentiostat/galvanostat. The experiments for determining the corrosion currents over time, were performed with the same cell structure and the same active materials, aluminum anode and an air cathode in the three-electrode configuration using EMIm(HF)2.3F as an electrolyte, as described hereinabove.

Figure 7:
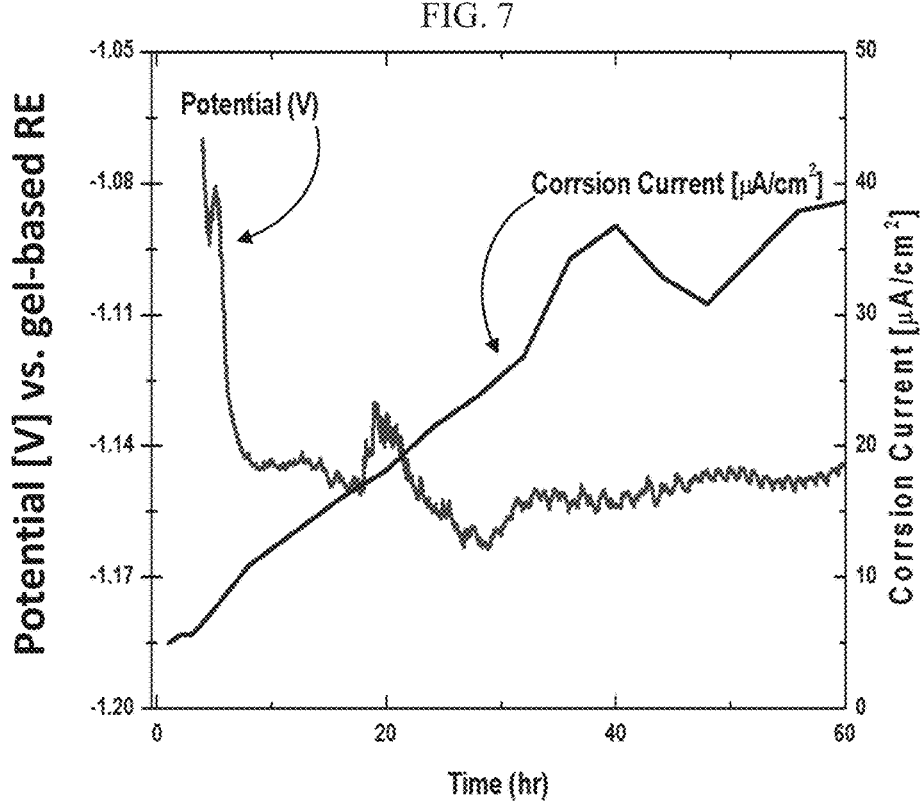
FIG. 7 presents a dual plot showing the potential against a gel-based reference electrode as a function of time (left-hand vertical axis in volts) and of corrosion current as a function of time (right-hand vertical axis in $\mu A/cm^2$), as measured in a cell comprising an aluminum foil as working electrode and an air electrode as counter electrode, in the three-electrode configuration using $EMIm(HF)_{2.3}F$ as an electrolyte, showing the corrosion current of aluminum in an OCP conditions and reflecting the behavior of the anode at OCP conditions.

FIG. 7 presents a dual plot of potential against a gel-based reference electrode as a function of time (left-hand vertical axis in volts) and of corrosion current as a function of time (right-hand vertical axis in μA/cm$^2$), as measured in a cell comprising an aluminum foil as working electrode and an air counter electrode, in the three-electrode configuration using EMIm(HF)2.3F as an electrolyte, showing the relative stability of the cell's potential and the slow evolution of corrosion current of aluminum in an OCP configuration.

As can be seen in FIG. 7, the corrosion of aluminum in EMIm(HF)2.3F is in the range of tens of micro-Amperes (μA), which is three orders of magnitude lower than the corrosion rate of aluminum in an alkaline environment as published [Doche, M. L. et al., *Corros. Sci.* 41 (1999), p. 805; and Egan, D. R. et al., *Journal of Power Sources* 236 (2013)]. Furthermore, a stable potential of aluminum is clearly observed in FIG. 7, with a relatively small initial drift of 60 mV due to aluminum/electrolyte interactions, followed by an almost flat potential curve of about −1.15 V as measured versus a gel-based Fc/Fc$^+$ reference electrode (described above).

The results clearly demonstrate that after initial activation of the aluminum, the potential is relatively stable, indicating that the system is stable in terms of maintaining the surface of aluminum chemically and electrochemically active.

It is noted that the measured corrosion current densities for the RTIL solution where at most 50 μA/cm$^2$, calculated for 1 hour exposure to a weight loss of 16.8·10$^{-6}$ gr/cm$^2$. Comparing to the previous studies using alkaline-based metal activation solutions [Doche, M. L. et al., *Corros. Sci.* 41 (1999), p. 805], where the measured currents densities were found to be about 10 mA/cm$^2$ and by applying similar calculation and exposure time, the result obtained with the presently claimed method is a weight loss of 33.6·10$^{-4}$ gr/cm$^2$. This result demonstrates a reduction of corrosion in terms of mass loss of at least two orders of magnitude.

Example 5

Activated Surface Analysis

Attenuated Total Reflection (ATR) infrared spectroscopy analysis was conducted for an activated surface of aluminum, according to embodiments of the present invention. This analysis was also conducted comparatively for a single crystal p-type silicon wafer sample. Attenuated Total Reflection Fourier Transform InfraRed (ATR-FTIR) spectra were obtained with the use of a Nicolet spectrometer equipped with a DTGS detector. A reflection ATR accessory equipped with a diamond crystal at an incident angle of 45° was used.

Briefly, aluminum and silicon samples were analyzed before and after 1 hour exposure to EMIm$(HF)_{2.3}F$ RTIL. The exposure of the samples was effected by applying 100 μl of EMIm$(HF)_{2.3}F$ on the solid surfaces, after the surface was mechanically cleaned with an abrasive. Thereafter, the metal surface exposed to the fluoroanion-RTIL was washed with ethanol and analyzed spectrophotometrically.

The RTIL was also analyzed for control, based on the studies of Hagiwara, R. et al. [*Journal of the Electrochemical Society*, 149(1) D1-D6 (2002)]. As described in Hagiwara et al. pristine EMIm$(HF)_{2.3}F$ RTIL exhibits well recognized spectrum peaks pertaining to "HF-species", such as the $H_2F_3^-$ moiety which exhibits broad peaks at about 490, 1100, 1800, and 2400 cm$^{-1}$; and the $H_3F_4^-$ moiety which exhibits peaks at about 900 and 2900 cm$^{-1}$ in the IR spectrum. The EMI$^+$ moiety exhibits broad peaks at about 1000, 1800, 2000 and 2600 cm$^{-1}$.

FIG. 8 presents comparative plots of transmittance as a function of wavelength, resulting from an attenuated total reflection (ATR) infrared scan of a sample of pristine EMIm$(HF)_{2.3}F$ RTIL (plot 1), a sample of aluminum unexposed to EMIm$(HF)_{2.3}F$ RTIL (plot 2), a sample of a silicon wafer unexposed to EMIm$(HF)_{2.3}F$ RTIL (plot 3), a sample of aluminum after 1 hour exposure to EMIm$(HF)_{2.3}F$ RTIL (plot 4) and a sample of a silicon wafer after 1 hour exposure to EMIm$(HF)_{2.3}F$ RTIL (plot 5).

As can be seen in FIG. 8, pristine EMIm$(HF)_{2.3}F$ RTIL exhibited the expected spectrum, while the treated aluminum samples exhibited distinct peaks which are not seen in the untreated aluminum sample, and are therefore attributed to surface-bound "HF-species" resulting from exposure to the RTIL. Those peaks suggest an interreaction (chemical and/or physical) between aluminum and the RTIL. It is noted that cleaning the surface with ethanol prior to the ATR scan did not affect the spectra in terms of peaks intensity and position. In the comparative measurements conducted with silicon wafers, both the treated and untreated silicon wafer samples exhibited similar spectra with no significant changes in terms of peaks attributed to "HF-species".

FIG. 9 presents comparative plots of transmittance as a function of wavelength, resulting from an attenuated total reflection (ATR) infrared scan of a sample of EMIm$(HF)_{2.3}F$ RTIL (Plot 6), wherein peaks 61 and 65, associated with the $H_3F_4^-$ species, have a wavenumber of 2990 cm$^{-1}$ and 960 cm$^{-1}$ respectively and peaks 62, 63 and 64, associated with the $H_2F_3^-$ species, have a wavenumber of 2355 cm$^{-1}$, 1770 cm$^{-1}$ and 1020 cm$^{-1}$ respectively, a sample of an unexposed aluminum (Plot 7), and a sample of aluminum after 1 hour exposure to EMIm(HF)$_{2.3}$F RTIL (Plot 8), wherein peaks 81, 82, 84 and 85 correspond to peaks 61, 63, 64 and 65 in Plot 6 respectively.

As can be seen in FIG. 9, the RTIL-treated aluminum sample exhibits peaks which are reminiscent to the HF-species of the RTIL, and can be traced and identified according to their wavenumber.

The results of the experiment presented above are unexpected and show that silicon is not affected by the RTIL in a similar fashion as aluminum.

Example 6

Metal Activation in Diluted RTIL

In order to demonstrate the effect of fluoroanion species from various fluoroanion-containing compositions comprising a fluoroanion-RTIL diluted in a solvent on passivated metals, an aluminum-based electrochemical cell having a three-electrode configuration was used, with a 0.25 mm thick aluminum foil (99.997% pure, Alfa Aesar) serving as the working electrode in anodic polarization measurements, and porous carbon-based air electrode (Electric Fuel, Inc.) for the catodic polarization experiments. The porous carbon-based air electrode exhibited a surface area of 533 m$^2$/g, average pore diameter of 5.43 nm and carbon loading of 19 mg/cm$^2$, and 6.6% by weight MnO$_2$ catalyst dispersed in 77% by weight activated carbon powder, and 16.4% by weight PTFE as binder. Platinum electrode was used as a counter electrode and a Fc/Fc$^+$ gel based reference electrode was utilized as such.

Six exemplary fluoroanion-containing compositions were used as electrolytes in the above-described cell, each using [EMIm][(HF)$_{2.3}$F] RTIL as a source of fluoroanion species, mixed as a 30% by volume in various solvents and ionic liquids, including propylene carbonate (PC), tetraethylene glycol dimethyl ether (TEGDME, or tetraglyme) and dimethyl sulfide (DMS), [EMIm][TFSI], [EMIm][Trifluroimide] and [EMIm][Solfanate].

FIGS. 10A-F present comparative plots of potential as a function of time obtained in a potentiodynamic experiment conducted in a three-electrode aluminum-based electrochemical cell showing the cell behavior at discharge current density of 0.1 mA/cm$^2$, as measured for a fluoroanion-containing composition (electrolyte) comprising propylene carbonate (FIG. 10A), tetraethylene glycol dimethyl ether (FIG. 10B) and dimethyl sulfide (FIG. 10C), [EMIm][TFSI] (FIG. 10D), [EMIm][Trifluroimide] (FIG. 10E) and [EMIm][Solfanate] (FIG. 10F) serving as a solvent/diluent and 30% by volume [EMIm][(HF)$_{2.3}$F] mixed therewith and serving as a source of fluoroanion species (plot marked in triangles), and measured for the pristine solvent (plot marked in squares), whereas the aluminum was allowed to be in contact with the fluoroanion-containing composition for the first 24 hours prior to discharging the cell.

As can seen in FIGS. 10A-F, when the pristine solvents and ionic liquids not having oligofluororogenate anions therein were used as electrolytes, a sloping unstable OCP was recorded in the first 24 hours, indicating insufficient oxide dissolution and de-activation of the anode surface, and resulting in an inoperable cell which could not be discharged at a current application of 0.1 mAcm$^{-2}$. In contrast, when 30% by volume of EMIm(HF)2.3F were added to the solvents and the cell was studied under the same conditions, a stable OCP of about 2.1 V was recorded (similar to OCP in pristine EMIm(HF)2.3F), and the cell was discharged for as long as 50 hours.

Example 7

Additives in Fluoroanion-Containing Electrolytes

Full cell discharge experiments were performed using the Al/air battery as presented hereinabove according the embodiments of the present invention, with the exemplary RTIL based on a Pyr$_{14}^+$ cation and an (HF)$_{2.3}$F$^-$ anion having an aluminum salt dissolved therein. The experiments were performed at discharge current density of 0.5 mA/cm$^2$.

Figure 11:
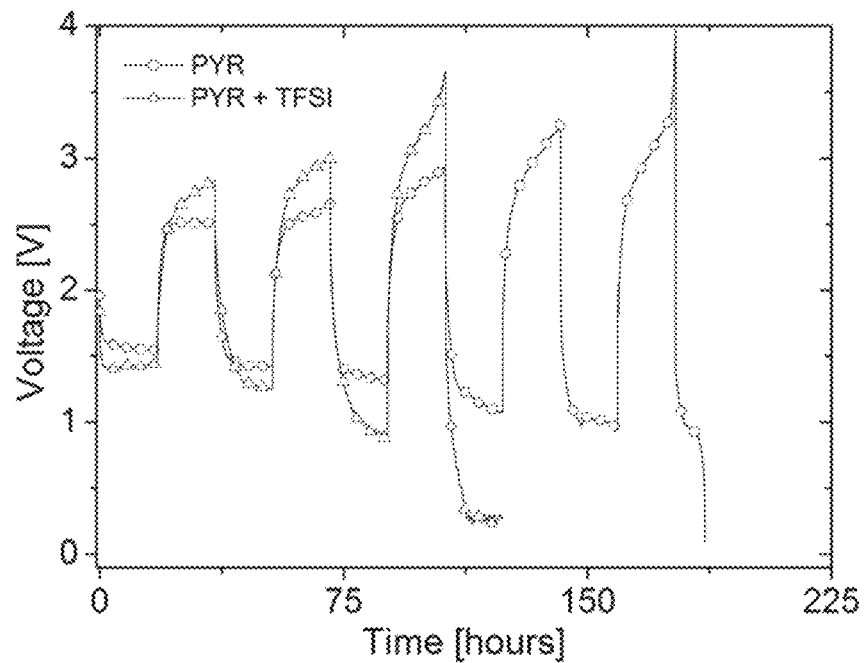
FIG. 11 presents a comparative plot showing the voltage versus time and demonstrating discharge/charge cycles at 0.5 mAcm$^{-2}$ of an aluminum/air battery according to some embodiments of the present invention, using Pyr$_{14}$(HF)$_{2.3}$F RTIL (marked by circles) and 0.1 M aluminum bis(trifluoromethane)sulfonimide (AlTFSI) salt dissolved in Pyr$_{14}$(HF)$_{2.3}$F RTIL (marked by triangels) in constant current of 10 mAh per discharge/charge cycle, wherein the cell was rested in full configuration for 24 hours prior the discharge.

FIG. 11 presents a comparative plot of voltage versus time showing discharge/charge cycles at 0.5 mAcm$^{-2}$ of an aluminum/air battery according to some embodiments of the present invention, using Pyr$_{14}$(HF)$_{2.3}$F RTIL (marked by circles) and 0.1M aluminum bis(trifluoromethane)sulfonimide (AlTFSI) salt dissolved in Pyr$_{14}$(HF)$_{2.3}$F RTIL (marked by triangels) in constant current of 10 mAh per discharge/charge cycle, wherein the cell was rested in full configuration for 24 hours prior the discharge.

As can be seen in FIG. 11, between 4 to 6 discharge/charge cycles were afforded in the Al-air battery using a fluoroanion-RTIL electrolyte, and the same having additional metal ions dissolved therein.

Additional full cell experiments were performed in order to demonstrate that an Al/air battery according to some embodiments of the present invention is operable with the addition of various oxidized metal sources to the electrolyte, such as metal oxides and metal ions (salts). The motivation to add various oxidized metal sources to the electrolyte is to have a metal-ion rich electrolyte that can assist diffusion-controlled processes as well as metal deposition and dissolution processes at the electrodes.

Figure 12:
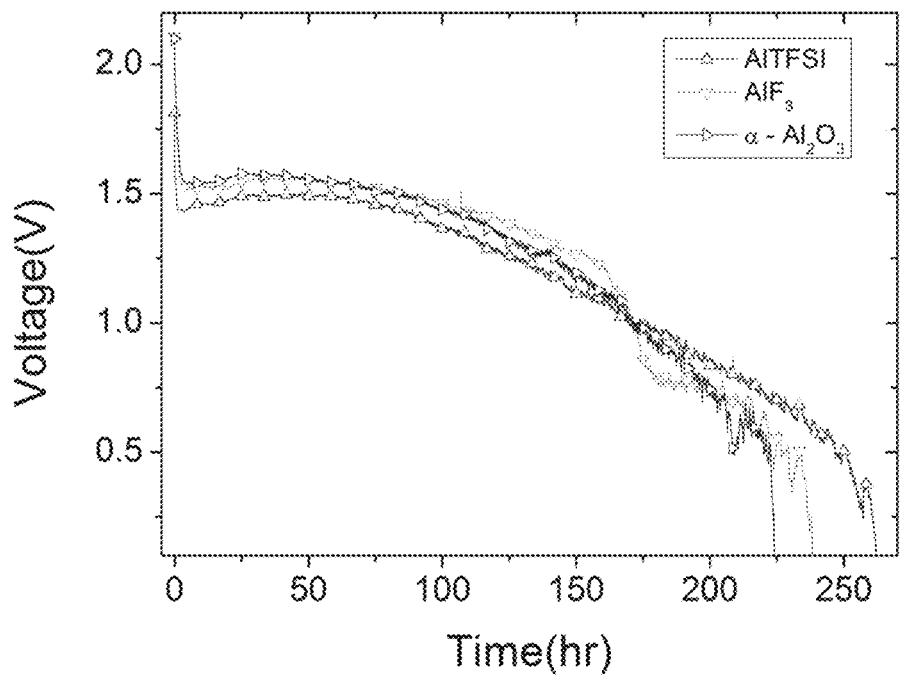
FIG. 12 presents a comparative plot showing voltage versus time and demonstrating discharge at 0.5 mAcm$^{-2}$ of an aluminum/air battery according to some embodiments of the present invention, using 0.1 M aluminum bis(trifluoromethane)sulfonimide (AlTFSI) salt dissolved in EMIm(HF)$_{2.3}$F RTIL (marked by up-pointing triangels), 0.1 M AlF$_3$ dissolved in EMIm(HF)$_{2.3}$F RTIL (marked by down-pointing triangels) and 0.1 M α-Al$_2$O$_3$ dissolved in EMIm(HF)$_{2.3}$F RTIL (marked by right-pointing triangels)
Figure 13A:
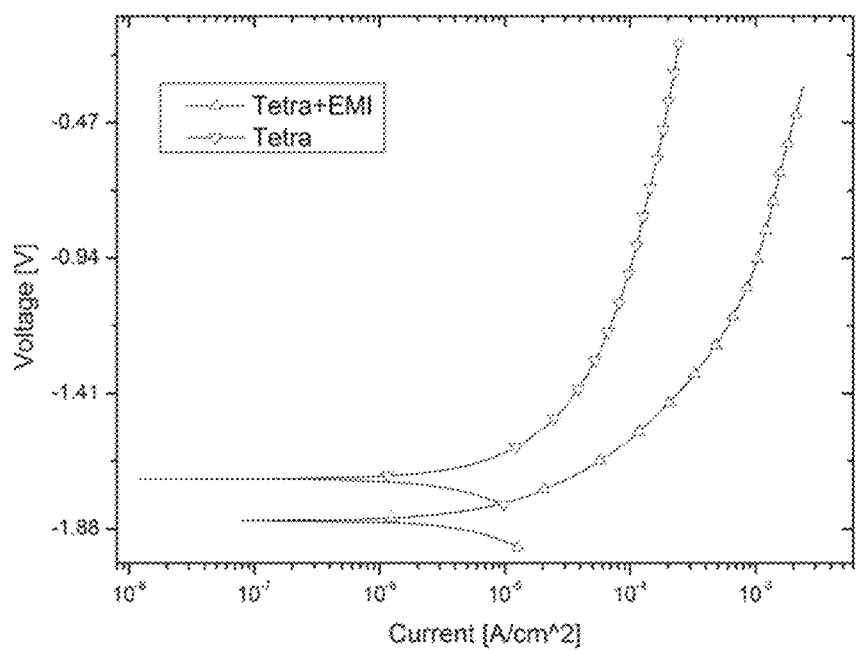
FIGS. 13A-F present comparative voltage versus current plots showing the results of potentidynamic measurements, scanned at a rate of 5 mVsec-1, as measured in an Al/air battery according to some embodiments of the present invention, comprising as electrolyte tetraglyme (down-pointing triangles in FIG. 13A) and 30% by volume EMIm(HF)2.3F in tetraglyme (up-pointing triangels in FIG. 13A), comprising as electrolyte propylene carbonate (down-pointing triangles in FIG. 13B) and 30% by volume EMIm(HF)2.3F in propylene carbonate (up-pointing triangels in FIG. 13B), comprising as electrolyte DMS (down-pointing triangles in FIG. 13C) and 30% by volume EMIm(HF)2.3F in DMS (up-pointing triangels in FIG. 13C), comprising as electrolyte pristine EMImTFSI RTIL (down-pointing triangles in FIG. 13D) and 30% by volume EMIm(HF)2.3F in EMImTFSI (up-pointing triangels in FIG. 13D), comprising as electrolyte pristine EMImTrifluroimide RTIL (down-pointing triangles in FIG. 13E) and 30% by volume EMIm(HF)2.3F in EMImTrifluroimide RTIL (up-pointing triangels in FIG. 13E), and comprising as electrolyte pristine EMImSolfanate RTIL (down-pointing triangles in FIG. 13F) and 30% by volume EMIm(HF)2.3F in EMImSolfanate RTIL (up-pointing triangels in FIG. 13F), wherein the cells were allowed to rest in full configuration for 1 hour prior to the measurements.
Figure 13B:
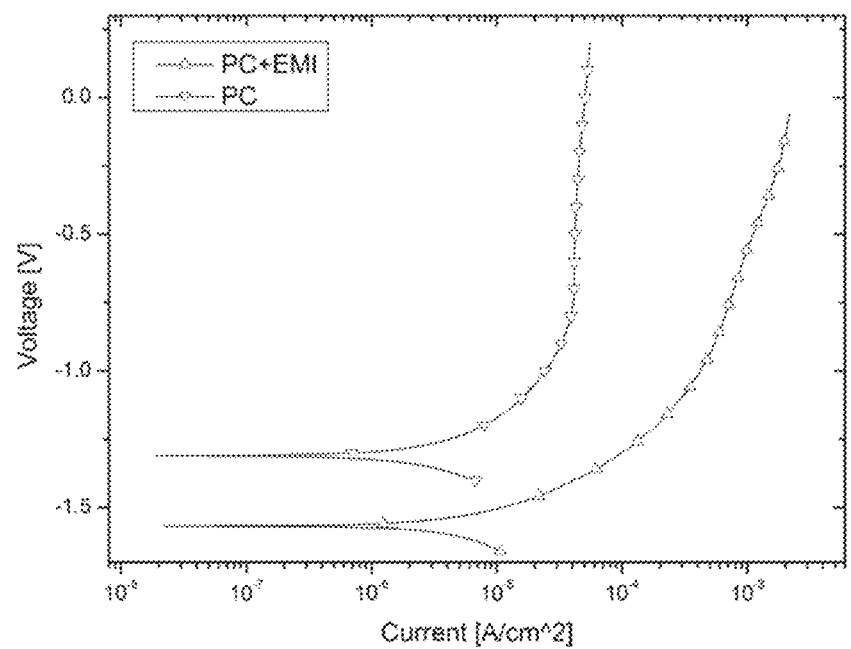
Figure 13C:
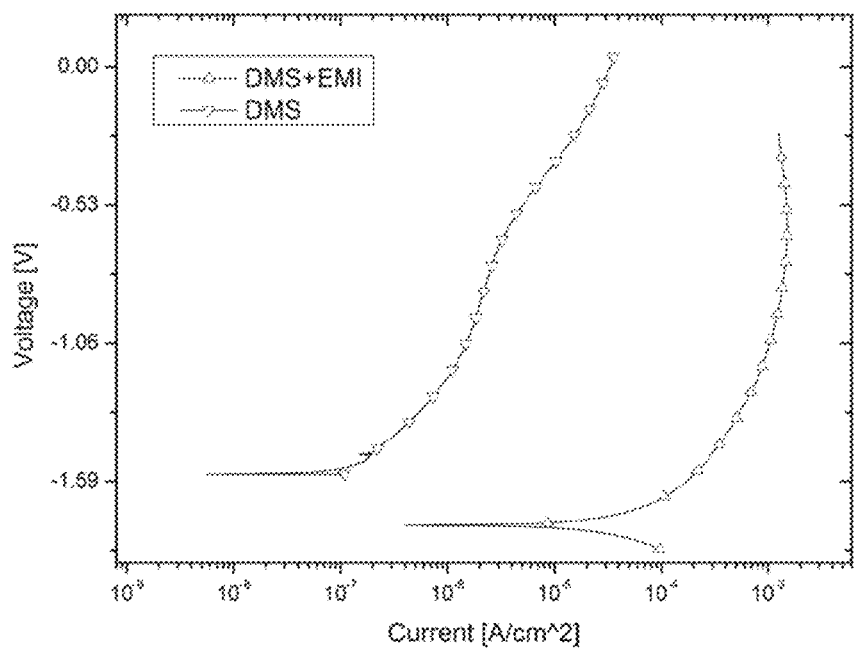
Figure 13D:
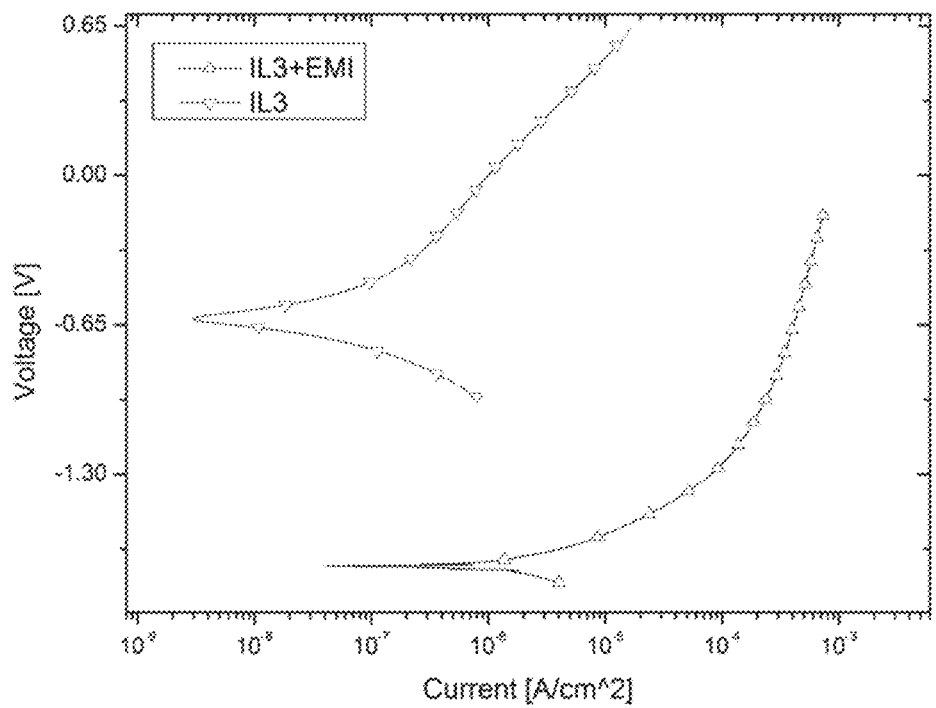
Figure 13E:
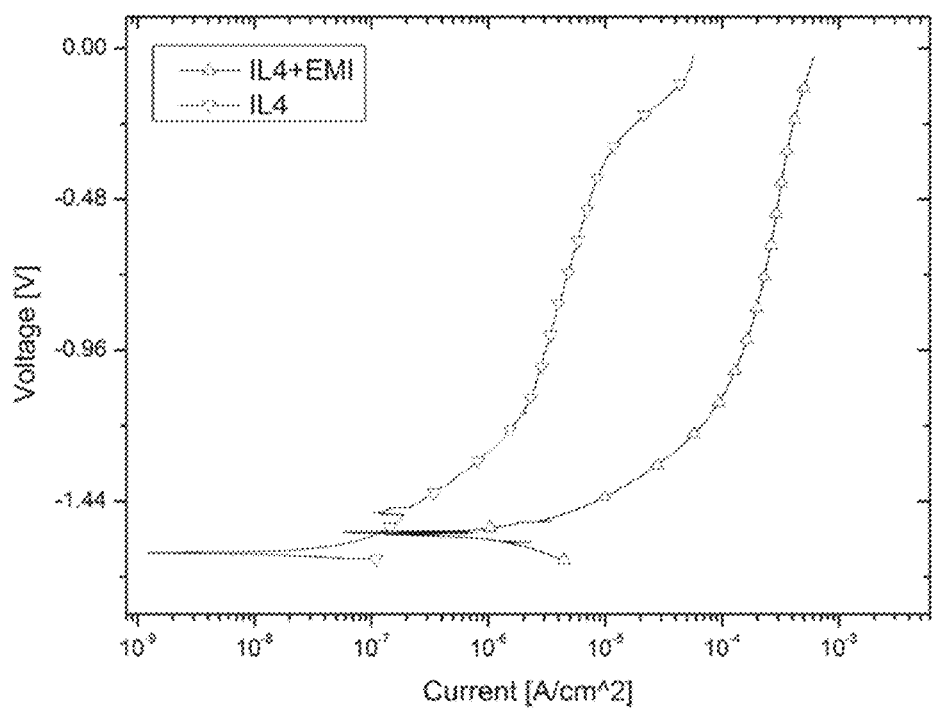
Figure 13F:
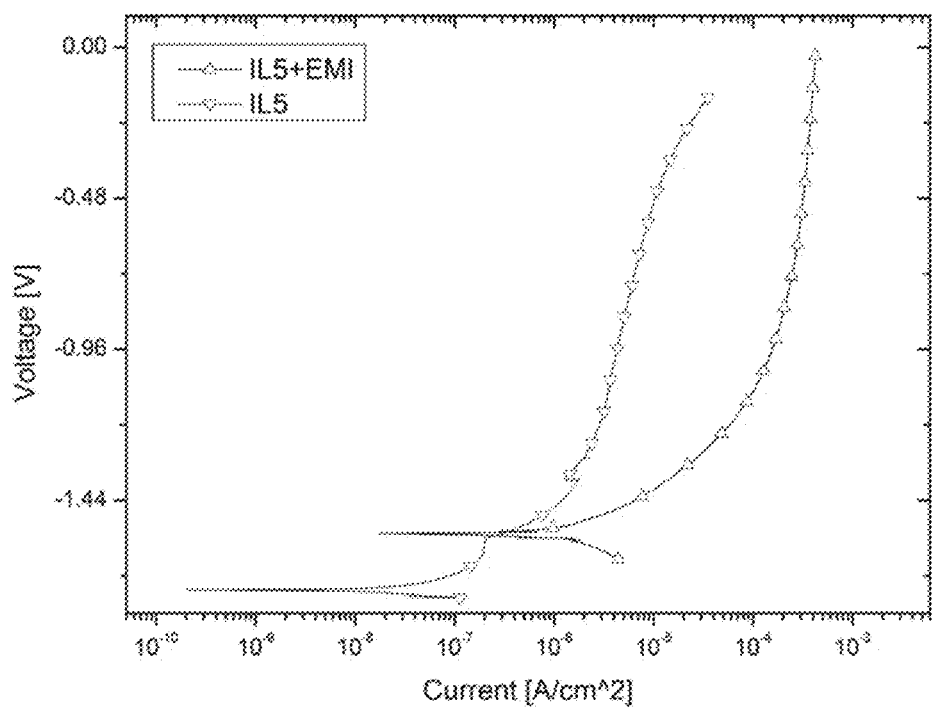

FIG. 12 presents a comparative plot of voltage versus time showing discharge at 0.5 mAcm$^{-2}$ of an aluminum/air battery according to some embodiments of the present invention, using 0.1 M aluminum bis(trifluoromethane)sulfonimide (AlTFSI) salt dissolved in EMIm(HF)$_{2.3}$F RTIL (marked by up-pointing triangels), 0.1 M AlF$_3$ dissolved in EMIm(HF)$_{2.3}$F RTIL (marked by down-pointing triangels) and 0.1 M α-Al$_2$O$_3$ dissolved in EMIm(HF)$_{2.3}$F RTIL (marked by right-pointing triangels).

As can be seen in FIG. 12, different oxidized Al additives altered the performance and behavior of the Al-Air battery. For instance, AlTFSI showed the longest discharge time (more than 250 hours) exhibiting a discharge plateau at 1.4 V. Both AlF$_3$ and α-Al$_2$O$_3$ exhibited a discharge plateau at 1.45 V with a shorter discharge time of about 225 hours. The results indicate that the performance of an Al-Air battery according to some embodiments of the present invention may be adjusted as a function of the additive per the required application.

The fact that the addition of the oxidized metal sources does not reduce the performance of the battery is unexpected since in the case of lithium in ionic liquids, the more lithium ions there are, the less conductive the electrolyte is after a certain amount of additive.

FIGS. 13A-F present comparative voltage versus current plots showing the results of potentidynamic measurements, scanned at a rate of 5 mVsec$^{-1}$, as measured in an Al/air battery according to some embodiments of the present invention, comprising as electrolyte tetraglyme (down-pointing triangles in FIG. 13A) and 30% by volume EMIm(HF)$_{2.3}$F in tetraglyme (up-pointing triangles in FIG. 13A), comprising as electrolyte propylene carbonate (down-pointing triangles in FIG. 13B) and 30% by volume EMIm$(HF)_{2.3}F$ in propylene carbonate (up-pointing triangels in FIG. 13B), comprising as electrolyte DMS (down-pointing triangles in FIG. 13C) and 30% by volume EMIm$(HF)_{2.3}F$ in DMS (up-pointing triangels in FIG. 13C), comprising as electrolyte pristine EMImTFSI RTIL (down-pointing triangles in FIG. 13D) and 30% by volume EMIm$(HF)_{2.3}F$ in EMImTFSI (up-pointing triangels in FIG. 13D), comprising as electrolyte pristine EMImTrifluroimide RTIL (down-pointing triangles in FIG. 13E) and 30% by volume EMIm$(HF)_{2.3}F$ in EMImTrifluroimide RTIL (up-pointing triangels in FIG. 13E), and comprising as electrolyte pristine EMImSolfanate RTIL (down-pointing triangles in FIG. 13F) and 30% by volume EMIm$(HF)_{2.3}F$ in EMImSolfanate RTIL (up-pointing triangels in FIG. 13F), wherein the cells were allowed to rest in full configuration for 1 hour prior to the measurements.

As can be seen in FIGS. 13A-F, when pristine solvents such as tetraglyme (FIG. 13A), propylene carbonate (FIG. 13B) or DMS (FIG. 13C), and pristine RTILs such as EMImTFSI (FIG. 13D), EMImTrifluroimide (FIG. 13E) and EMImSolfanate (FIG. 13F), were used as electrolytes in an Al/air battery, lower currents and higher potentials were obtained comnpared to the results obtained when 30% by volume EMIm$(HF)_{2.3}F$ were added thereto, wherein the latter showing densities of more than one, two or three orders of magnitude, respectively. Furthermore, the lower measured potential (about −1.6 to −1.4 without EMIm$(HF)_{2.3}F$ and about −1.9 to −1.6 with EMIm$(HF)_{2.3}F$) provide clear indication of metal surface activation in presence of fluoroanion species in the electrolyte.

Example 8

Semi-Solid State Electrolytes

In order to demonstrate the concept of using a semi-solid, gel or solid fluoroanion-containing compositions as electrolytes, an Al-Air battery as presented hereinabove according to some embodiments of the present invention, was constructed to comprise EMIm$(HF)_{2.3}F$ RTIL-based electrolyte which was turned semi-solid by mixing therein a powder of $\alpha$-$Al_2O_3$.

$\alpha$-$Al_2O_3$ characterized by an average particle size of about 3 microns, was obtained from Alfa Aesar, and used as is.

Figure 14:
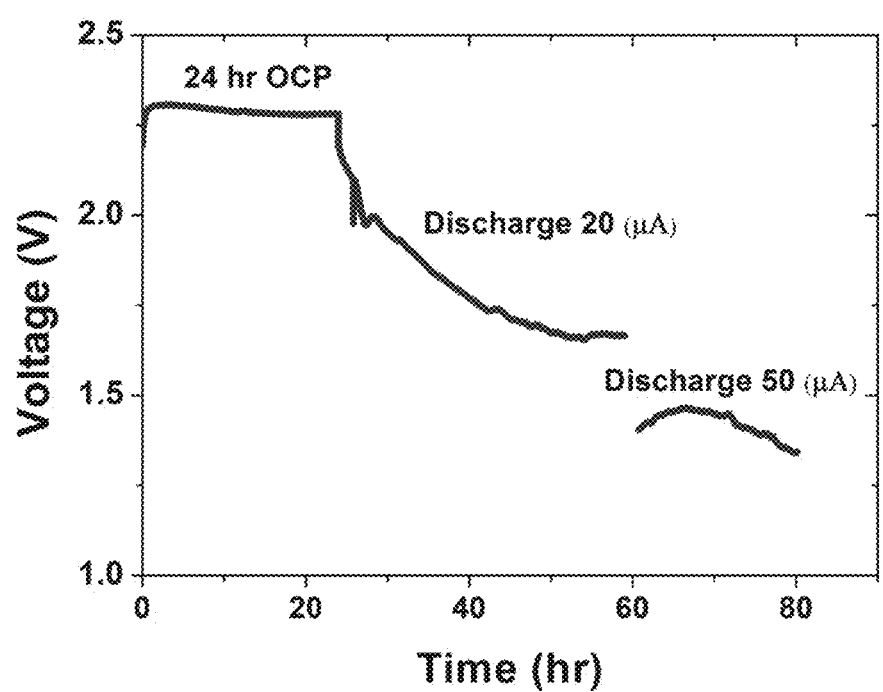
FIG. 14 presents a voltage versus time plot, showing the discharge currents of an Al-air battery according to some embodiments of the present invention, using EMIm(HF)$_{2.3}$F having 2 M α-Al$_2$O$_3$ mixed therein and forming a semi-solid (paste) state electrolyte, wherein the discharge was performed at 22 C.°.

FIG. 14 presents a voltage versus time plot, showing the discharge currents of an Al-air battery according to some embodiments of the present invention, using EMIm$(HF)_{2.3}F$ having 2M $\alpha$-$Al_2O_3$ mixed therein and forming a semi-solid (paste) state electrolyte, wherein the discharge was performed at 22 C.°.

As can be seen in FIG. 14, the addition of a high concentration of $\alpha$-$Al_2O_3$ powder (up to 2 M) to EMIm$(HF)_{2.3}F$ RTIL afforded a semi-solid (paste) state electrolyte which performed satisfactorily. The initial drop of potential in the system indicated a high intrinsic resistivity due to lower conductivity of the electrolyte, however, the discharge of the battery is stable for 60 hour of operation at 20 µA, while at 50 µA a much lower plateau was measured (1.4 V).

Example 9

Welding of Self-Passivating Metals

As known in the art, welding of self-passivating metals, such as aluminum, is a challenging task due to the naturally-formed and rapidly re-formed passivation layer which typically exhibits a melting temperature higher than the base metal. Hence, welding of self-passivating metals typically requires the use of higher voltage and currents for the melting arc and the use of an inert gas to shield the welding joint from the naturally oxidative ambient environment.

The experiment presented herein demonstrates the use of a fluoroanion-containing composition, according to some embodiments of the present invention, in welding aluminum at reduces welding temperatures (below the temperature needed to melt the passivating oxide layer), while rendering unnecessary the use of an inert atmosphere (e.g., argon) without burning the welded metal.

Two 0.5 cm thick 5005 aluminum sheets were dipped in EMIm$(HF)_{2.3}F$ RTIL for 30 minutes.

Similarly, a 5005 aluminum filler rod/wire was treated with EMIm$(HF)_{2.3}F$ RTIL for 30 minutes.

The two treated sheets and the treated filler wire were separated from the fluoroanion-containing composition, wiped dry and kept at ambient conditions for 2 hours, and thereafter welded together using a Fronius welding machine configured to create a melting arc at 120 V and 65 A. It is noted that typical setting for the maching for welding aluminum is 120 V and 95 A.

Figure 15A:
FIGS. 15A-B present photographs of aluminum sheets being welded using an aluminum filler wire and a welding arc formed at 120 V and 65 A without an inert atmosphere shielding, wherein the sheets and the filler wire in FIG. 15A have not been activated, and the sheets and the filler wire in FIG. 15B have been activated by contact with EMIm(HF)$_{2.3}$F RTIL for 30 minutes.
Figure 15B:

FIGS. 15A-B present photographs of aluminum sheets being welded using an aluminum filler wire and a welding arc formed at 120 V and 65 A without an inert atmosphere shielding, wherein the sheets and the filler in FIG. 15A have not been activated, and the sheets and the filler in FIG. 15B have been activated by contact with EMIm$(HF)_{2.3}F$ RTIL for 30 minutes.

As can be seen in FIGS. 15A-B, the metal burned and the sheets did not fuse using untreated aluminum and untreated filler wire, while the treated sheets were fused via the treated filler wire.

Example 10

Electodeposition of Metals from Metal Oxides

In order to show that metal oxides, such as those deposited on the cathode during discharge of a metal/air battery, can be reduced at the cathode during recharge and serve as a source of metal ions to be oxidized to metal on the anode, as required by a secondary (rechargeable) battery, the present inventors have employed glassy carbon as a substrate for copper deposition, and copper oxide as a source of copper atoms. Glassy carbon is widely used as a model for a metal substrate to demonstrate metal deposition, since its electrochemical characteristics allow highly accurate detection of the deposited metal, compared to other metal substrates. Hence, in the context of embodiments of the present invention, the glassy carbon substrate is regarded as any metal substrate, including but not limited to a metal anode in a rechargeable battery.

EMIm$(HF)_{2.3}F$ (Boulder Ionics, Inc.), used as an exemplary fluoroanion-containing composition according to some of any of the embodiments of the present invention, was used without further purification.

Copper foil (thickness 0.25 mm, 99.98% pure, Sigma—Aldrich) and glassy carbon (GC) plate (thickness 3 mm, ALS Co, Japan) were utilized as working electrodes.

The GC electrode was polished before each experiment using 0.05 µm $Al_2O_3$ polishing suspension (Buehler). Copper was cleaned in 10% $H_2SO_4$ solution by emersion for 10 seconds. All the surfaces were dried under nitrogen gas stream after the cleaning and polishing preparations.

Copper (I) oxide powder (99%, Alfa Aesar) and Copper (II) oxide powder (>99%, Sigma—Aldrich) was used as the source of copper cations in the deposition experiments.

Electrochemical measurements were performed using an EG&G potentiostat/galvanostat 273A (Princeton Applied Research).

Three electrode configuration was used for the Cyclic Voltammetry measurements, using a, Cu or GC as the working electrode material, Pt wire was used as a counter electrode and the same gel based electrode was used as a reference electrode. The produced experiment was conducted at a scan rate of 5 mV/sec.

Figure 16:
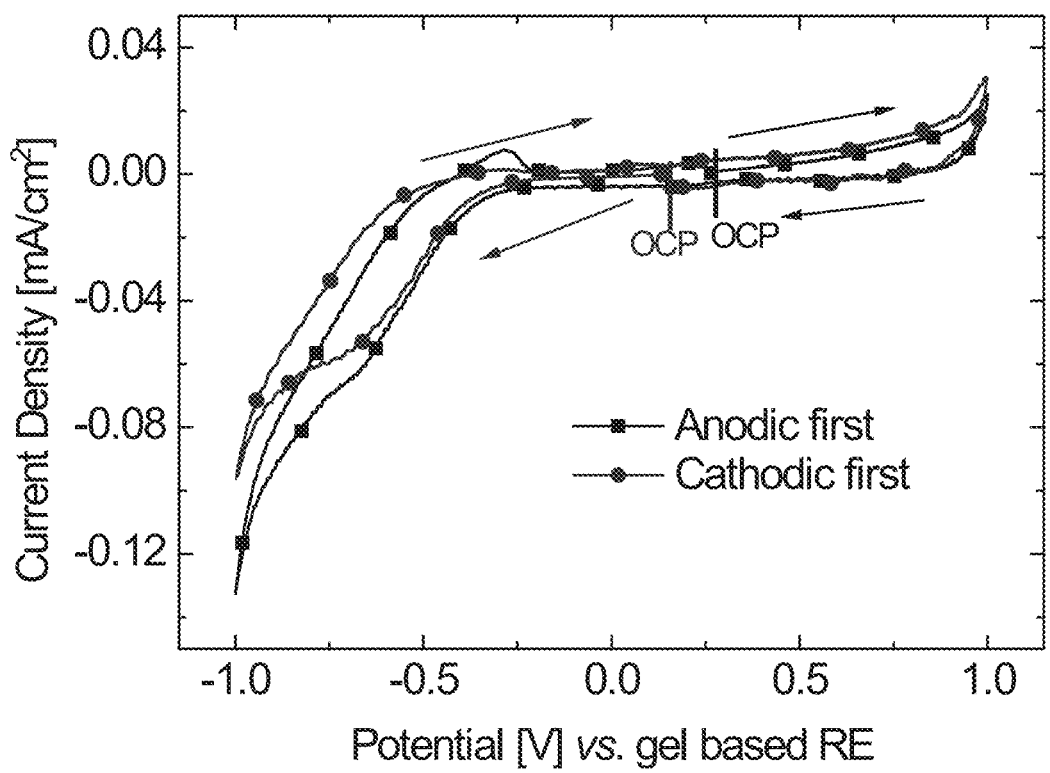
FIG. 16 presents comparative cyclic voltammograms plots showing the electrochemical window, spanning a potential range of −1 V up to 1 V versus a gel reference electrode, as recorded at a scan rate of 5 mV/sec for a glassy carbon electrode immersed in EMIm(HF)$_{2.3}$F in both scan directions, wherein the scans conducted from OCP to −1 V are referred to as "Cathodic First" (marked by squares) and the scans conducted from OCP to 1 V are referred to as "Anodic First" (marked by circles)

FIG. 16 presents comparative cyclic voltammograms plots measuring the electrochemical window, spanning a potential range of −1 V up to 1 V versus a gel reference electrode, as recorded at a scan rate of 5 mV/sec for a glassy carbon electrode immersed in $EMIm(HF)_{2.3}F$ in both scan directions, wherein the scans conducted from OCP to −1 V are referred to as "Cathodic First" (marked by squares) and the scans conducted from OCP to 1 V are referred to as "Anodic First" (marked by circles).

As can be seen in FIG. 16, no evidence of reduction or oxidation peaks have been observed within the electrochemical window.

Figure 17:
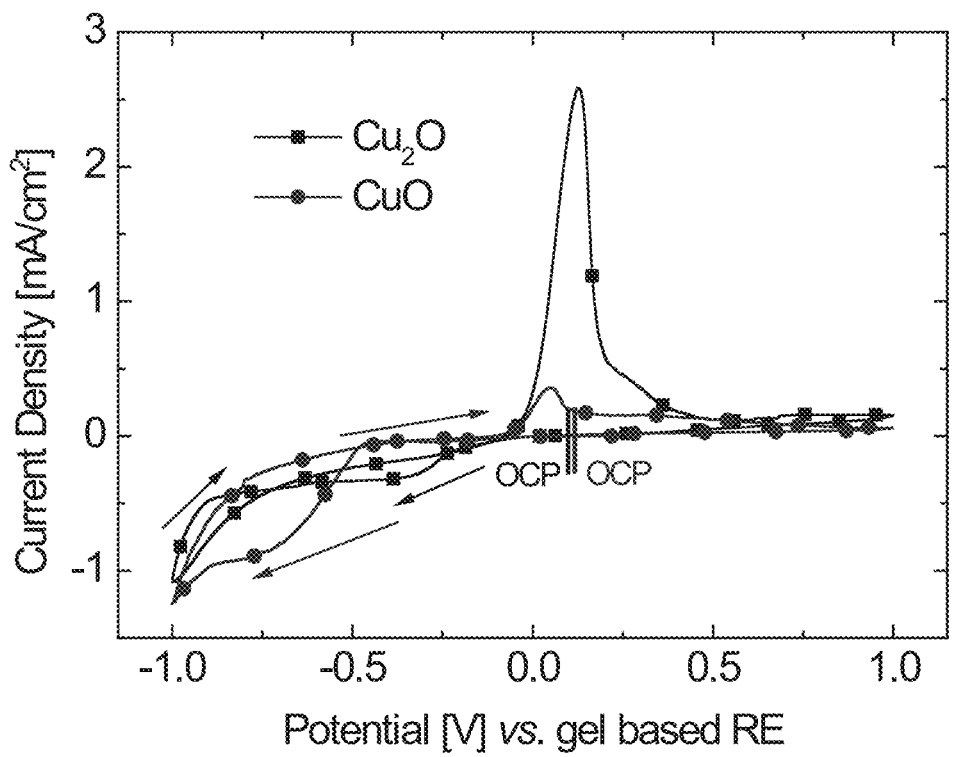
FIG. 17 presents comparative plots showing cyclic voltammograms recorded at scan rate of 5 mV/sec vs. gel based reference electrode for an electrochemical cell comprising glassy carbon as a working electrode and EMIm(HF)$_{2.3}$F, an exemplary fluoroanion-containing composition according to some embodiments of the present invention, and further comprising 50 mM of copper(I) oxide (Cu$_2$O, marked by squares) or 10 mM of copper(II) oxide (CuO, marked by circles)

FIG. 17 presents comparative plots of cyclic voltammograms recorded at scan rate of 5 mV/sec vs. gel based reference electrode for an electrochemical cell comprising glassy carbon as a working electrode and $EMIm(HF)_{2.3}F$, an exemplary fluoroanion-containing composition according to some embodiments of the present invention, and further comprising 50 mM of copper(I) oxide ($Cu_2O$, marked by squares) or 10 mM of copper(II) oxide (CuO, marked by circles).

As can be seen in FIG. 17, clear cathodic reduction peaks are visible at −0.4 V for $EMIm(HF)_{2.3}F$ containing $CuO_2$, and at −0.75 V for $EMIm(HF)_{2.3}F$ containing CuO in currents of 0.5 mA·cm$^{-2}$ and higher. The reduction peaks indicate metallic copper ($Cu^0$) deposition on the surface of the electrode. As can further be seen in FIG. 17, a similar anodic peak is obtained at 0.05 V for both the copper oxides. The difference in the anodic peak height and the area thereunder represent the difference in the rate (amount) of metallic copper deposition on the surface of the GC.

To verify the deposition of copper observed in FIG. 17, the "Anodic First" scan of a cyclic voltammogram was performed using a copper ($Cu^0$) foil.

Figure 18:
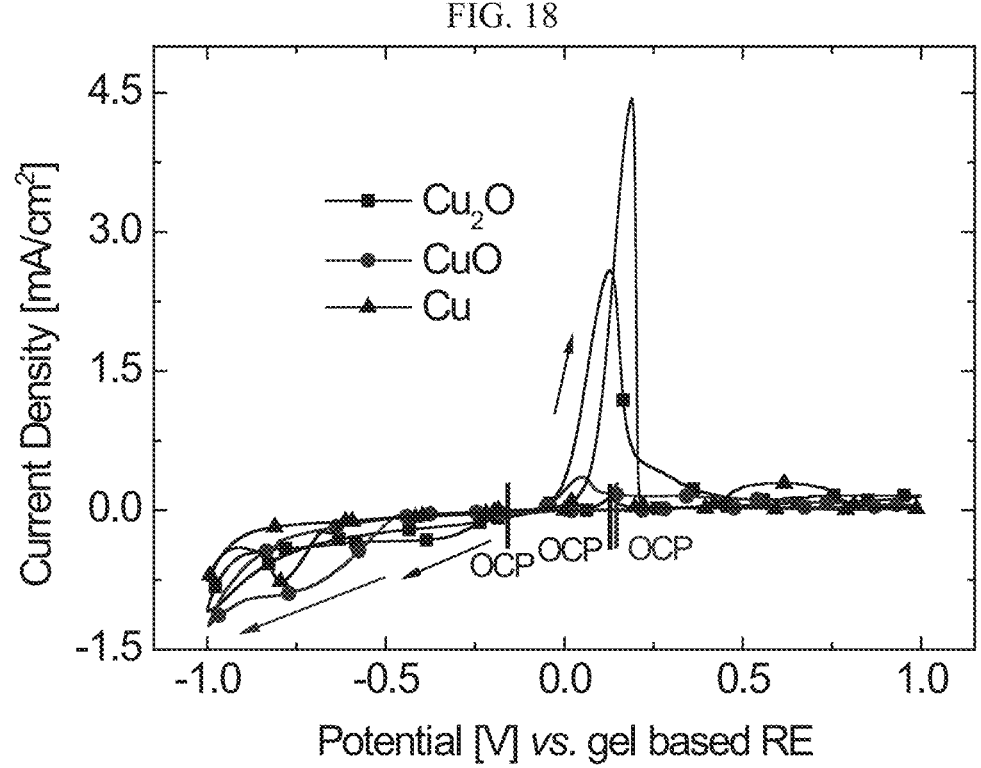
FIG. 18 presents comparative plots showing cyclic voltammograms recorded at scan rate of 5 mV/sec vs. gel based reference electrode for an electrochemical cell comprising glassy carbon as a working electrode and EMIm(HF)$_{2.3}$F, an exemplary fluoroanion-containing composition according to some embodiments of the present invention, and further comprising 50 mM of copper(I) oxide (Cu$_2$O, marked by squares) or 10 mM of copper(II) oxide (CuO, marked by circles), and further showing a plot representing the copper foil "Anodic First" branch (Cu$^0$, marked by triangles) for dissolution peak comparison.

FIG. 18 presents comparative plots of cyclic voltammograms recorded at scan rate of 5 mV/sec vs. gel based reference electrode for an electrochemical cell comprising glassy carbon as a working electrode and $EMIm(HF)_{2.3}F$, an exemplary fluoroanion-containing composition according to some embodiments of the present invention, and further comprising 50 mM of copper(I) oxide ($Cu_2O$, marked by squares) or 10 mM of copper(II) oxide (CuO, marked by circles), and further showing a plot representing the copper foil "Anodic First" branch ($Cu^0$, marked by triangles) for dissolution peak comparison.

As can be seen in FIG. 18, the Cu peak position is almost identical to the measured anodic peak of the previously deposited copper metal from CuO or $CuO_2$, indicating that the cathodic direction cycles of the CuO and $CuO_2$ indeed deposited copper.

The experiments presented hereinabove clearly show that the applicability of the presently provided methods, according to some embodiments of the present invention, for transforming a metal oxide into a species that can react electrochemically and be deposited electrochemically on a conductive substrate.

This experiment is also indicative for a successful performance of a rechargeable electrochemical cell device (battery) based on a fluoroanion-containing composition as an electrolyte, according to some embodiments of the present invention, wherein the oxide deposited on the cathode is able to return as a depositable metal ion and replenish the anode during a recharging process.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An electrochemical cell device comprising an anode, a cathode, and an electrolyte, said anode comprises metallic aluminum as anodic fuel, said cathode is an air cathode and said electrolyte being a fluoroanion-containing composition, wherein:

said electrolyte comprises at least one $[(HF)_nF]^-$ species, said at least one $[(HF)_nF]^-$ species exhibits measurable spectral features in said electrolyte, a surface of said anode exposed to said electrolyte comprises fluorohydrogenate-metal species (HF-species) such that said surface substantially exhibits said measurable spectral features after being washed with an organic solvent, and the electrochemical cell device exhibits a discharge current higher than a corrosion current.

2. The device of claim 1, wherein said anode is essentially devoid of a passivation layer.

3. The device of claim 1, wherein said measurable spectral features are attenuated total reflection infrared peaks having a wavenumber range selected from the group consisting of from 3150 cm$^{-1}$ to 2840 cm$^{-1}$, from 1110 cm$^{-1}$ to 800 cm$^{-1}$, from 2505 cm$^{-1}$ to 2200 cm$^{-1}$, from 1920 cm$^{-1}$ to 1600 cm$^{-1}$ and/or from 1170 cm$^{-1}$ to 870 cm$^{-1}$.

4. The device of claim 1, wherein said anode comprises at least 99% aluminum.

5. The device of claim 1, wherein said fluoroanion-containing composition comprises a room temperature ionic liquid (a fluoroanion-RTIL).

6. The device of claim 5, wherein said RTIL is $EMIm(HF)_{2.3}F$ and/or $Pyr_{14}(HF)_{2.3}F$.

* * * * *